(12) United States Patent
Iwata et al.

(10) Patent No.: US 8,004,138 B2
(45) Date of Patent: Aug. 23, 2011

(54) MOTOR

(75) Inventors: Kazuyuki Iwata, Utsunomiya (JP);
Hiromitsu Sato, Utsunomiya (JP);
Naohisa Morishita, Utsunomiya (JP);
Satoru Shinzaki, Utsunomiya (JP);
Tamotsu Kawamura, Sakura (JP);
Masato Fujioka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 12/280,138

(22) PCT Filed: Mar. 6, 2007

(86) PCT No.: PCT/JP2007/054295
§ 371 (c)(1),
(2), (4) Date: Aug. 20, 2008

(87) PCT Pub. No.: WO2007/102491
PCT Pub. Date: Sep. 13, 2007

(65) Prior Publication Data
US 2010/0231081 A1 Sep. 16, 2010

(30) Foreign Application Priority Data

| Mar. 6, 2006 | (JP) | 2006-060064 |
|---|---|---|
| Mar. 6, 2006 | (JP) | 2006-060065 |
| Mar. 6, 2006 | (JP) | 2006-060066 |
| Mar. 6, 2006 | (JP) | 2006-060067 |

(51) Int. Cl.
*H02K 16/00* (2006.01)
(52) U.S. Cl. .......................... 310/114; 310/52
(58) Field of Classification Search .......... 310/112–114, 310/266, 52–59
See application file for complete search history.

(56) References Cited

U.S. PATENT DOCUMENTS

| 6,639,337 | B1 * | 10/2003 | Nakano .................. 310/113 |
| 6,700,242 | B2 * | 3/2004 | Kawamura .............. 310/68 R |
| 6,998,757 | B2 * | 2/2006 | Seguchi et al. .......... 310/266 |
| 7,569,970 | B2 * | 8/2009 | Iwata et al. .............. 310/266 |
| 2006/0144357 | A1 | 7/2006 | Knecht et al. |
| 2007/0074691 | A1 | 4/2007 | Kinugawa et al. |
| 2007/0205683 | A1 * | 9/2007 | Kawamura et al. ...... 310/114 |
| 2007/0205684 | A1 * | 9/2007 | Iwata et al. .............. 310/114 |
| 2008/0019855 | A1 * | 1/2008 | Atarashi et al. ............. 418/7 |

FOREIGN PATENT DOCUMENTS

| JP | 2002-204541 A | 7/2002 |
| JP | 2004-72978 A | 3/2004 |
| WO | WO 2005/088081 A2 | 9/2005 |
| WO | WO 2006/022056 A1 | 3/2006 |

* cited by examiner

*Primary Examiner* — Thanh Lam
(74) *Attorney, Agent, or Firm* — Arent Fox LLP

(57) ABSTRACT

A motor is provided with: an inner rotor having inner permanent magnets arranged in a peripheral direction and an outer rotor having outer permanent magnets arranged in the peripheral direction, the mutual axes of rotation of the inner rotor and the outer rotor being arranged coaxially, and a rotating device capable of making at least one of the inner rotor and the outer rotor rotate around the axes of rotation so as to change the relative phase between the rotors, wherein the rotating device includes: a first member which is integrally and rotatably provided with respect to the outer rotor; and a second member which is integrally and rotatably provided with respect to the inner rotor and which defines pressure chambers inside the inner rotor with the first member, and wherein a working fluid is supplied to the pressure chambers, thereby changing the relative phase between the rotors.

18 Claims, 42 Drawing Sheets

- — · — FIRST COMPARATIVE EXAMPLE  Ke=A
- — · · — SECOND COMPARATIVE EXAMPLE  Ke=B (<A)
- — — — THIRD COMPARATIVE EXAMPLE  Ke=C (<B)
- ——— EMBODIMENT  Ke=A、B、C

- — · — FIRST COMPARATIVE EXAMPLE  Ke=A
- — · · — SECOND COMPARATIVE EXAMPLE  Ke=B (<A)
- — — — THIRD COMPARATIVE EXAMPLE  Ke=C (<B)
- ——— EMBODIMENT  Ke=A、B、C

US 8,004,138 B2

MOTOR

CROSS-REFERENCE TO RELATED APPLICATIONS

This application is a National Stage entry of International Application No. PCT/JP2007/054295, filed on Mar. 6, 2007, and claims the priority of Japanese Patent Application Nos. 2006-060064, 2006-060065, 2006-060066, and 2006-060067, filed Mar. 6, 2006, the entire specifications, claims and drawings of which are incorporated herewith by reference.

TECHNICAL FIELD

The present invention relates to a motor.
The present invention claims priority from Japanese Patent Application Nos. 2006-060064, 2006-060065, 2006-060066, and 2006-060067, the entire disclosure of which is hereby incorporated by reference.

BACKGROUND ART

Conventionally, for example, a motor which has first and second rotors concentrically provided around the axis of rotation of the motor and which controls the peripheral relative positions, i.e., phase difference of the first and second rotors according to the rotational speed of the motor or according to the speed of a rotating magnetic field generated in a stator is known (for example, refer to Patent Document 1). In this motor, for example, in a case where the phase difference of the first and second rotors is controlled according to the rotational speed of the motor, the peripheral relative positions of the first and second rotors are changed via a member which is displaced along a radial direction by the action of the centrifugal force. Further, for example, in a case where the phase difference of the first and second rotors is controlled according to the speed of a rotating magnetic field generated in the stator, the speed of a rotating magnetic field is changed by applying a control current to stator windings in a state where the rotational speed of each of the rotors is maintained by inertia, thereby changing the peripheral relative positions of the first and second rotors.

Meanwhile, in the motor related to an example of the above conventional technique, for example, in a case where the phase difference of the first and second rotors is controlled according to the rotational speed of the motor, there occurs a problem that the phase difference of the first and second rotors can be controlled only in the operating state of the motor, i.e., only in a state where the centrifugal force according to the rotational speed of the motor acts, and the phase difference cannot be controlled with proper timing including a stopped state of the motor. Further, in a state where the vibration from the outside is apt to act on the motor like a case where the motor is mounted on a vehicle as a driving source, there occurs a problem that it is difficult to properly control the phase difference of the first and second rotors only by the action of a centrifugal force. Furthermore, in this case, the phase difference is controlled irrespective of fluctuation in a power supply voltage in a power source for the motor. Therefore, there is a possibility that, for example, the magnitude relation between the power supply voltage and the reverse electromotive voltage of the motor may be reversed. Further, for example, in a case where the phase difference of the first and second rotors is controlled according to the speed of the rotating magnetic field generated in the stator, the rotating magnetic field speed is changed. Therefore, there occurs a problem that the control processing of the motor may be complicated.

Patent Document 1: Japanese Unexamined Patent Application, First Publication No. 2002-204541

DISCLOSURE OF THE INVENTION

Problems that the Invention is to Solve

The present invention was made in view of the above-mentioned circumstances and has an object of providing a motor capable of making an induced voltage constant variable easily and properly while suppressing complication of the motor, thereby expanding an operational rotational frequency range and torque range, improving operating efficiency, and expanding an operational range at high efficiency.

Means for Solving the Problems

In order to solve the above problems and achieve the above object, the present invention employs the following. That is, a motor includes an inner rotor having inner permanent magnets arranged in a peripheral direction and an outer rotor having outer permanent magnets arranged in the peripheral direction, the mutual axes of rotation of the inner and outer rotors being arranged coaxially, and a rotating device capable of making at least one of the inner rotor and the outer rotor rotate around the axes of rotation to change the relative phase between the inner rotor and the outer rotor, wherein the rotating device includes: a first member which is provided integrally and rotatably with respect to the outer rotor; and a second member which is provided integrally and rotatably with respect to the inner rotor and which defines pressure chambers inside the inner rotor with the first member, and a working fluid is supplied to the pressure chambers to change the relative phase between the inner rotor and the outer rotor.

A configuration in which the first member is a vane rotor which is arranged inside the inner rotor, and is integrally provided in the outer rotor; and the second member is a housing having concave portions which rotatably accommodate impeller portions of the vane rotor and which defines the pressure chambers with the vane rotor, and is integrally provided inside the inner rotor may be adopted.

A configuration in which the vane rotor is integrally provided in the outer rotor via end plates fixed to the outer rotor so as to cover axial end surfaces, and is integrally provided even in a rotating shaft to which the driving force of the outer rotor is transmitted may be adopted.

A configuration in which the inner rotor and the housing which are integrated are arranged so as to be rotatable in the peripheral direction in a space between the vane rotor and the end plates may be adopted.

A configuration in which the vane rotor is integrally provided in the outer rotor via end plates fixed to the outer rotor so as to cover one axial end surface, and a rotating shaft which transmits the driving force of the outer rotor is integrally provided in the inner rotor and the housing from the other axial side may be adopted.

A configuration in which the working fluid is supplied to the pressure chambers via the vane rotor may be adopted.

A configuration in which the first member is end plates which are integrally provided in the outer rotor and the rotating shaft so as to cover both end surfaces of the inner rotor and the outer rotor, and which transmits torque to the rotating shaft; and the second member is a ring gear which is arranged between the inner rotor and the rotating shaft, is connected with the inner rotor and the rotating shaft by helical splines, defines the pressure chambers with the drive plates, and is moved axially by supply of the working fluid to the pressure chambers may be adopted.

A configuration in which the first member is a housing which is integrally provided in the outer rotor and a rotating shaft to which the driving force of the outer rotor is transmitted; and the second member is pistons which are inserted into holes formed in the housing to define the pressure chambers with the holes, and abut on wall surfaces of the inner rotor may be adopted.

A configuration in which the outer rotor and the inner rotor are such that the position where the outer permanent magnets and the inner permanent magnets face each other with mutually different polarities is set to an origin position may be adopted.

A configuration in which the rotational direction when the inner rotor returns to the origin position from a state where same polarities of the outer permanent magnets and the inner permanent magnets are made to face each other with respect to the outer rotor is made to coincide with the direction of the moment of inertia caused during deceleration rotation may be adopted.

A configuration in which the end plates and end surfaces of the outer rotor are joined via shims.

A configuration in which through holes are formed at sides of a gap between the outer rotor and the inner rotor in the end plates may be adopted.

A configuration in which the outer rotor and the end plates are connected together by bolt fastening portions with every predetermined intervals with the shims interposed therebetween, and curved portions are formed in the position of in the shims nearer to the axial center than the bolt fastening portions may be adopted.

A configuration in which the through holes are formed between the adjacent bolt fastening portions may be adopted.

A configuration in which an axially recessed concave portion is formed in any one of the inner rotor and the end plate, and the convex portion which protrudes axially and slides inside the concave portion during rotation is formed in the other of the inner rotor and the end plate may be adopted.

A configuration in which the convex portion is formed in an annular shape may be adopted.

A configuration in which the convex portion is formed by a ring member fitted into the inner rotor may be adopted.

A configuration in which a labyrinth seal is formed by the convex portion and the concave portion may be adopted.

ADVANTAGES OF THE INVENTION

According to the motor of the present invention, the permanent magnets are arranged in the peripheral direction in the inner rotor and the outer rotor. Thereby, for example, the amount of interlinking magnetic fields that the field fluxes generated by the permanent magnets of the outer rotor interlink the stator windings can be efficiently increased or reduced by the field fluxes generated by the permanent magnets of the inner rotor. Also, in the field-strengthening state, the torque constant (that is, torque/phase current) of the motor can be set to a relatively high value. In addition the maximum value of the torque output by the motor can be increased without reducing a current loss during the operation of the motor or without changing the maximum value of the output current of an inverter which controls to supply with a current to the stator windings.

Moreover, the rotating mechanism supplies a working fluid to the pressure chambers which are defined inside the inner rotor by the first member integrally and rotatably provided with respect to the outer rotor and by the second member integrally and rotatably provided with respect to the inner rotor, thereby changing the relative phase between the inner rotor and the outer rotor. Therefore, it is possible to make an induced voltage constant to be variable easily and properly and with desired timing while suppressing complication of the motor. As a result, it is possible to expand an operational rotational frequency range and torque range, improve operating efficiency, and expand an operational range at high efficiency. Moreover, the relative phase between the inner rotor and the outer rotor can be set to a desired phase by controlling the amount of supply of the working fluid to the pressure chambers. In addition, since the first member and the second member define the pressure chambers inside the inner rotor, particularly an increase in axial thickness of the motor can be suppressed, and the motor can be miniaturized.

REFERENCE NUMERALS

10: MOTOR
11: INNER ROTOR
11a: INNER PERMANENT MAGNET
12: OUTER ROTOR
12a: OUTER PERMANENT MAGNET
14, 70, 105: ROTATING MECHANISM (ROTATING DEVICE)
16, 72, 114: OUTPUT SHAFT (ROTATING SHAFT)
31: DRIVE PLATE (END PLATE)
32: VANE ROTOR (FIRST MEMBER)
33: HOUSING (SECOND MEMBER)
36: IMPELLER PORTION
48: CONCAVE PORTION
56, 101, 116: FIRST PRESSURE CHAMBER (PRESSURE CHAMBER)
57, 102, 117: SECOND PRESSURE CHAMBER (PRESSURE CHAMBER)
65: OUTPUT SHAFT (ROTATING SHAFT)
71: DRIVE PLATE (FIRST MEMBER)
74: SUPPORTING MEMBER (FIRST MEMBER, DRIVE PLATE)
78: RING GEAR (SECOND MEMBER)
81: CYLINDRICAL PORTION (ROTATING SHAFT)
81a, 91a, 94a, 95a: HELICAL SPLINE
82: FLANGE PORTION (FIRST MEMBER, DRIVE PLATE)
107: HOUSING (FIRST MEMBER)
107c, 107d: HOLE
108: PISTON (SECOND MEMBER)
120a, 102b: WALL SURFACE
210: MOTOR
211: INNER ROTOR
211a: INNER PERMANENT MAGNET
212: OUTER ROTOR
212a: OUTER PERMANENT MAGNET
214: ROTATING MECHANISM (ROTATING DEVICE)
216: OUTPUT SHAFT
231: DRIVE PLATE (END PLATE)
232: VANE ROTOR
233: HOUSING
236: IMPELLER PORTION
248: CONCAVE PORTION
256: FIRST PRESSURE CHAMBER (PRESSURE CHAMBER)
257: SECOND PRESSURE CHAMBER (PRESSURE CHAMBER)
258: SPACE
310: MOTOR
311: INNER ROTOR
311a: INNER PERMANENT MAGNET
312: OUTER ROTOR
312A: END SURFACE
312A: OUTER PERMANENT MAGNET
314: ROTATING MECHANISM (ROTATING DEVICE)
316: OUTPUT SHAFT
325: SHIM
327: BEAD (CURVED PORTION)
331: DRIVE PLATE (END PLATE)
331f: THROUGH HOLE
332: VANE ROTOR
333: HOUSING
356: FIRST PRESSURE CHAMBER (PRESSURE CHAMBER)
357: SECOND PRESSURE CHAMBER (PRESSURE CHAMBER)
358: SPACE
363: BOLT FASTENING PORTION
410: MOTOR
411: INNER ROTOR
411a: INNER PERMANENT MAGNET
412: OUTER ROTOR
412a: OUTER PERMANENT MAGNET
414: ROTATING MECHANISM (ROTATING DEVICE)
416: OUTPUT SHAFT
431: DRIVE PLATE (END PLATE)
431b: ANNULAR GROOVE (CONCAVE PORTION)
432: VANE ROTOR
433: HOUSING
434: INNER ROTOR BODY
446a: CONVEX PORTION
456: FIRST PRESSURE CHAMBER (PRESSURE CHAMBER)
457: SECOND PRESSURE CHAMBER (PRESSURE CHAMBER)
458: SPACE
459: LABYRINTH SEAL
461: RING MEMBER

BEST MODE FOR CARRYING OUT THE INVENTION

First Embodiment

Figure 1:
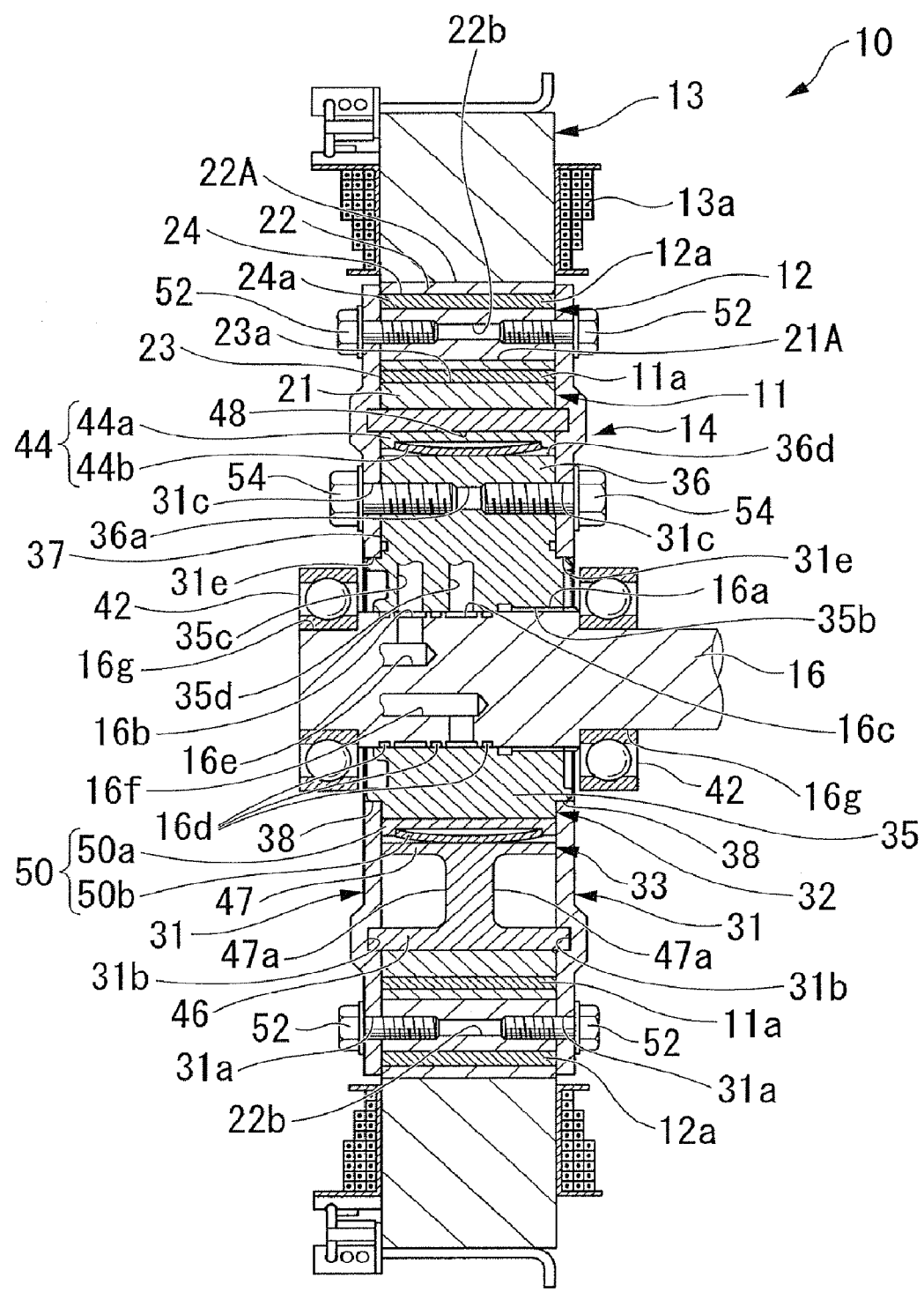
FIG. 1 is a sectional view of principal parts showing a motor according to a first embodiment of the invention.
Figure 2:
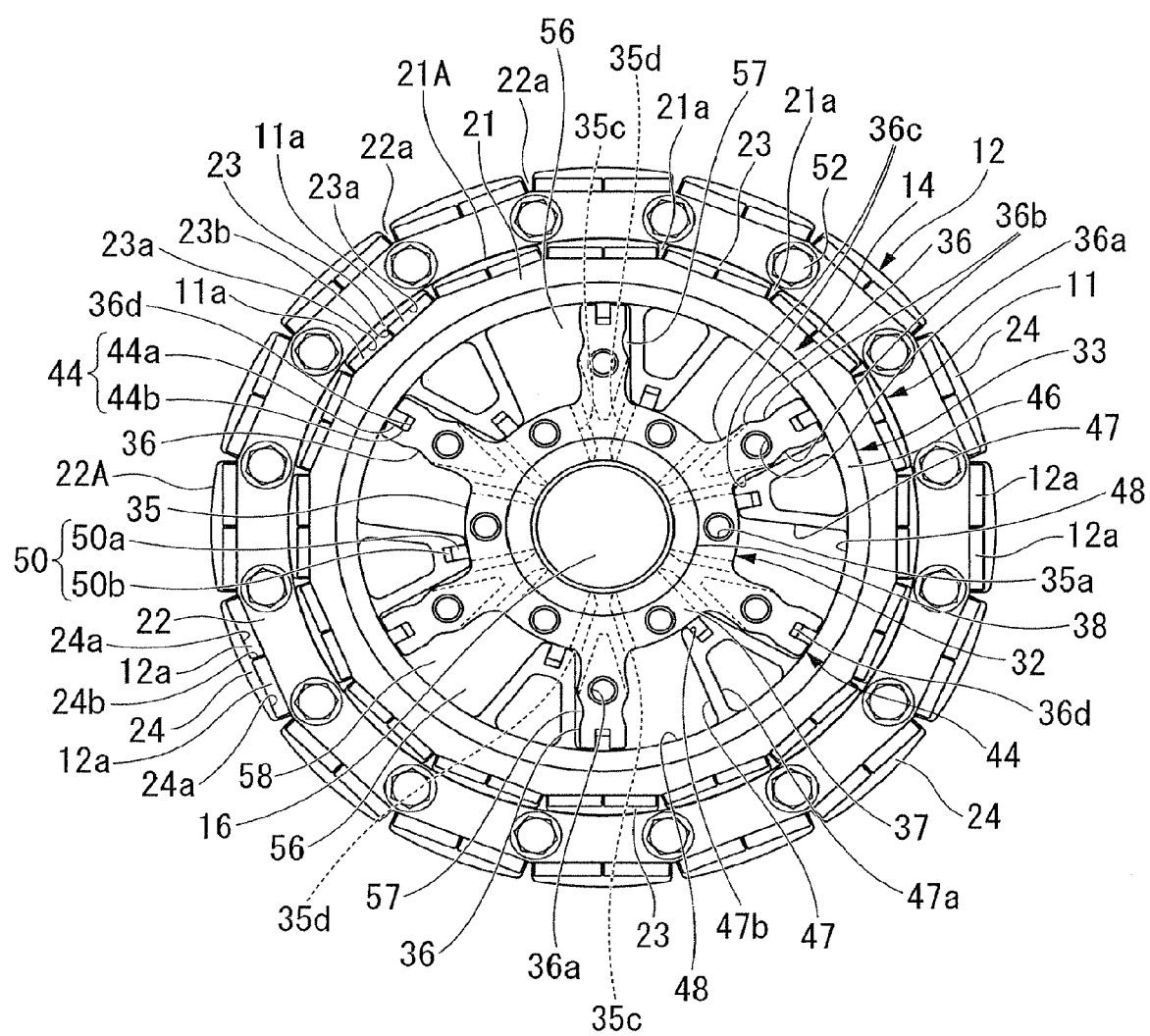
FIG. 2 is a front view showing a field-weakening state of an inner rotor, an outer rotor, and a rotating mechanism of the motor, with a front drive plate omitted.
Figure 3:
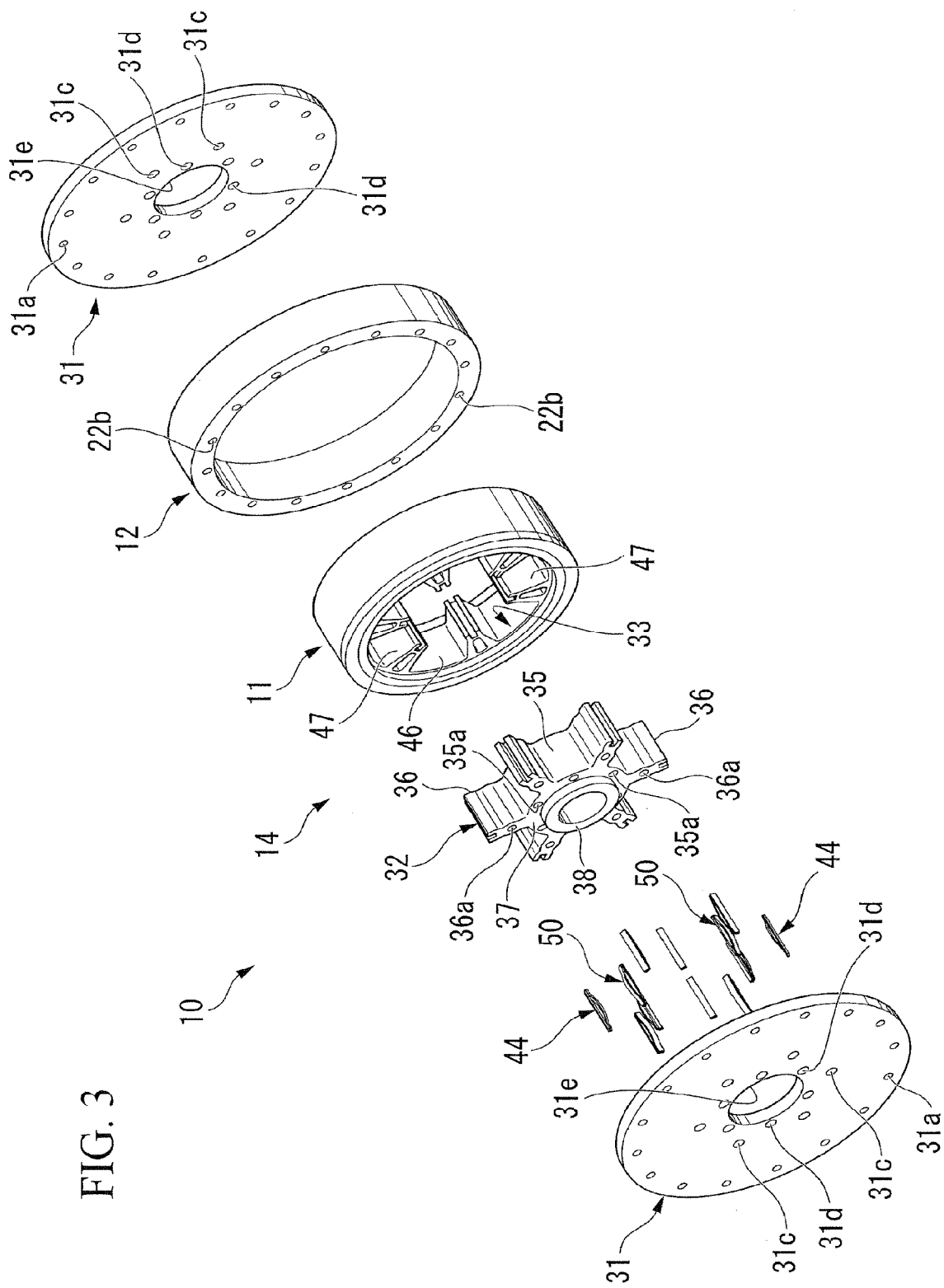
FIG. 3 is an exploded perspective view showing the inner rotor, outer rotor, and rotating mechanism of the motor.

Hereinafter, a motor according to a first embodiment of the present invention is described, referring to FIG. 1 to FIG. 10B. As shown in FIGS. 1 to 3, the motor 10 according to this embodiment is a brushless DC motor including a substantially annular inner rotor 11 which is rotatably provided about the axis of rotation of the motor 10, a substantially annular outer rotor 12 which is rotatably provided about the same axis of rotation radially outside the inner rotor 11 and which is provided so as to be matched with the inner rotor in position in the direction of the axis of rotation, a stator 13 which has a plurality of phases of stator windings 13a, shown in FIG. 1, which generate a rotating magnetic field which rotate the inner rotor 11 and the outer rotor 12, a rotating mechanism (rotating device) 14 which is connected to the inner rotor 11 and the outer rotor 12, and changes the relative phase between the inner rotor 11 and the outer rotor 12 with the hydraulic pressure (fluid pressure) of the hydraulic oil (working fluid) which is an incompressible fluid, and a hydraulic controller (not shown) which controls the hydraulic pressure to the rotating mechanism 14. The motor 10 is mounted on, for example, a vehicle, such as a hybrid vehicle or electric vehicle, as a driving source. In that case, an output shaft (rotating shaft) 16 of the motor is connected to an input shaft of a transmission (not shown), and the driving force of the motor 10 is transmitted to driving wheels (not shown) of a vehicle via a transmission.

In addition, when the driving force is transmitted to the motor 10 from the driving-wheel side during deceleration of a vehicle, the motor 10 functions as a power generator, thereby generating a so-called regenerative braking force, and recovering kinetic energy of a vehicle body as electrical energy (regeneration energy). Moreover, for example in a hybrid vehicle, the axis of rotation of the motor 10 is connected with a crankshaft of an internal combustion engine (not shown), and even in a case where the output of the internal combustion engine is transmitted to the motor 10, the motor 10 functions as a power generator, thereby generating power generation energy.

The inner rotor 11 is arranged so that its axis of rotation is coaxial with the axis of rotation of the motor 10, as shown in FIG. 2, the inner rotor has a substantially cylindrical inner rotor core 21. In an outer portion of the inner rotor core 21, a plurality of (specifically, sixteen) inner magnet mounting portions 23, ..., and 23 are provided at predetermined pitches in the peripheral direction. Further, on an outer peripheral surface 21A of the inner rotor core 21, recessed grooves 21*a* which extend parallel to the axis of rotation are formed in positions between all the inner magnet mounting portions 23 and 23 which are adjacent to each other in the peripheral direction so as to be recessed radially. The inner rotor core 21 is formed, for example, by sintering, etc.

Each of the inner magnet mounting portions 23, ..., and 23 includes a pair of magnet mounting holes 23*a* and 23*a* passing through the inner rotor core 21 parallel to the axis of rotation. The pair of magnet mounting holes 23*a* and 23*a* are formed in a substantially oblong shape in a cross-section in a direction parallel to the axis of rotation, and are arranged in the same plane so as to be adjacent to each other in the peripheral direction via a center rib 23*b*. In addition, this plane is orthogonal to a radial line which connects the center rib 23*b* and the axis of rotation. Each of the magnet mounting holes 23*a* and 23*a* is mounted with a substantially plate-like permanent magnet 11*a* which extends parallel to the axis of rotation.

All the permanent magnets 11*a* mounted on the magnet mounting holes 23*a*, ..., and 23*a*, respectively, are similarly magnetized in their thickness directions (that is, the radial direction of each of the rotors 11 and 12), and a pair of permanent magnets 11*a* and 11*a* mounted on a pair of magnet mounting holes 23*a* and 23*a* provided in the same inner magnet mounting portion 23 are set so that their magnetizing directions become the same direction. Also, for the inner magnet mounting portions 23 and 23 which are adjacent to each other in the peripheral direction in all the inner magnet mounting portions 23, ..., and 23, a pair of permanent magnets 11*a* and 11*a* mounted on one of the inner magnet mounting portions and a pair of permanent magnets 11*a* and 11*a* mounted on the other thereof are set so that their magnetizing directions become different directions. That is, an inner magnet mounting portion 23 mounted with one pair of permanent magnets 11*a* and 11*a* having S poles on their outer peripheral side is adjacent to an inner magnet mounting portion 23 mounted with one pair of permanent magnets 11*a* and 11*a* having N poles on their outer peripheral side, in the peripheral direction via the recessed groove 21*a*. From the above, the inner rotor 11 includes a plurality of permanent magnets 11*a*, ..., and 11*a* which are arranged in the peripheral direction.

The outer rotor 12 is also arranged so that its axis of rotation is coaxial with the axis of rotation of the motor 10, the outer rotor has a substantially cylindrical outer rotor core 22. In an outer portion of the outer rotor core 22, outer magnet mounting portions 24, ..., and 24 of the same number as the aforementioned inner magnet mounting portions 23, ..., and 23 are provided at predetermined pitches in the peripheral direction. Further, on an outer peripheral surface 22A of the outer rotor core 22, a recessed groove 22*a* which extends parallel to the axis of rotation is formed in a position between all the outer magnet mounting portions 24 and 24 which are adjacent to each other in the peripheral direction so as to be recessed radially. Moreover, a screw hole 22*b* shown in FIG. 1 is formed so as to pass axially through the outer rotor in a position on the internal diameter side of each of the recessed grooves 22*a*, ..., and 22*a* of the outer rotor core 22, i.e., in a position between adjacent ones of the outer magnet mounting portions 24, ..., and 24. The outer rotor core 22 is also formed, for example, by sintering, etc.

Each of the outer magnet mounting portions 24, ..., and 24 includes a pair of magnet mounting holes 24*a* and 24*a* passing through the outer rotor core parallel to the axis of rotation. The pair of magnet mounting holes 24*a* and 24*a* are formed in a substantially oblong shape in a cross-section in a direction parallel to the axis of rotation, and are arranged in the same plane so as to be adjacent to each other in the peripheral direction via a center rib 24*b*. In addition, this plane is orthogonal to a radial line which connects the center rib 24*b* and the axis of rotation. Each of the magnet mounting holes 24*a* and 24*a* is mounted with a substantially plate-like permanent magnet 12*a* which extends parallel to the axis of rotation.

All the permanent magnets 12*a* mounted on the magnet mounting holes 24*a*, ..., and 24*a*, respectively, are similarly magnetized in their thickness directions (that is, the radial direction of each of the rotors 11 and 12), and a pair of permanent magnets 12*a* and 12*a* mounted on a pair of magnet mounting holes 24*a* and 24*a* provided in the same outer magnet mounting portion 24 are set so that their magnetizing directions become the same direction. Also, for the outer magnet mounting portions 24 and 24 which are adjacent to each other in the peripheral direction in all the outer magnet mounting portions 24, ..., and 24, a pair of permanent magnets 12*a* and 12*a* mounted on one of the inner magnet mounting portions and a pair of permanent magnets 12*a* and 12*a* mounted on the other thereof are set so that their magnetizing directions become different directions. That is, an outer magnet mounting portion 24 mounted with one pair of permanent magnets 12*a* and 12*a* having S poles on their outer peripheral side is adjacent to an inner magnet mounting portion 24 mounted with one pair of permanent magnets 12*a* and 12*a* having N poles on their outer peripheral side, in the peripheral direction via the recessed groove 22*a*. From the above, the outer rotor 12 also includes a plurality of permanent magnets 12*a*, ..., and 12*a* which are arranged in the peripheral direction.

Also, each of the magnet mounting portions 23, ..., and 23 of the inner rotor 11 and each of the magnet mounting portions 24, ..., and 24 of the outer rotor 12 are arranged so as to face each other in the radial direction of each of the rotors 11 and 12. In this facing arrangement state, all the pairs of permanent magnets 11*a* and 11*a* are matched with any corresponding pairs of permanent magnets 12*a* and 12*a* on one-on-one level in phase of the direction of rotation. Further, even for each of the recessed grooves 21a, . . . , and 21a of the inner rotor 11, and each of the recessed grooves 22a, . . . , and 22a of the outer rotor 12, all the recessed grooves 21a, . . . , and 21a are matched with any corresponding recessed grooves 22a on one-on-one level in phase of the direction of rotation.

Figure 4:
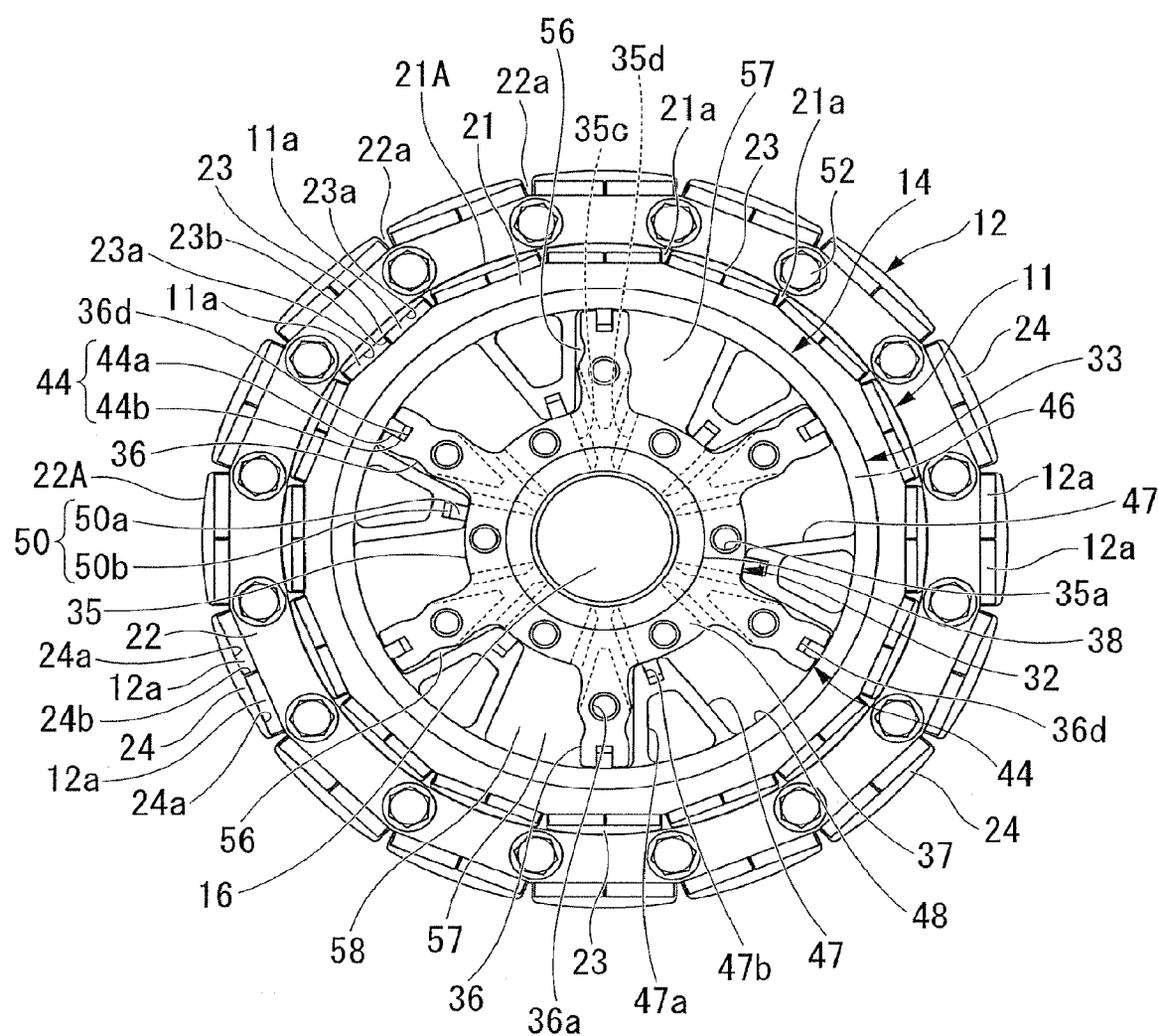
FIG. 4 is a front view showing a field-strengthening state of the inner rotor, outer rotor, and rotating mechanism of the motor, with a front drive plate omitted.

Thereby, the state of the motor 10 can be set to a proper state ranging from a field-weakening state shown in FIG. 2 where same magnetic poles of the permanent magnets 11a and 11a which makes a pair and the permanent magnets 12a and 12a which makes a pair are arranged to face each other (that is, the permanent magnets 11a and 11a which makes a pair and the permanent magnets 12a and 12a which makes a pair have an opposite pole arrangement) to a field-strengthening state shown in FIG. 4 where different magnetic poles of the permanent magnets 11a and 11a which makes a pair and the permanent magnets 12a and 12a which makes a pair are arranged to face each other (that is, the permanent magnets 11a and 11a which makes a pair and the permanent magnets 12a and 12a which makes a pair have the same pole arrangement), in all the permanent magnets 11a, . . . , and 11a of the inner rotor 11, and all the permanent magnets 12a, . . . , and 12a of the outer rotor 12, according to the relative positions of the inner rotor 11 and the outer rotor 12 around the axis of rotation.

Here, the stator 13 shown in FIG. 1 is formed in a substantially cylindrical shape that is arranged to face an outer peripheral portion of the outer rotor 12, and is fixed to, for example, a housing (not shown), etc. of a transmission of a vehicle.

Next, the rotating mechanism 14 which performs a change in relative phase between the inner rotor 11 and the outer rotor 12 as described above is explained.

The rotating mechanism 14 of this embodiment, as shown in FIGS. 1 and 3, has a pair of disk-shaped drive plates (end plates) 31 and 31 which are fixed so as to cover the space inside the outer rotor 12 on both axial sides of the outer rotor 12, a vane rotor (first member) 32 which is sandwiched by the drive plates 31 and 31 and thereby is integrally provided inside the outer rotor 12, and a housing (second member) 33 which is integrally fixed inside the inner rotor 11 and is arranged between the vane rotor 32, the outer rotor 12, and the drive plates 31 and 31, along with the inner rotor 11. The vane rotor 32 and the housing 33 are formed, for example, by sintering, etc.

In the pair of drive plates 31 and 31, a plurality of bolt insertion holes 31a, . . . , and 31a (having the same number as the screw holes 22b) which pass axially through each plate are formed at regular intervals on the same circumference of the plate, and an annular groove 31b, shown in the FIG. 1, which is recessed axially, is formed on one side inside the bolt insertion holes 31a, . . . , and 31a. Further, in the drive plate 31, a plurality of bolt insertion holes 31c, . . . , and 31c which pass axially through the plate are formed at regular intervals on the same circumference inside the annular groove 31b, and a plurality of bolt insertion holes 31d, . . . , and 31d, shown in FIG. 3, which pass axially through the plate, are formed by the same number as the insertion holes 31c, . . . , and 31c at regular intervals on the same circumference inside the insertion holes 31c, . . . , and 31c. Here, in all the bolt insertion holes 31c, . . . , and 31c, inside bolt insertion holes 31d are formed in middle positions between the bolt insertion holes 31c and 31c which are adjacent to each other in the peripheral direction. Moreover, a fitting hole 31e which passes axially through the plate is formed in the central position of the drive plate 31 further inside of the inside bolt insertion holes 31d . . . , and 31d.

The vane rotor 32 has a cylindrical boss 35, and a plurality of (of the same number as the aforementioned bolt insertion holes 31c (specifically, six)) impeller portions 36, . . . , and 36 which extend radially outward from equidistant positions in the peripheral direction on an outer peripheral surface of the boss 35.

The boss 35 is formed in the shape of a step having an outer nipping base portion 37 of the same axial length as the impeller portions 36, . . . , and 36, and a pair of cylindrical fitting portions 38 which protrude in axially opposite directions from the inner peripheral side of the nipping base portion 37. In the nipping base portion 37, a plurality of (of the same number as the aforementioned bolt insertion holes 31d) screw holes 35a which pass axially through the base portion are formed in middle positions between the impeller portions 36 and 36 which are adjacent to each other. Further, on the internal diameter side of the boss 35, a connecting spline 35b shown in FIG. 1 is formed on one axial side of the boss. On the other axial side of the boss, as shown in FIG. 2, passage holes 35c, . . . , and 35c which pass through the boss are formed on the same one side in the direction of the rotation of a base end of the impeller portion 36 nearest from the inner peripheral side of the position of each of the impeller portions 36 . . . , and 36, and passage holes 35d, . . . , and 35d which pass through the boss are formed on the same opposite side in the direction of the rotation of the base end of the impeller portion 36 nearest from the inner peripheral side of the position of each of the impeller portions 36 . . . , and 36 such that their axial positions are made different from one another as shown in FIG. 1.

On the internal diameter side of the vane rotor 32, an output shaft 16 to which the driving force of the outer rotor 12 is transmitted is attached. The output shaft 16 is provided with a connecting spline 16a coupled with the connecting spline 35b of the boss 35, an annular communication groove 16b which allows all the passage holes 35c of the boss 35 to communicate with one another in the state of being coupled by the connecting spline 16a, an annular communication groove 16c which allows all the passage holes 35d to communicate with one another in the same state, and seal grooves 16d, 16d, and 16d formed in the position between the communication grooves 16b and 16c and in both outside positions thereof, and seal rings (not shown) which seal the gaps with the vane rotor 32 are arranged in the seal grooves 16d, 16d, and 16d, respectively. Further, the output shaft 16 is formed with a passage hole 16e for supplying and discharging hydraulic oil to/from the communication groove 16b through the inside thereof, and a passage hole 16f for supplying and discharging hydraulic oil to/from the communication groove 16c. In addition, bearing fitting portions 16g into which a pair of bearings 42 and 42 held by, for example, a housing of a transmission of a vehicle is made to fit are respectively formed in the portions of the output shaft 16 which protrude further axially outward than the drive plates 31 and 31.

Each of the impeller portions 36, . . . , and 36 forms a substantially plate shape, and as shown in FIG. 2, a screw hole 36a which passes axially through the impeller portion is formed in an intermediate position of the impeller portion. Further, on both sides of the impeller portion in the peripheral direction, a pair of recessed portions 36b and 36b are formed on the outer peripheral side of the formation position of the screw hole 36a over the entire axial length, and a pair of recessed portions 36c and 36c are also formed inside the formation position of the screw hole 36a over the entire axial length. Moreover, on an outer peripheral surface of each of the impeller portions 36, . . . , and 36, a seal holding groove 36d which is recessed toward the center from the outer peripheral surface is formed over the entire axial length. Spring seals 44 which seal the gaps with the housing 33 are arranged in the seal holding portions 36*d*, . . . , and 36*d*, respectively. Each of the spring seals 44, . . . , and 44 is constituted by a seal 44*a* which is provided outside and comes into sliding contact with the housing 33, and a spring 44*b* which is provided inside and presses the seal 44*a* toward the housing 33 radially outward.

The housing 33 which is integrally fitted into the inner rotor 11 so as to have a predetermined phase relationship has a cylindrical base portion 46 with a small radial thickness, and protruding portions 47, . . . , and 47 which protrude radially inward from the equidistant positions in the peripheral direction on an inner peripheral surface of the base portion 46, and has the same number as the impeller portions 36. Here, as shown in FIG. 1, the base portion 46 protrudes over its entire periphery so as to be longer in axially opposite directions than the protruding portion 47. As shown in FIG. 2, each of the protruding portions 47, . . . , and 47 forms a tapered, substantially isosceles triangular shape as seen axially. Between the protruding portions 47 and 47 which are adjacent to each other in the peripheral direction in all the protruding portions 47, . . . , and 47, a concave portion 48 where the impeller portion 36 of the aforementioned vane rotor 32 can be arranged is formed. Each of the protruding portions 47, . . . , and 47 is formed with a pair of lightening holes 47*a* and 47*a* which are recessed with a predetermined equal depth from its both axial surfaces, and a seal holding groove 47*b* which is recessed toward the external diameter side is formed in an inner end surface of the protruding portion over the entire axial length. Spring seals 50 which seal the gaps with an outer peripheral surface of the boss 35 of the vane rotor 32 are arranged in the seal holding portions 47*b*, . . . , and 47*b*, respectively. The spring seals 50, . . . , and 50 are constituted by a seal 50*a* which is provided on the inner peripheral side and comes into sliding contact with the boss 35 of the vane rotor 32, and a seal spring 50*b* which is provided on the external diameter side and presses the seal 50*a* toward the vane rotor 32. In addition, the housing 33 may be integrally connected with the inner rotor 11 by fastening of bolts, etc.

In a case where the above respective parts are assembled, for example with the outer rotor 12 being matched with one drive plate 31, the bolts 52 are inserted into the bolt insertion holes 31*a*, . . . , and 31*a*, respectively, of the drive plate 31, and the bolts 52, . . . , and 52 are screwed to the screw holes 22*b*, respectively, of the outer rotor 12. Further, in a state where the vane rotor 32 is matched with the drive plate 31 by making one fitting portion 38 of the vane rotor fit into the fitting hole 31*e*, bolts (not shown) are inserted into bolt insertion holes 31*d*, . . . , and 31*d*, respectively, of the drive plate 31, and the bolts are screwed to the screw holes 35*a*, respectively, of the boss 35 of the vane rotor 32. Moreover, the bolts 54 are inserted into the bolt insertion holes 31*c*, . . . , and 31*c*, respectively, of the drive plate 31 and bolts 54, . . . , and 54 are screwed to the screw holes 36*a*, respectively, of the impeller portions 36 of the vane rotor 32. Also, by inserting the impeller portions 36, . . . , and 36 into the concave portions 48, respectively, on one-on-one level in a state where the spring seals 44 are attached to the impeller portions 36, . . . , and 36, respectively, of the vane rotor 32, the inner rotor 11 into which the housing 33 is press-fitted in advance is inserted in a state where the spring seals 50, . . . , and 50 are attached.

Also, in a state where the other drive plate 31 is matched from the opposite side by making the other fitting portion 38 of the vane rotor 32 fit into the fitting hole 31*e*, bolts 52 are inserted into the bolt insertion holes 31*a*, . . . , and 31*a*, respectively, of the drive plate 31, and the bolts 52, . . . , and 52 are screwed to the screw holes 22*b*, respectively, of the outer rotor 12. Further, bolts (not shown) are inserted into the bolt insertion holes 31*d*, . . . , and 31*d*, respectively, of the drive plate 31, and the bolts are screwed to the screw holes 35*a*, respectively, of the boss 35 of the vane rotor 32. Moreover, the bolts 54 are inserted into the bolt insertion holes 31*c*, . . . , and 31*c*, respectively, and the bolts 54, . . . , and 54 are screwed to the screw holes 36*a*, respectively, of the impeller portions 36 of the vane rotor 32. As a result, the drive plates 31 and 31 fixed to both axial end surfaces of the outer rotor 12 are integrally fixed by the impeller portions 36, . . . , and 36 of the vane rotor 32 and bolts 54, . . . , and 54, and are integrally fixed by the boss 35 and bolts (not shown). In addition, as the bolts 54, . . . , and 54 which fix the impeller portions 36, . . . , and 36 to the drive plate 31, ones which are fewer in number than and larger in size than the bolts 52, . . . , and 52 which fix the outer rotor 12 to the drive plate 31 are used.

Then, the output shaft 16 is fitted into the vane rotor 32. At that time, the connecting spline 16*a* and the connecting spline 35*b* are coupled together. As a result, the output shaft 16 is integrally fixed to the vane rotor 32. Of course, the above assembling procedure is an example, and assembling can also be made by a procedure different from the above.

From the above, the inner rotor 11 integrated with the housing 33 is provided in a space 58 between the drive plates 31 and 31 inside the outer rotor 12 and outside the vane rotor 32, and consequently, is rotatably held by both axial portions of the base portion 46 inserted into the annular grooves 31*b* and 31*b* of the drive plates 31 and 31. Moreover, the impeller portions 36 of the vane rotor 32 are arranged in the concave portions 48, . . . , and 48, respectively, of the housing 33 one by one. Further, the output shaft 16 spline-coupled with the vane rotor 32 becomes integral and rotatable with the outer rotor 12, the drive plates 31 and 31, and the vane rotor 32, and specifically is integrally fixed thereto.

Here, in a field-strengthening state where different poles of the permanent magnets 12*a*, . . . , and 12*a* of the outer rotor 12 and the permanent magnets 11*a*, . . . , and 11*a* of the inner rotor 11 are made to face each other, as shown in FIG. 4, each of all the impellers 36, . . . , and 36 abut on the protruding portion 47 which is adjacent to the impeller on the same one side in the direction of rotation within the corresponding concave portion 48, and consequently, forms a first pressure chamber 56 with the abutting protruding portion 47, and forms a second pressure chamber 57, which is wider than the first pressure chamber 56, with the protruding portion 47 which is adjacent to the impeller on the same opposite side in the direction of rotation (in other words, the first pressure chambers 56, . . . , and 56 and the second pressure chambers 57, . . . , and 57 are formed by the impellers 36, . . . , and 36 accommodated in the concave portions 48, . . . , and 48 and concave portions 48, . . . , and 48). As a result, the first pressure chambers 56, . . . , and 56 and the second pressure chambers 57, . . . , and 57 are defined inside the inner rotor 11.

On the contrary, in a field-weakening state where same poles of the permanent magnets 12*a*, . . . , and 12*a* of the outer rotor 12 and the permanent magnets 11*a*, . . . , and 11*a* of the inner rotor 11 are made to face each other, as shown in FIG. 2, each of all the impellers 36, . . . , and 36 abut on the protruding portion 47 which is adjacent to the impeller on the same opposite side in the direction of rotation within the corresponding concave portion 48, and consequently, reduces the second pressure chamber 57, and expand the first pressure chamber 56 with the protruding portion 47 which is adjacent to the impeller the same one side in the direction of rotation. In addition, the passage holes 35*c*, . . . , and 35*c* of the vane rotor 32 are provided in the first pressure chambers 56, . . . , and 56, respectively, so as to always open on one-on-one relation, and the passage holes 35d, . . . , and 35d of the vane rotor 32 are provided in the second pressure chambers 57, . . . , and 57, respectively, so as to always open on one-on-one relation.

Here, in the outer rotor 12 and the inner rotor 11, the field-strengthening position shown in the FIG. 4 which the permanent magnets 12a, . . . , and 12a and the permanent magnets 11a, . . . , and 11a face and attract each other with mutually different polarities is set to an origin position when the first pressure chambers 56, . . . , and 56 and the second pressure chambers 57, . . . , and 57 do not receive any hydraulic oil pressure substantially. In addition, the first pressure chambers 56, . . . , and 56 and the second pressure chambers 57, . . . , and 57 are also filled with hydraulic oil in a state where they do not receive any hydraulic oil pressure. Also, from the state of being in this origin position, when hydraulic oil is discharged via each of the passage holes 35d, . . . , and 35d from each of the second pressure chambers 57, . . . , and 57 simultaneously when hydraulic oil is introduced into each of the first pressure chambers 56, . . . , and 56 via each of the passage holes 35c, . . . , and 35c (that is, hydraulic oil is introduced into the first pressure chambers 56, . . . , and 56), the outer rotor 12 and the inner rotor 11 relatively rotate against a magnetic force, and are brought into a field-weakening state. On the contrary, when hydraulic oil is discharged via each of the passage holes 35c, . . . , and 35c from each of the first pressure chambers 56, . . . , and 56 simultaneously when hydraulic oil is introduced into each of the second pressure chambers 57, . . . , and 57 via each of the passage holes 35d, . . . , and 35d, the outer rotor 12 and the inner rotor 11 return to an origin position and are brought into a field-strengthening state. In this case, the permanent magnets 12a, . . . , and 12a of the outer rotor 12 and the permanent magnets 11a, . . . , and 11a of the inner rotor 11 attract each other by a magnetic force. Therefore, the pressure of the hydraulic oil introduced into each of the second pressure chambers 57, . . . , and 57 is only required to be lower than a pressure required in a case where phase is changed to the field-weakening state. In some cases, even if hydraulic pressure is not introduced, only the supply and discharge of hydraulic oil is required.

Further, in the motor 10, the rotational direction when the inner rotor 11 returns to an origin position from a weakening state where same polarities of the permanent magnets 12a, . . . , and 12a and the permanent magnets 11a, . . . , and 11a are made to face each other with respect to the outer rotor 12 is made to coincide with the direction of the moment of inertia caused during deceleration rotation. That is, the motor 10 is set so as to rotate the outer rotor 12 and the inner rotor 11 in the clockwise direction in FIGS. 2 and 4 during forward traveling of a vehicle, and when the outer rotor 12 decelerates from the field-weakening state shown in FIG. 2, the moment of inertia to return to a field-strengthening state shown in FIG. 4 is generated in the inner rotor 11 in a floating state.

Here, since hydraulic oil is incompressible, in not only the change of phase to both limit ends of the field-strengthening state and the field-weakening state as described above, even in an intermediate position between both the limit ends, a hydraulic controller (not shown) stops the supply and discharge of the hydraulic oil to/from all the first pressure chambers 56, . . . , and 56 and the second pressure chambers 57, . . . , and 57, for example, by shutoff of an opening and closing valve (not shown), whereby the outer rotor 12 and the inner rotor 11 maintains the phase relationship at that point of time. As a result, a phase change in an arbitrary field state can be stopped.

From the above, the aforementioned vane rotor 32 is integrally fixed to the outer rotor 12 and becomes integral and rotatable, and is arranged inside the inner rotor 11. Moreover, the vane rotor 32 is integrally fixed to the outer rotor 12 via the drive plates 31 and 31 fixed to the outer rotor 12 so as to cover both axial end surfaces of the outer rotor 12 and the inner rotor 11, and is integrally provided even in the output shaft 16 which outputs the driving force of the outer rotor 12. Further, the aforementioned housing 33 is integrally fitted to the inner rotor 11 and becomes integral and rotatable, and its concave portion 48 defines the first pressure chamber 56 and the second pressure chamber 57 inside the inner rotor 11 with the vane rotor 32. Moreover, by supply and discharge of hydraulic oil, i.e., by control of introduction of hydraulic oil pressure to/from the first pressure chamber 56 and the second pressure chamber 57, the relative phase of the vane rotor 32 to the housing 33 is changed. As a result, the relative phase between the inner rotor 11 and the outer rotor 12 is changed. Here, the relative phase between the inner rotor 11 and the outer rotor 12 can be changed to advance side or retard side by an electrical angle of 180°, and the state of the motor 10 can be set to a proper state between a field-weakening state where the same magnetic poles of the permanent magnets 11a of the inner rotor 11 and the permanent magnets 12a of the outer rotor 12 are arranged to face each other and a field-strengthening state where different magnetic poles of the permanent magnets 11a of the inner rotor 11 and the permanent magnets 12a of the outer rotor 12 are arranged to face each other.

In addition, the integrated inner rotor 11 and housing 33 are arranged so as to be rotatable in the peripheral direction in the space 58 shown in the FIG. 2 between the outer rotor 12, the vane rotor 32, and both the drive plates 31 and 31, which is formed as the drive plates 31 which transmit the driving force of the outer rotor 12 to the output shaft 16 are fixed to both axial end surfaces, respectively, of the outer rotor 12 and the vane rotor 32. In addition, an integrated article of the inner rotor 11 and the housing 33 is rotatably provided in a floating state within the space 58 (that is, the integrated article is not fixed to the drive plates 31 and 31 and the output shaft 16).

Figure 5A:
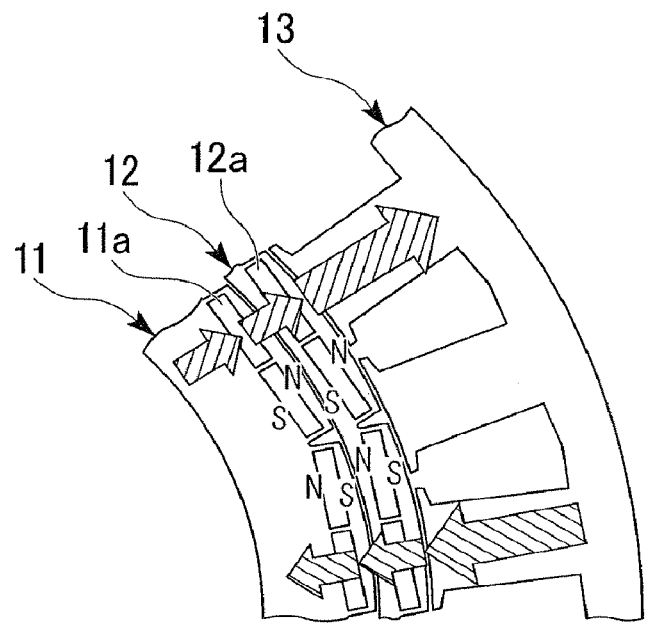
FIG. 5A is a view schematically showing a field-strengthening state where permanent magnets of the inner rotor and permanent magnets of the outer rotor have a same pole arrangement.
Figure 5B:
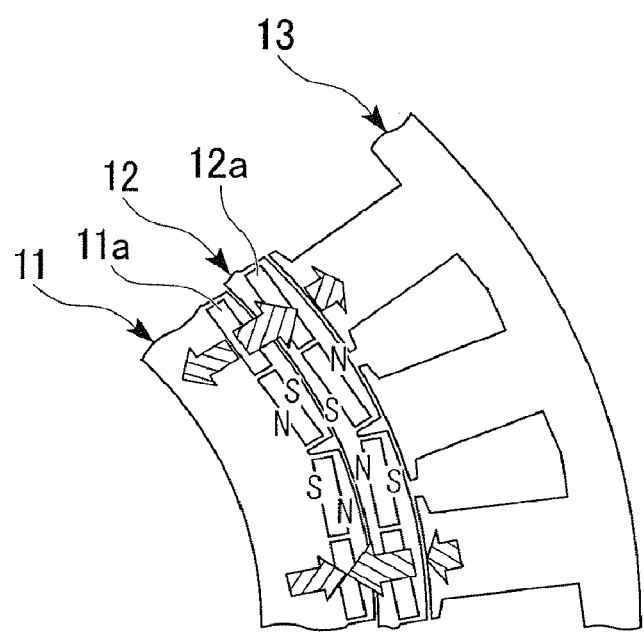
FIG. 5B is a view schematically showing a field-weakening state where permanent magnets of the inner rotor and permanent magnets of the outer rotor have an opposite pole arrangement.
Figure 6:
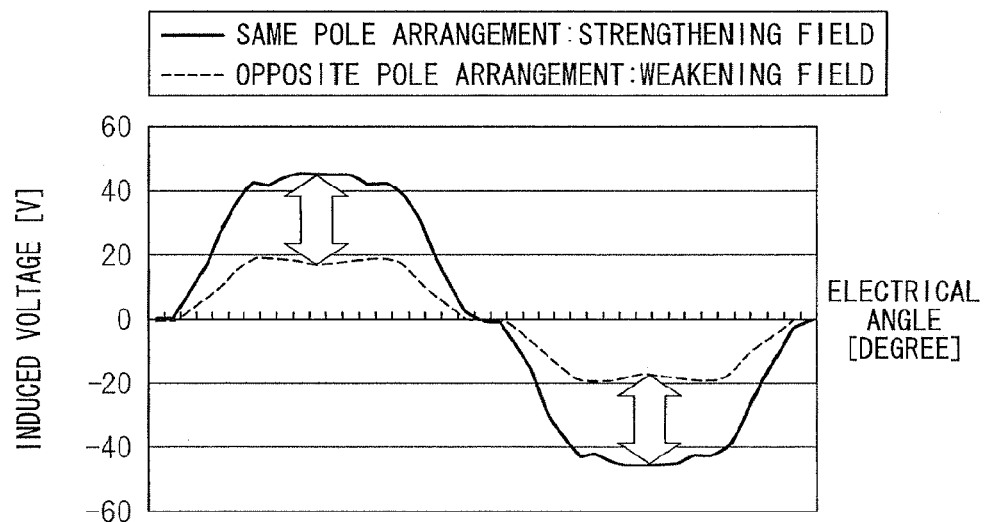
FIG. 6 is a graph showing an induced voltage in the field-strengthening state and the field-weakening state shown in FIGS. 5A and 5B.

In addition, in the field-strengthening state where the permanent magnets 11a of the inner rotor 11 and the permanent magnets 12a of the outer rotor 12 have a same pole arrangement as shown in, for example, FIG. 5A, and in the field-weakening state where the permanent magnets 11a of the inner rotor 11 and the permanent magnets 12a of the outer rotor 12 have an opposite pole arrangement as shown in, for example, FIG. 5B, the intensity of an induced voltage changes as shown in, for example, FIG. 6. Therefore, an induced voltage constant Ke is changed by changing the state of the motor 10 between the field-strengthening state and the field-weakening state.

The induced voltage constant Ke is, for example, a rotational frequency ratio of an induced voltage induced by winding ends of the stator windings 13a by the rotation of each of the rotors 11 and 12, and can be described as $Ke = 8 \times p \times R \times L \times B \times T \times \pi$ by the product of the number of pole pairs p, the external diameter of a motor R, motor stacking thickness L, magnetic flux density B, and the number of turns T. Thereby, by changing the state of the motor 10 between the field-strengthening state and the field-weakening state, the intensity of the magnetic flux density B of a field flux by the permanent magnets 11a of the inner rotor 11 and the permanent magnets 12a of the outer rotor 12 changes, and the induced voltage constant Ke is changed.

Figure 7A:
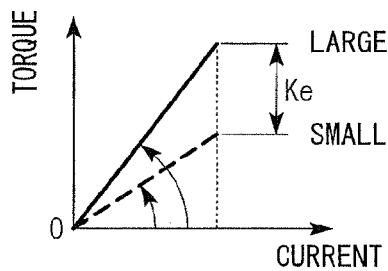
FIG. 7A is a graph showing the relationship between the current and torque of the motor which change according to an induced voltage constant Ke.
Figure 7B:
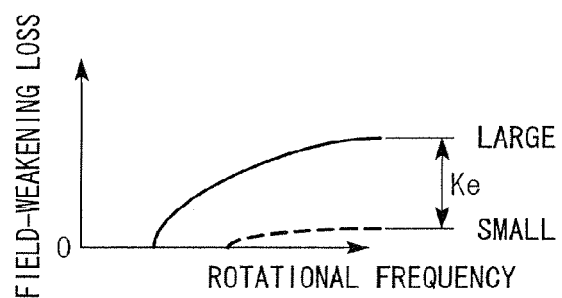
FIG. 7B is a graph showing the relationship between the rotational frequency and field-weakening loss of the motor which change according to an induced voltage constant Ke.

Here, as shown in, for example, FIG. 7A, the torque of the motor 10 is proportional to the product of the induced voltage constant Ke and a current applied to the stator windings 13a (Torque ∝ (Ke×Current)). Further, as shown in, for example, FIG. 7B, the field-weakening loss of the motor 10 is proportional to the product of the induced voltage constant Ke and a rotational frequency (Field-weakening loss ∝ (Ke×Rotational frequency)). Therefore, the allowable rotational frequency of the motor 10 is proportional to an inverse number of the product of the induced voltage constant Ke and the rotational frequency (Allowable rotational frequency ∝ (1/(Ke×Rotational frequency))).

Figure 8:
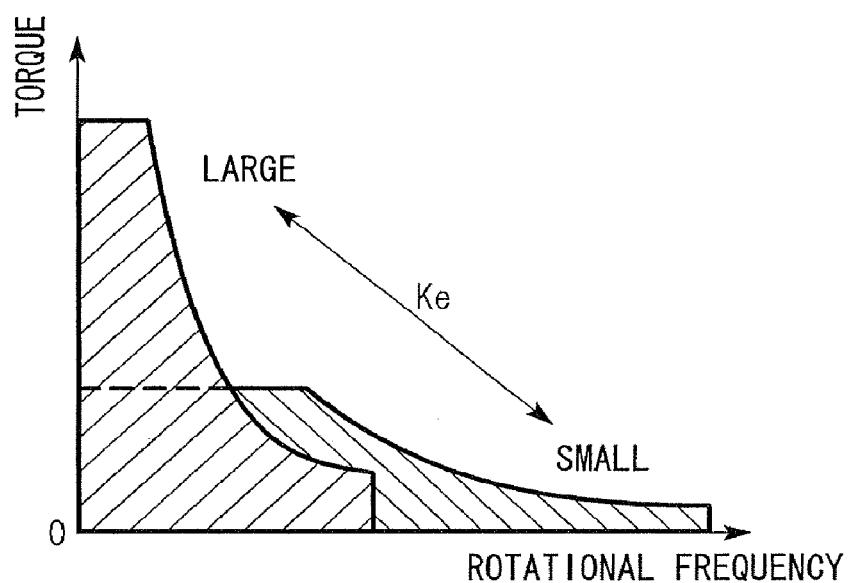
FIG. 8 is a view showing an operational region relevant to the rotational frequency and torque of the motor which change according to the induced voltage constant Ke.
Figure 9A:
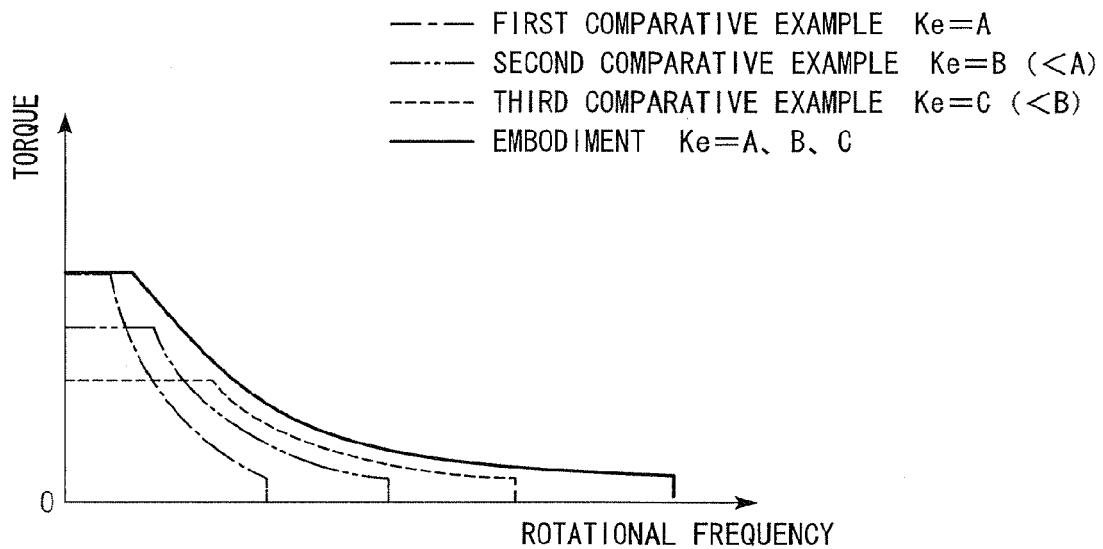
FIG. 9A is a graph showing the relationship between the rotational frequency and torque of the motor which change according to an induced voltage constant Ke.
Figure 9B:
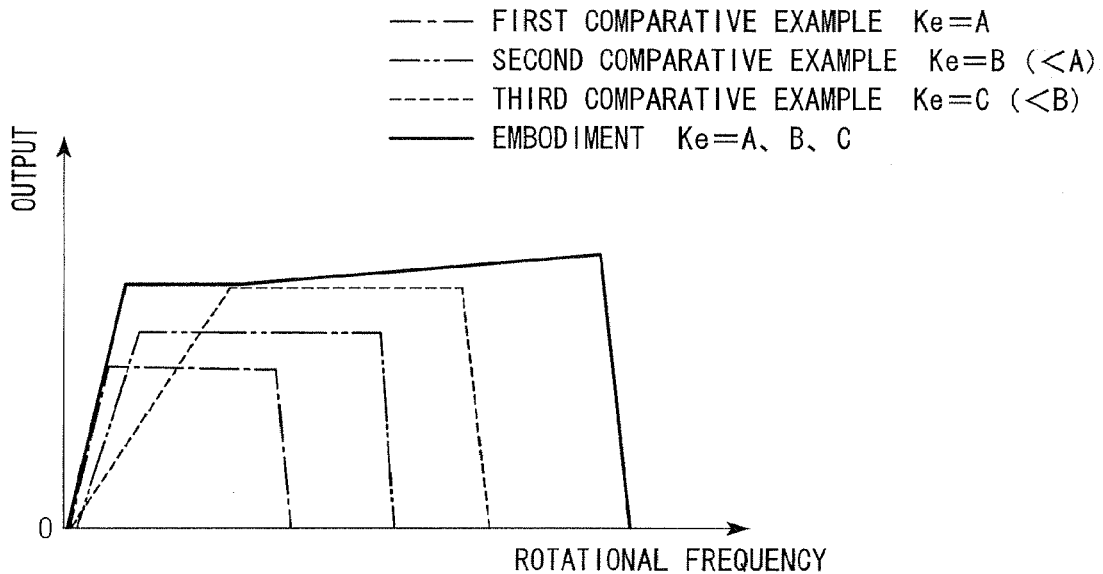
FIG. 9B is a graph showing the relationship between the rotational frequency and output of the motor which change according to an induced voltage constant Ke.
Figure 10A:
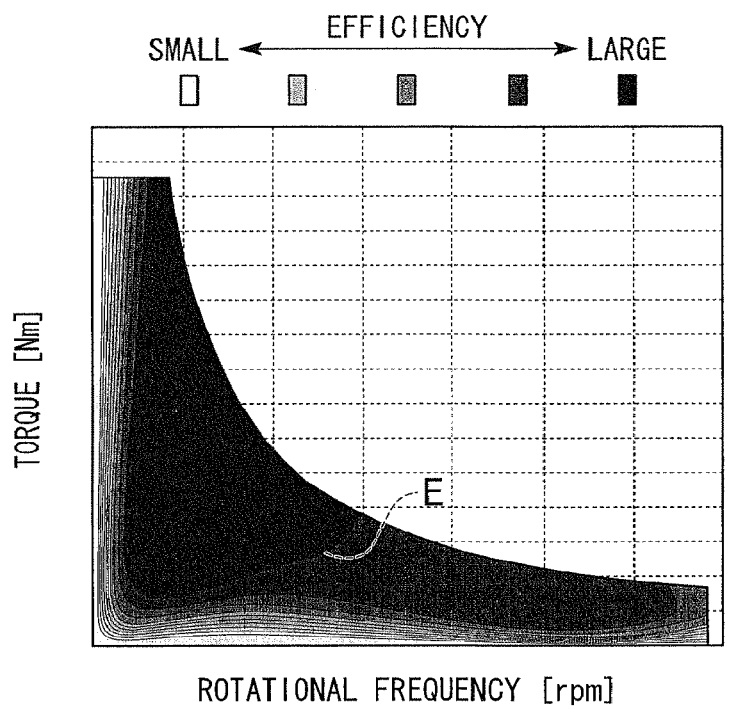
FIG. 10A is a view showing an operational region and efficiency distribution relevant to the rotational frequency and torque of the motor which change according to the induced voltage constant Ke in the embodiment.
Figure 10B:
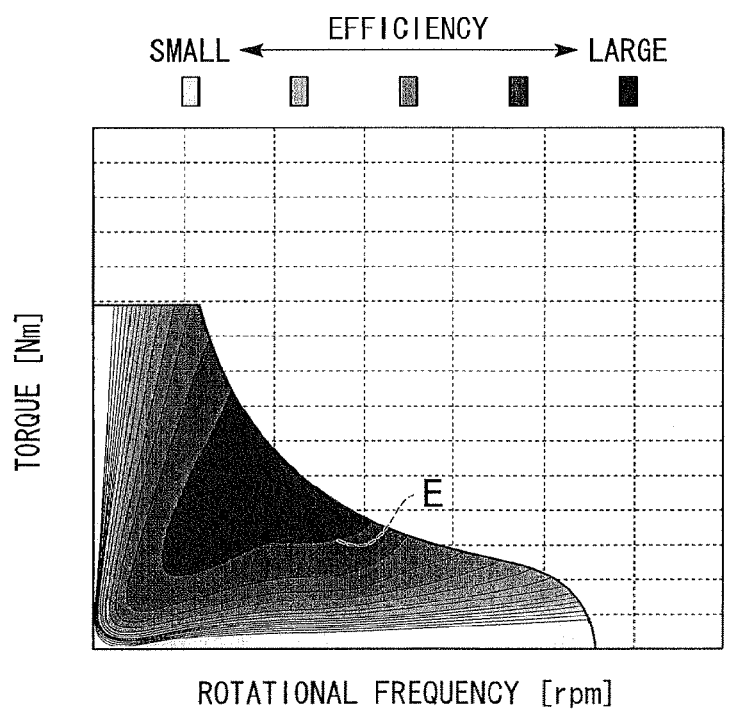
FIG. 10B is a view showing an operational region and efficiency distribution relevant to the rotational frequency and torque of the motor which change according to the induced voltage constant Ke in a second comparative embodiment.

That is, as shown in, for example, FIG. 8, in the motor 10 in which the induced voltage constant Ke is relatively large, an operational rotational frequency falls relatively, but it is possible to output a relatively large torque. On the other hand, in the motor 10 in which the induced voltage constant Ke is relatively small, the torque which can be output falls relatively, but the operation to a relatively high rotational frequency becomes possible. As a result, an operational region relevant to a torque and a rotational frequency changes according to the induced voltage constant Ke. For this reason, like an embodiment shown in, for example, FIG. 9A, by making a setting so that the induced voltage constant Ke may change to a falling tendency as the rotational frequency of the motor 10 increases (for example, sequential change to A, B (<A), and C (<B)), an operational region relevant to a torque and a rotational frequency is expanded, compared with a case (for example, the first to third comparative examples) where the induced voltage constant Ke is not changed.

Further, the output of the motor 10 is proportional to a value which is obtained by subtracting the field-weakening loss and other losses from the product of the induced voltage constant Ke, a current applied to the stator windings 13a, and a rotational frequency (Output ∝ (Ke×Current×Rotational frequency−Field-weakening loss−Other losses)). That is, as shown in, for example, FIG. 9B, in the motor 10 in which the induced voltage constant Ke is relatively large, an operational rotational frequency falls relatively, but the output in a relatively low rotational frequency region increases. On the other hand, in the motor 10 in which the induced voltage constant Ke is relatively small, the output in a relatively low rotational frequency region decreases, but the operation to a relatively high rotational frequency becomes possible, and the output at a relatively high rotational frequency increases. As a result, an operational region relevant to an output and a rotational frequency changes according to the induced voltage constant Ke. For this reason, by making a setting so that the induced voltage constant Ke may change to a falling tendency as the rotational frequency of the motor 10 increases (for example, sequential change to A, B (<A), and C (<B)), an operational region relevant to an output and a rotational frequency is expanded, compared with a case (for example, the first to third comparative examples) where the induced voltage constant Ke is not changed.

Further, the efficiency of the motor 10 is proportional to a value which is obtained by subtracting a copper loss, the field-weakening loss, and other losses from the input power to the stator windings 13a (Efficiency ∝ (Input power−Copper loss−Field-weakening loss−Other losses)/Input power)). For this reason, by selecting a relatively large induced voltage constant Ke in a relatively low rotational frequency region to a middle rotational frequency region, the current which is required to output a desired torque decreases, and the copper loss decreases.

Also, by selecting a relatively small induced voltage constant Ke in the middle rotational frequency region to a relatively high rotational frequency region, a field-weakening current decreases, and the field-weakening loss decreases. Thereby, like an embodiment shown in, for example, FIG. 10A, by making a setting so that the induced voltage constant Ke may change to a falling tendency as the rotational frequency of the motor 10 increases, an operational region relevant to a rotational frequency and a rotational frequency is expanded, an efficient region E where the efficiency of the motor 10 becomes a predetermined efficiency or more is expanded, and the value of maximum efficiency which is reachable increases, compared with a case (for example, the second comparative example shown in FIG. 10B) where the induced voltage constant Ke is not changed.

As described above, according to this embodiment, first, the permanent magnets 11a and the permanent magnets 12a are arranged in the peripheral direction in the inner rotor 11 and the outer rotor 12. Thereby, for example, the amount of interlinking magnetic fields that the field fluxes generated by the permanent magnets 12a of the outer rotor 12 interlink the stator windings 13a can be efficiently increased or reduced by the field fluxes generated by the permanent magnets 11a of the inner rotor 11. Also, in the field-strengthening state, the torque constant (that is, torque/phase current) of the motor 10 can be set to a relatively high value. The maximum value of the torque output by the motor 10 can be increased without reducing a current loss during the operation of the motor or without changing the maximum value of the output current of an inverter (not shown) which controls application of a current to the stator windings 13a.

Moreover, the rotating mechanism 14 supplies and discharges hydraulic oil to/from the first pressure chambers 56, . . . , and 56 and the second pressure chambers 57, . . . , and 57 which are defined inside the inner rotor 11 by the vane rotor 32 integrally and rotatably provided with respect to the outer rotor 12 and by the housing 33 integrally and rotatably provided with respect to the inner rotor 11, thereby changing the relative phase between the inner rotor 11 and the outer rotor 12. Therefore, it is possible to make an induced voltage constant variable easily and properly and with desired timing while suppressing complication of the motor 10. As a result, it is possible to expand an operational rotational frequency range and torque range, improve operating efficiency, and expand an operational range at high efficiency.

Moreover, by controlling the amount of supply of hydraulic oil to the first pressure chambers 56, . . . , and 56 and the second pressure chambers 57, . . . , and 57, the relative phase between the inner rotor 11 and the outer rotor 12 can be changed without steps within a range of an electrical angle of 180° between a field-weakening state and a field-strengthening state. In addition, since the vane rotor 32 and the housing 33 define the first pressure chambers 56, . . . , and 56 and the second pressure chambers 57, . . . , and 57 inside the inner rotor 11, particularly an increase in axial thickness of the motor 10 can be suppressed, and the motor can be miniaturized. Specifically, if hydraulic oil is discharged from the second pressure chambers 57, . . . , and 57 while the hydraulic oil is supplied to the first pressure chambers 56, . . . , and 56 defined by the impeller portions 36, . . . , 36 of the vane rotor 32 and the concave portions 48, . . . , and 48 of the housing 33, the relative phase between the housing 33 and the vane rotor 32 changes in a direction in which the first pressure chambers 56, . . . , and 56 are expanded. As a result, the relative phase between the inner rotor 11 integrally provided outside the housing 33 and the outer rotor 12 integrally provided in the vane rotor 32 is changed, which brings about a field-weakening state. On the other hand, if hydraulic oil is discharged from the first pressure chambers 56, . . . , and 56 while the hydraulic oil is supplied to the second pressure chambers 57, . . . , and 57, the relative phase between the housing 33 and the vane rotor 32 is changed in a direction in which the second pressure chambers 57, . . . , and 57 are expanded. As a result, the relative phase between the inner rotor 11 and the outer rotor 12 is changed, which brings about a field-strengthening state. As described above, a simple vane actuator mechanism having the vane rotor 32 and the housing 33 is used as the rotating mechanism 14. Therefore, it is possible to make an induced voltage constant variable easily and properly and with desired timing while suppressing complication of the motor 10.

In addition, since the vane rotor 32 is integrally provided in the outer rotor 12 via the drive plates 31 and 31 fixed to the outer rotor 12 so as to cover the axial end surfaces, and is also integrally provided in the output shaft 16 which outputs the driving force of the outer rotor 12, the rotation of the outer rotor 12 can be transmitted to the output shaft 16 by direct coupling, while the pressure of the hydraulic oil introduced into the first pressure chambers 56, . . . , and 56 and the second pressure chambers 57, . . . , and 57 is mainly used for change of the relative phase between the housing 33 which is integrally provided inside the inner rotor 11 and the vane rotor 32, i.e., the relative phase between the inner rotor 11 and the outer rotor 12. Accordingly, the pressure which is required to be generated by the hydraulic oil can be suppressed low.

Moreover, since hydraulic oil is supplied to and discharged from the first pressure chambers 56, . . . , and 56 and the second pressure chambers 57, . . . , and 57 via the vane rotor 32, an increase in axial thickness accompanying formation of flow passages for hydraulic oil can be suppressed. In addition, since the first pressure chambers 56, . . . , and 56 and the second pressure chambers 57, . . . , and 57 are defined by the housing 33 press-fitted into the inner rotor 11, the hydraulic oil of the first pressure chambers 56, . . . , and 56 and the second pressure chambers 57, . . . , and 57 draws the heat of the inner rotor 11 via the housing 33, thereby cooling the inner rotor 11. Moreover, the hydraulic oil of the first pressure chambers 56, . . . , and 56 and the second pressure chambers 57, . . . , and 57 is going to move to the outside by the centrifugal force generated by the rotation of the outer rotor 12 and the inner rotor 11. As a result, if a special seal structure is not adopted, the hydraulic oil will leak to the outside via a gap between the pair of drive plates 31 and 31, and the housing 33, the inner rotor 11 and the outer rotor 12. However, during this passage through the gap, the hydraulic oil draws heat from the inner rotor 11 and the outer rotor 12, thereby cooling the rotors. Moreover, the leaked hydraulic oil is also applied to mainly the stator windings 13a of the stator 13 by its centrifugal force, thereby cooling the stator Second Embodiment Next, for a motor according to a second embodiment of the invention, different portions from the above first embodiment are described mainly with reference to FIGS. 11 and 12. In addition, the same reference numerals are given to the same portions as the above first embodiment, and the description thereof is omitted.

Figure 11:
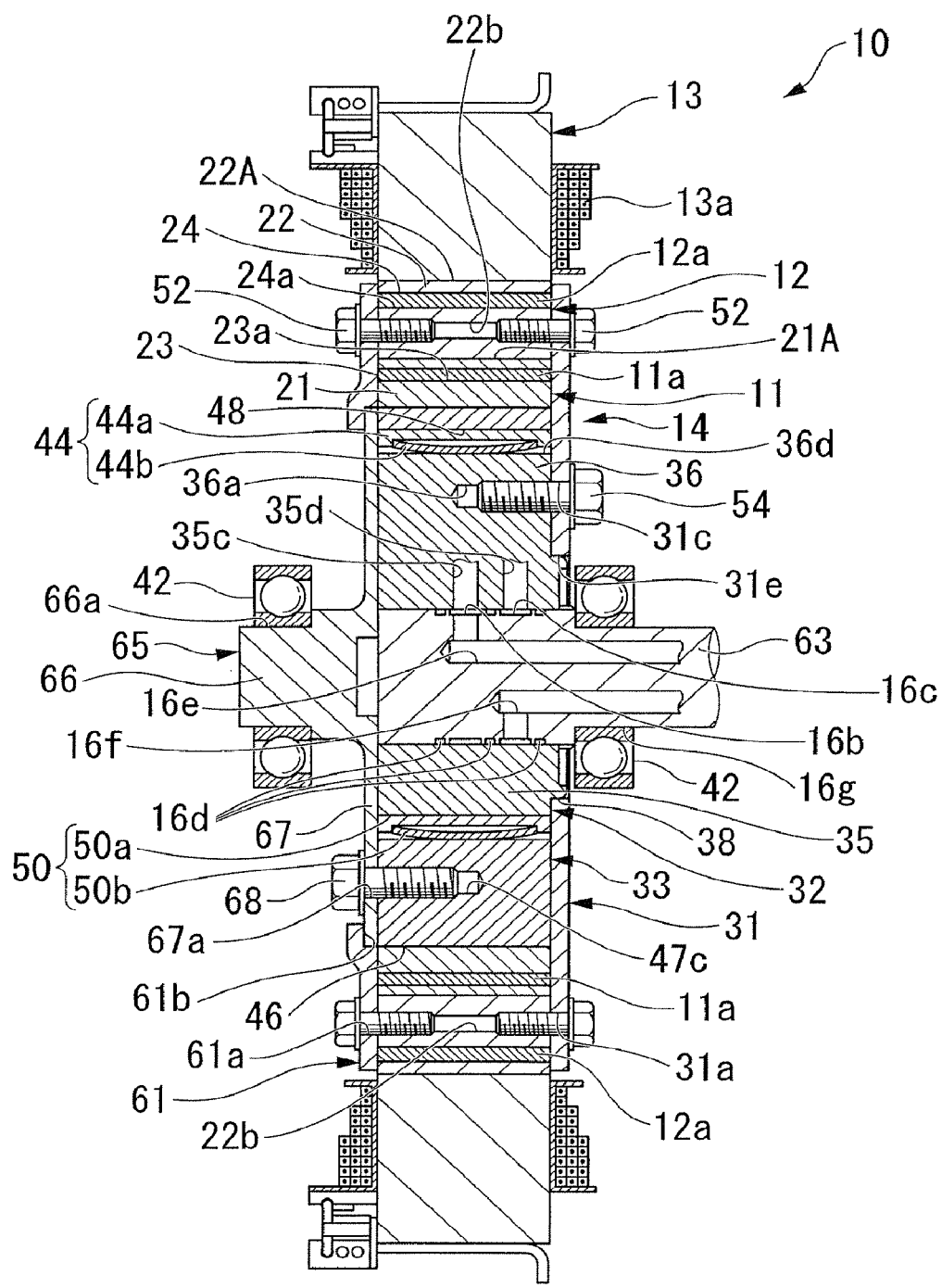
FIG. 11 is a sectional view of principal parts showing a motor according to a second embodiment of the invention.

In this embodiment, a portion of the rotating mechanism 14 in the above first embodiment is altered. First, as shown in FIG. 11, one drive plate 31, similarly to the above first embodiment, is fixed to the outer rotor 12 with by the bolts 52, . . . , and 52, is fixed to the boss 35 of the vane rotor 32 by bolts (not shown), and is fixed to the impeller portions 36 of the vane rotor 32 by the bolts 54.

On the other hand, an annular drive plate 61 is arranged axially opposite the drive plate 31 so as to cover the outer rotor 12 and an outer peripheral portion of an inner rotor 76. In the drive plate 61, bolt insertion holes 61a, . . . , and 61a which pass axially through the drive plate are formed by the same number as the screw holes 22b at regular intervals on the same circumference, and an inner peripheral edge of the drive plate is formed with an annular stepped portion 61b which forms a stepped shape. The drive plate 61 is integrally and rotatably fixed to the outer rotor 12 as the bolts 52 are inserted into the bolt insertion holes 61a, . . . , and 61a, respectively, and the bolts 52, . . . , and 52 are screwed to the screw holes 22b, respectively, of the outer rotor 12.

The vane rotor 32 of this embodiment is different from the vane rotor 32 of the above first embodiment in that the screw holes 36a, . . . , and 36a formed in the impeller portions 36, . . . , and 36, respectively, are formed from the end surface of the vane rotor on the side of one drive plate 31 to its intermediate position, and any of the screw holes does not pass through the impeller portion 36, and the vane rotor 32 is integrally provided in the outer rotor 12 via the drive plate 31 fixed to the outer rotor 12 so as to cover one axial end surface. Further, a hydraulic pressure introduction shaft 63 in which the same communication grooves 16b and 16c, the seal grooves 16d, 16d, and 16d, the passage holes 16e and 16f, and one bearing fitting portion 16g as the output shaft 16 of the aforementioned first embodiment are formed is fitted on the internal diameter side of the vane rotor 32 of this embodiment. The hydraulic pressure introduction shaft 63 does not protrude from the vane rotor 32 toward the drive plate 61.

Figure 12:
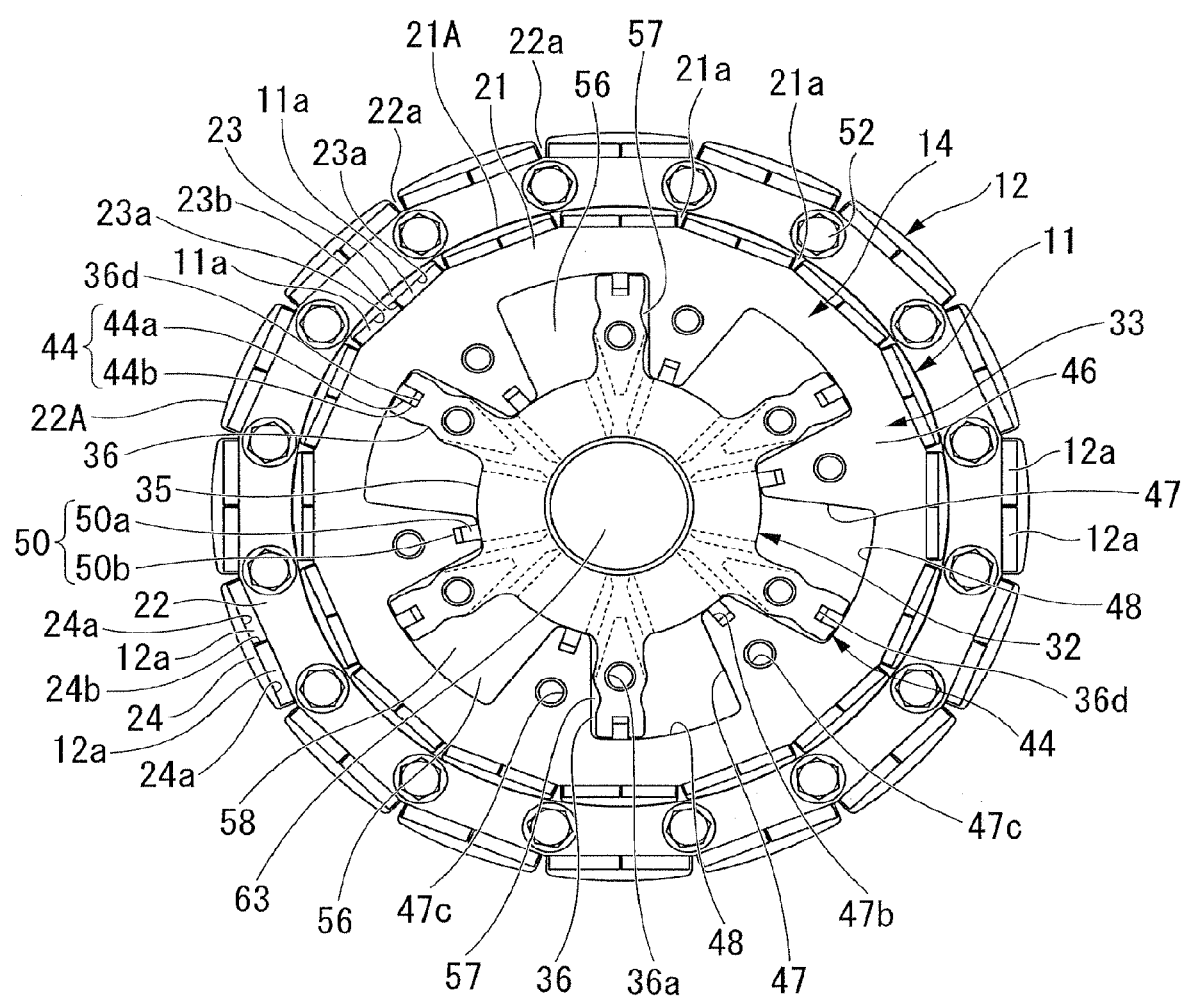
FIG. 12 is a front view showing a field-weakening state of an inner rotor, an outer rotor, and a rotating mechanism of the motor, with a front drive plate omitted.

In the housing 33 of this embodiment, as shown in FIG. 12, each of the protruding portions 47, . . . , and 47 is not formed with the lightening holes 47a and 47a of the above first embodiment. In each of the protruding portions 47, . . . , and 47, a screw hole 47c is formed along the axial direction from the end surface of the housing opposite one drive plate 31 to its intermediate position as shown in FIG. 11.

In this embodiment, an output shaft (rotating shaft) 65 is integrally and rotatably provided in the housing 33 integrally press-fitted into not the vane rotor 32 but the inner rotor 11. That is, the output shaft 65 has a shaft portion 66, and a disk-like flange portion 67 which extends radially from one end of the shaft portion 66. In the flange portion 67, bolt insertion holes 67a, . . . , and 67a which pass axially through the flange portion are formed by the same number as the screw holes 47c, . . . , and 47c at regular intervals on the same circumference. Also, the output shaft 65 is fixed to the housing 33 by screwing the bolt 68 inserted into each of the bolt insertion holes 67a, . . . , and 67a to the screw hole 47c in a state where an outer peripheral edge of the flange portion 67 is inserted into a gap between the stepped portion 61b of the drive plate 61, and the housing 33. In addition, the shaft portion 66 of the output shaft 65 is formed with a bearing fitting portion 66a which allows a bearing 42 to fit thereto. Thereby, the output shaft 65 which outputs the driving force of the outer rotor 12 is integrally provided in the inner rotor 11 and the housing 33 from the other axial side opposite the drive plate 31.

According to the embodiment, the vane rotor 32 is integrally provided in the outer rotor 12 via the drive plate 31 fixed to the outer rotor 12 so as to cover one axial end surface, and the output shaft 65 which outputs the driving force of the outer rotor 12 is integrally provided in the inner rotor 11 and the housing 33 from the other axial side, the driving force is transmitted via the hydraulic oil of the first pressure chambers 56, . . . , and 56 or the second pressure chambers 57, . . . , and 57, between the outer rotor 12 and the output shaft 72. Since the driving force is transmitted via the hydraulic oil in this way, the vibration to be generated can be absorbed by the hydraulic oil, and silence can be improved. In addition, the pressure of hydraulic oil required at this time becomes a resultant force of the torque of the motor 10, and the torque required to change the phases of the inner rotor 11 and the outer rotor 12.

Third Embodiment

Figure 13:
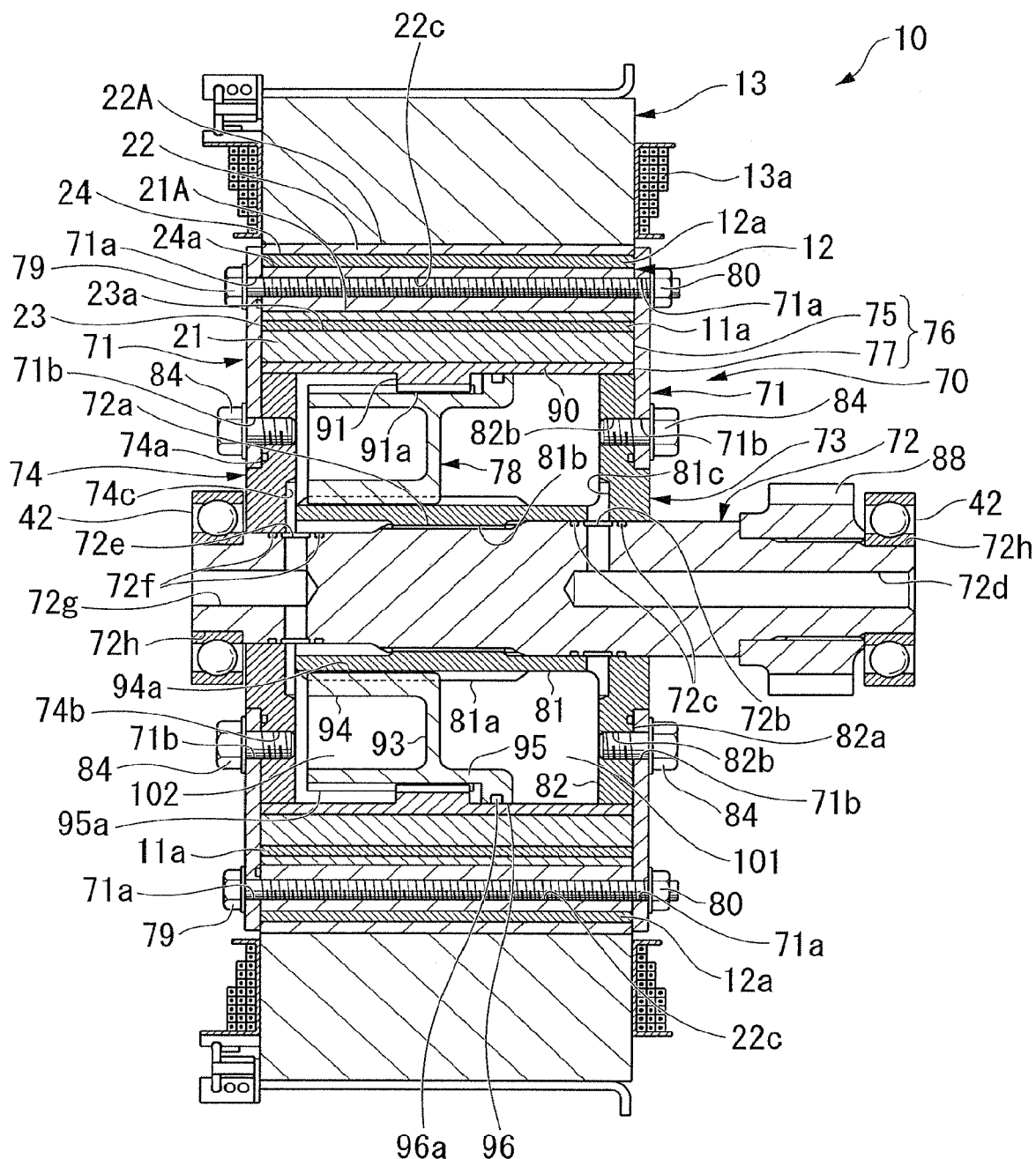
FIG. 13 is a sectional view of principal parts showing a field-weakening state of an inner rotor, an outer rotor, and a rotating mechanism of a motor according to a third embodiment of the invention.

Next, for a motor according to a third embodiment of the invention, different portions from the above first embodiment are described mainly with reference to FIG. 13. In addition, the same reference numerals are given to the same portions as the above first embodiment, and the description thereof will be omitted.

In this embodiment, a rotating mechanism 70 which is different from the above first embodiment is used. The rotating mechanism 70 of this embodiment has a pair of annular drive plates (first member) 71 and 71 which are fixed on both axial sides of the outer rotor 12 so as to cover a space inside the outer rotor 12, a supporting member 73 which is integrally provided in one drive plate 71 and is supported by an output shaft 72 of the motor 10, a supporting member (first member, drive plate) 74 which is integrally provided in the other drive plate 71 and is supported by the output shaft 72, an inner rotor body 75 with the same configuration as the inner rotor 11 of the above first embodiment, an inside member 77 which is integrally press-fitted inside the inner rotor body 75 and constitutes an inner rotor 76 with the inner rotor body 75, and a ring gear (second member) 78 which is arranged between the inside member 77 and the supporting members 73 and 74.

In the outer rotor 12, bolt insertion holes 22c, . . . , and 22c are formed in the same positions as the screw holes 22b, . . . , and 22b of the above first embodiment.

In the pair of drive plates 71 and 71, a plurality of bolt insertion holes 71a, . . . , and 71a (having the same number as the screw holes 22c) which pass axially through each plate are formed at regular intervals on the same circumference of the plate, and a plurality of bolt insertion holes 71b, . . . , and 71b, are also formed closer to the center than the bolt insertion holes 71a, . . . , and 71a. The pair of drive plates 71 and 71 are fixed to the outer rotor 12 by bolts 79 inserted into the bolt insertion holes 71a of one drive plate 71, the bolt insertion holes 22c, and the bolt insertion holes 71a of the other drive plate 71, and nuts 80 screwed to the bolts 79, in a state where they are matched with both axial sides of the outer rotor 12.

One supporting member 73 has a cylindrical portion (rotating shaft) 81, and a flange portion (first member, drive plate) 82 which extends in the shape of a disk radially outward from one axial side of the cylindrical portion 81, and an annular stepped portion 82a which forms a stepped shape is formed on the side of the cylindrical portion 81 in the axial direction on the outer peripheral side of the flange portion 82. Further, in the position of the stepped portion 82a, a plurality of (of the same number as the bolt insertion holes 71b) screw holes 82b which pass axially through the stepped portion are formed at regular intervals on the same circumference. Further, a helical spline 81a is formed on the outer peripheral side of the cylindrical portion 81 of the supporting member 73, and a connecting spline 81b is formed on the inner peripheral side thereof. Moreover, a plurality of passage holes 81c, . . . , and 81c which pass radially through the inner and outer peripheries of the supporting member are radially foamed so as to partially extend to the flange portion 82 in the boundary position of the cylindrical portion 81 with the flange portion 82. Such a supporting member 73 is matched with the inside of one drive plate 71 in the stepped portion 82a, and in this state, is fixed to one drive plate 71 as bolts 84 inserted into the bolt insertion holes 71b, . . . , and 71b are screwed to the screw holes 82b, respectively.

The other supporting member 74 forms an annular shape, and an annular stepped portion 74a which forms a stepped shape in the axial direction is formed on the outer peripheral side of the supporting member. Further, in the position of the stepped portion 74a, a plurality of (of the same number as the bolt insertion holes 71b) screw holes 74b which pass axially through the stepped portion are formed at regular intervals on the same circumference. Further, a plurality of half-hole shaped passage grooves 74c, . . . , and 74c which extends radially by scraping a portion from the inner outer side are radially formed in the end surface of the supporting member 74 opposite the stepped portion 74a. Such a supporting member 74 is matched with the inside of the other drive plate 71 in the stepped portion 74a, and in this state, is fixed to the other drive plate 71 as the bolts 84 inserted into bolt insertion holes 71b, . . . , and 71b are screwed to the screw holes 84b, respectively. In addition, the supporting member 74 in its attachment state abuts on a tip surface of the cylindrical portion 81 of the supporting member 73.

The output shaft 72 of the motor 10 is attached to the internal diameter side of the aforementioned supporting member 73 and supporting member 74. The output shaft 72 is provided with a connecting spline 72a coupled with the connecting spline 81b of the supporting member 73, an annular communication groove 72b which allows all the passage holes 81c, . . . , and 81c of the supporting member 73 to communicate with one another in the state of being coupled with the supporting member 73 by the connecting spline 72a, seal grooves 72c and 72c formed in both outside positions of the communication groove 72b, and a passage hole 72d for supplying and discharging hydraulic oil to/from the communication groove 72b through the inside, and seal rings (not shown) which seal the gaps with the supporting member 73 are arranged in the seal grooves 72c and 72c, respectively.

Further, the output shaft 72 is provided with an annular communication groove 72e which allows all the passage holes 74c, . . . , and 74c of the supporting member 74 to communicate with one another in the state of being coupled with the supporting member 73 by the connecting spline 72a, seal grooves 72f and 72f formed on both sides of the communication groove 72e, and a passage hole 72g for supplying and discharging hydraulic oil to/from the communication groove 72e through the inside, and seal rings (not shown) which seal the gaps with the supporting member 74 are arranged in the seal grooves 72f and 72f, respectively. In addition, the passage holes 72d and 72g formed in the output shaft 72 are opened to axially opposite sides of the output shaft 72.

In addition, in the output shaft 72, bearing fitting portions 72h and 72h which allows bearings 42 to fit thereto, respectively, are formed in both portions which protrude further axially outward than the supporting member 73 and the supporting member 74, and a gear 88 which transmits torque is spline-coupled with the axial inside of one bearing fitting portion 72h.

The inside member 77 which is integrally press-fitted into the inside of the inner rotor body 75 has a cylindrical base portion 90 with a small radial thickness, and an annular protruding portion 91 which protrudes toward the central axis from an axial intermediate position on an inner peripheral surface of the base portion 90. A helical spline 91a which is twisted in an opposite direction to the aforementioned helical spline 81a is formed in an inner peripheral surface of the annular protruding portion 91.

A ring gear 78 has an annular substrate portion 93, an inner cylindrical portion 94 to which protrudes toward one axial side from an inner peripheral portion of the substrate portion 93, an outer cylindrical portion 95 which protrudes toward both axial sides from an outer peripheral portion of the substrate portion 93, and an annular protruding portion 96 which annularly protrudes radially outward from the axial end of the outer cylindrical portion 95 opposite the inner cylindrical portion 94. Also, an inner peripheral surface of the inner cylindrical portion 94 is formed with a helical spline 94a which is slidably coupled with the helical spline 81a of the aforementioned supporting member 73, and an outer peripheral surface of the outer cylindrical portion 95 is formed with a helical spline 95a which is slidably coupled with the helical spline 91a of the aforementioned inside member 77. Moreover, an outer peripheral surface of the annular protruding portion 96 is formed with an annular seal groove 96a which is recessed toward the center, and a seal ring (not shown) which seals the gap with the inside member 77 is arranged in the seal groove 96a.

Also, a first pressure chamber 101 which hydraulic oil is supplied to/from via the passage hole 72d and communication groove 72b of the output shaft 72, and the passage holes 81c, . . . , and 81c of the supporting member 73 is formed between the ring gear 78, and the flange portion 82 of the supporting member 73, and a second pressure chamber 102 which hydraulic oil is supplied to/from via the passage hole 72g and communication groove 72e of the output shaft 72, and the passage holes 74c, . . . , and 74c of the supporting member 74 is formed between the ring gear 78 and the supporting member 74. The first pressure chamber 101 and the second pressure chamber 102 are defined inside the inner rotor 76. In addition, the first pressure chamber 101 and the second pressure chamber 102 are also filled with hydraulic oil in a state where even they do not receive any hydraulic oil pressure.

Here, in this embodiment, if hydraulic oil is discharged from the second pressure chamber 102 simultaneously when hydraulic oil is introduced into the first pressure chamber 101, the ring gear 78 abuts on a stopper portion (not shown) of the supporting member 74, and consequently, makes the second pressure chamber 102 narrow and makes the first pressure chamber 101 wide. In this case, for example, the permanent magnets 12a of the outer rotor 12 and the permanent magnets 11a of the inner rotor 76 will be brought into a field-weakening state. On the other hand, if hydraulic oil is discharged from the first pressure chamber 101 simultaneously when hydraulic oil is introduced into the second pressure chamber 102, the ring gear 78 moves axially and abuts on the flange portion 82 of the supporting member 73, and consequently, makes the first pressure chamber 101 narrow and makes the second pressure chamber 102 wide. In this case, while the ring gear 78 rotates with respect to the cylindrical portion 81 of the supporting member 73 integral with the outer rotor 12 and the output shaft 72 by the twist of the helical splines 81a and 94a which mesh with each other, the inner rotor 76 is further rotated in the same direction by the twist of the helical splines 95a and 91a which mesh with each other. Thereby, for example, the permanent magnets 12a of the outer rotor 12 and the permanent magnets 11a of the inner rotor 76 will be brought into a field-strengthening state as the phase of an electric angle of 180° is changed with respect to the field-weakening state. In this case, the permanent magnets 12a of the outer rotor 12 and the permanent magnets 11a of the inner rotor 76 will attract each other by a magnetic force. As a result, the pressure of the hydraulic oil introduced into each of the second pressure chambers 102, . . . , and 102 is only required to be lower than a pressure required in a case where phase is changed to a field-weakening state. In some cases, even if hydraulic pressure is not introduced, only the supply and discharge of hydraulic oil is required. As described above, the relative phase between the inner rotor 76 and the outer rotor 12 is changed by the supply and discharge of hydraulic oil to the first pressure chamber 101 and the second pressure chamber 102. Here, even in this embodiment, even in not only the change of phase to both limit ends as described above, but in an intermediate position between both the limit ends, a hydraulic controller (not shown) stops the supply and discharge of the hydraulic oil to/from the first pressure chamber 101 and the second pressure chamber 102, for example, by shutoff of an opening and closing valve (not shown), whereby the outer rotor 12 and the inner rotor 76 maintains the phase relationship at that point of time.

From the above, the drive plates 71 and 71 and the supporting members 73 and 74 are integral and rotatable with respect to the outer rotor 12, and are integrally provided in the outer rotor 12 and the output shaft 72 so as to cover both end surfaces of the inner rotor 76 and the outer rotor 12, thereby transmitting torque to the output shaft 72. Further, the ring gear 78 is arranged between the inner rotor 76, and the cylindrical portion 81 of the supporting member 73, and is connected with the helical spline 81a of the cylindrical portion 81 and the helical spline 91a of the inner rotor 76 by the helical splines 94a and 95a. Moreover, the ring gear 78 defines the first pressure chamber 101 and the second pressure chamber 102 inside the inner rotor 76 by the drive plates 71 and 71 and the supporting members 73 and 74, and moves axially by the supply and discharge of hydraulic oil to the first pressure chamber 101 and the second pressure chamber 102. That is, the ring gear 78 is integrally and rotatably connected with the inner rotor 76, and is able to move axially, thereby rotating relatively.

In this embodiment described above, the rotating mechanism 70 supplies and discharges hydraulic oil to/from the first pressure chamber 101 and the second pressure chamber 102 which are defined inside the inner rotor 76 by the drive plates 71 and 71 and supporting members 73 and 74 integrally and rotatably provided with respect to the outer rotor 12 to transmit driving force and by the ring gear 78 integrally and rotatably provided with respect to the inner rotor 76, thereby changing the relative phase between the inner rotor 76 and the outer rotor 12. Therefore, it is possible to make an induced voltage constant variable easily and properly and with desired timing while suppressing complication of the motor 10. As a result, it is possible to expand an operational rotational frequency range and torque range, improve operating efficiency, and expand an operational range at high efficiency.

Moreover, by controlling the amount of supply of hydraulic oil to the first pressure chamber 101 and the second pressure chamber 102, the relative phase between the inner rotor 76 and the outer rotor 12 can be changed without steps within a range of an electrical angle of 180° between a field-weakening state and a field-strengthening state. In addition, since the drive plates 71 and 71 and the supporting members 73 and 74, and the ring gear 78 define the first pressure chamber 101 and the second pressure chamber 102 inside the inner rotor 76, particularly an increase in axial thickness of the motor can be suppressed, and the motor can be miniaturized.

If hydraulic oil is supplied and discharged to/from the first pressure chamber 101 and the second pressure chamber 102 which are formed by the drive plates 71 and 71 and the supporting members 73 and 74, and the ring gear 78, the ring gear 78 move axially relative to the drive plates 71 and 71, the supporting members 73 and 74, and the outer rotor 12. However, the ring gear 78 is arranged between the cylindrical portion 81 of the supporting member 73 and the inner rotor 76, and is connected with the helical spline 81a of the cylindrical portion 81 and the helical spline 91a of the inner rotor 76 by the helical splines 94a and 95a. Therefore, the relative phase between the inner rotor 76, and the output shaft 72, the drive plates 71 and 71, the supporting members 73 and 74, or the outer rotor 12 is changed by axial movement. As such, a simple actuator mechanism which axially moves the ring gear 78 having the helical splines 94a and 95a is used as the rotating mechanism 70. Therefore, it is possible to make an induced voltage constant variable easily and properly and with desired timing while suppressing complication of the motor 10.

Fourth Embodiment

Figure 14:
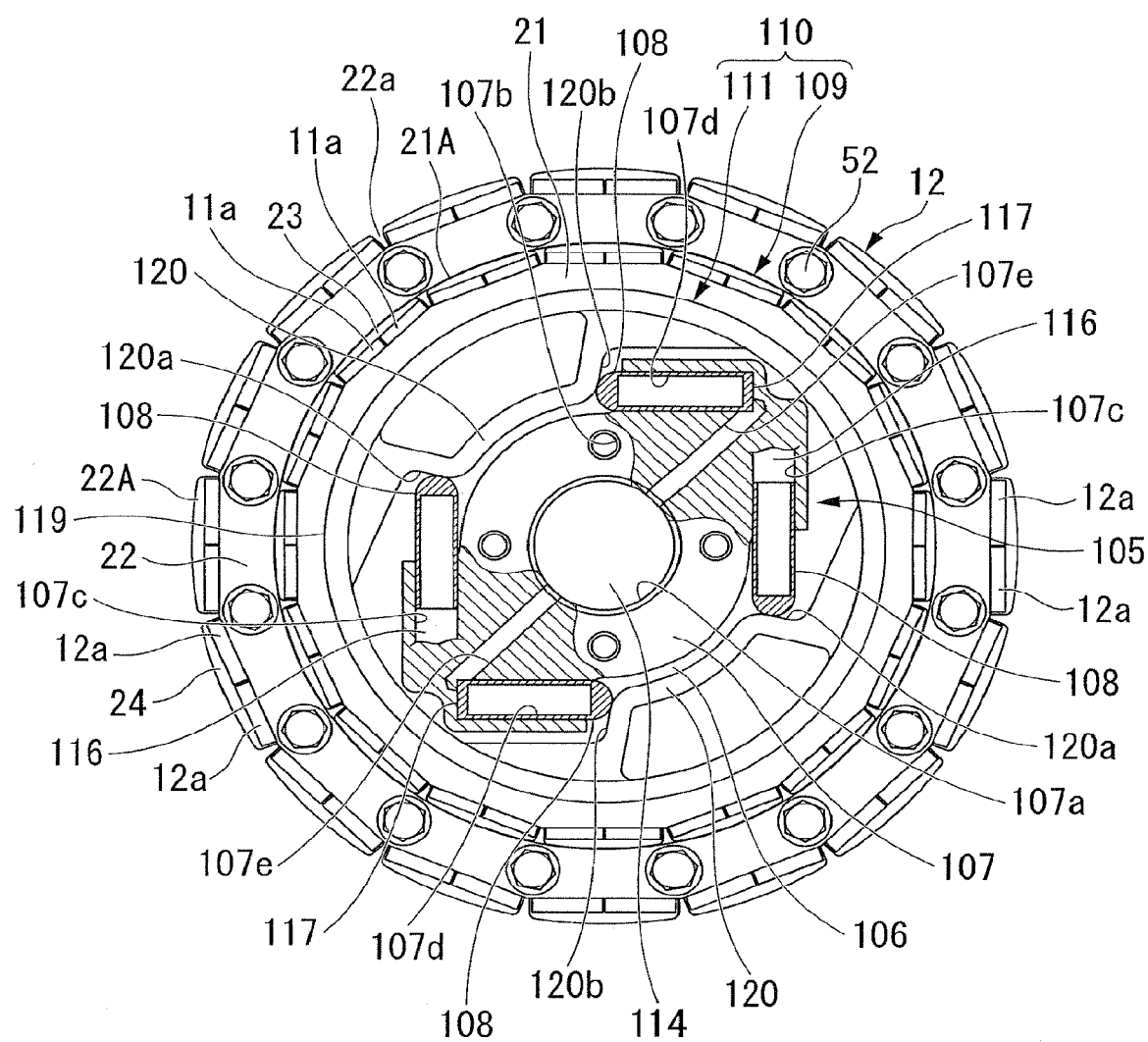
FIG. 14 is a sectional view of principal parts showing a field-weakening state of an inner rotor, an outer rotor, and a rotating mechanism of a motor according to a fourth embodiment of the invention, with a front drive plate omitted.

Next, for a motor according to a fourth embodiment of the invention, different portions from the above first embodiment are described mainly with reference to FIG. 14. In addition, the same reference numerals are given to the same portions as the above first embodiment, and the description thereof is omitted.

In this embodiment, a rotating mechanism 105 which is different from the above first embodiment is also used. The rotating mechanism 105 of this embodiment has a pair of annular drive plates 106 which are integrally and rotatably fixed on both axial sides of the outer rotor 12 (only one is shown in FIG. 14), a housing (first member) 107 which is integrally and rotatably fixed between the drive plates 106, a plurality of pistons (second member) 108, . . . , and 108 (specifically four) which are slidably supported by the housing 107, an inner rotor body 109 with the same configuration as the inner rotor 11 of the above first embodiment, and an inside member 111 which is integrally press-fitted inside the inner rotor body 109 and constitutes an inner rotor 110 with the inner rotor body 109.

In the housing 107, an attaching hole 107a for attaching an output shaft (rotating shaft) 114 is formed in the center of the housing so as to pass therethrough, and a plurality of screw holes 107b, . . . , and 107b for bolting the drive plates 106 are formed at regular intervals on the same circumference around the attaching hole 107a. Here, the aforementioned output shaft 114 is integrally connected with the attaching hole 107a by spline coupling, and thereby, the housing 107 is integrally provided in the outer rotor 12 and the output shaft 114 to which the driving force of the outer rotor 12 is transmitted.

Further, in the housing 107, a pair of holes 107c and 107d are formed along the direction orthogonal to the axis of the attaching hole 107a so as to become parallel to a pair of axes, respectively, which are orthogonal to each other, and two pairs of such holes 107c and 107d are formed in positions symmetrical with respect to the attaching hole 107a. Further, in the housing 107, passage holes (not shown) which respectively communicate with bottom sides of the holes 107c and 107c opened to the same one side in the direction of rotation in the respective pairs, and passage holes 107e and 107e which respectively communicate with bottom sides of the holes 107d and 107d opened to the same opposite side in the respective pairs are formed from the attaching hole 107a, and the communication holes 107e and 107e and communication holes (not shown) communicate with individual communication grooves and individual passage holes, which are not shown, of the output shaft 114.

Also, the above pistons 108 are slidably fitted into the holes 107c, 107c, 107d, and 107d, respectively, which are formed in the housing 107. The piston 108 inserted into each of the holes 107c and 107c opened to the same side in the direction of rotation defines a first pressure chamber 116, which communicates with a passage hole (not shown), with the hole 107c, and the piston 108 inserted into each of the holes 107d and 107d opened to the same opposite side in the direction of rotation defines a second pressure chamber 117, which communicates with the passage hole 107e, with the hole 107d. In addition, the first pressure chambers 116 and 116 and the second pressure chambers 117, and 117 are also filled with hydraulic oil in a state where they do not receive any hydraulic oil pressure.

The inside member 111 has a cylindrical base portion 119 which is fitted inside the inner rotor body 109, and a pair of protruding portions 120 and 120 which protrude toward the center from inner peripheral opposed positions of the base portion 119. Each of the protruding portions 120 and 120 is formed with a wall surface 120a on which the piston 108 inserted into the facing hole 107c is made to abut, and a wall surface 120b on which the piston 108 inserted into the facing hole 107d is made to abut. All the pistons 108, . . . , 108 become integral and rotatable with respect to the inner rotor 110 in a state where they abut on the facing wall surfaces 120a and 120b.

Here, in this embodiment, if hydraulic oil is discharged from the second pressure chambers 117 and 117 simultaneously when hydraulic oil is introduced into the first pressure chambers 116 and 116, the second pressure chambers 117 and 117 are made narrow, and the first pressure chambers 116 and 116 are made wide. As a result, the pistons 108 and 108 which define the first pressure chambers 116 and 116, and are provided in the holes 107c and 107c which are directed to the same one side in the direction of rotation press the wall surfaces 120a and 120a of the inner rotor 110, and the pistons 108 and 108 which define the second pressure chambers 117 and 117, and are provided in the holes 107d and 107d which are directed to the same opposite side in the direction of rotation release the pressing to the wall surfaces 120b and 120b of the inner rotor 111. Consequently, the inner rotor 110 is rotated relative to the outer rotor 12. In this case, for example, the permanent magnets 12a of the outer rotor 12 and the permanent magnets 11b of the inner rotor 110 will be brought into a field-weakening state.

On the other hand, if hydraulic oil is discharged from the first pressure chambers 116 and 116 simultaneously when hydraulic oil is introduced into the second pressure chambers 117 and 117, the first pressure chambers 116 and 116 are made narrow, and the second pressure chambers 117 and 117 are made wide. As a result, the pistons 108 and 108 which define the second pressure chambers 117 and 117, and are provided in the holes 107d and 107d which are directed to the same one side in the direction of rotation press the wall surfaces 120b and 120b of the inner rotor 110, and the pistons 108 and 108 which define the first pressure chambers 116 and 116, and are provided in the holes 107c and 107c which are directed to the same opposite side in the direction of rotation release the pressing to the wall surfaces 120a and 120a of the inner rotor 111. Consequently, the inner rotor 110 is rotated relative to the outer rotor 12 contrary to the above. Thereby, for example, the permanent magnets 12a of the outer rotor 12 and the permanent magnets 11a of the inner rotor 110 will be brought into a field-strengthening state as the phase of an electric angle of 180° is changed with respect to the field-weakening state. In this case, the permanent magnets 12a of the outer rotor 12 and the permanent magnets 11a of the inner rotor 110 will attract each other by a magnetic force. As a result, the pressure of the hydraulic oil introduced into each of the second pressure chambers 117, . . . , and 117 is only required to be lower than a pressure required in a case where phase is changed to a field-weakening state. In some cases, even if hydraulic pressure is not introduced, only the supply and discharge of hydraulic oil is required. From the above, the relative phase between the inner rotor 110 and the outer rotor 12 is changed by the supply and discharge of hydraulic oil to the first pressure chambers 116 and 116 and the second pressure chambers 117 and 117. Here, in this embodiment, even in not only the change of phase to both limit ends as described above, but in an intermediate position between both the limit ends, a hydraulic controller (not shown) stops the supply and discharge of the hydraulic oil to/from the first pressure chambers 116 and 116 and the second pressure chambers 117 and 117, for example, by shutoff of an opening and closing valve (not shown), whereby the outer rotor 12 and the inner rotor 110 maintains the phase relationship at that point of time.

The housing 107 is integral and rotatable with respect to the outer rotor 12, and is integrally provided in the outer rotor 12, and the output shaft 114 to which the driving force of the outer rotor 12 is transmitted. Further, the piston 108 is integrally and rotatably provided with respect to the inner rotor 110, and is inserted into the hole 107c or hole 107d formed in the housing 107 to define the first pressure chamber 116 or the second pressure chamber 117 inside the inner rotor 110, and abuts on the wall surface 120a or wall surface 120b of the inner rotor 110.

In this embodiment described above, the rotating mechanism 105 supplies and discharges hydraulic oil to/from the first pressure chambers 116 and 116 and the second pressure chambers 117 and 117 which are defined inside the inner rotor 110 by the housing 107 integrally and rotatably provided with respect to the outer rotor 12 and by the pistons 108, . . . , and 108 integrally and rotatably provided with respect to the inner rotor 110, thereby changing the relative phase between the inner rotor 110 and the outer rotor 12. Therefore, it is possible to make an induced voltage constant variable easily and properly and with desired timing while suppressing complication of the motor 10. As a result, it is possible to expand an operational rotational frequency range and torque range, improve operating efficiency, and expand an operational range at high efficiency.

Moreover, by controlling the amount of supply of hydraulic oil to the first pressure chambers 116 and 116 and the second pressure chambers 117 and 117, the relative phase between the inner rotor 110 and the outer rotor 12 can be changed without steps within a range of an electrical angle of 180° between a field-weakening state and a field-strengthening state. In addition, since the vane rotor 107 and the piston 108 define the first pressure chambers 116 and 116 and the second pressure chambers 117 and 117 inside the inner rotor 110, particularly an increase in axial thickness of the motor can be suppressed, and the motor can be miniaturized.

Further, if hydraulic oil is supplied and discharged to/from the first pressure chambers 116 and 116 and the second pressure chambers 117 and 117 which are formed by the housing 107 and the pistons 108, the protruding amount of the pistons 108 and 108 which define the first pressure chambers 116 and 116 increases, or contrary to this, the protruding amount of the pistons 108 and 108 which define the second pressure chambers 117 and 117 increases. As a result, the relative phase between the inner rotor 110 which makes the pistons 108, . . . , and 108 to abut on the wall surfaces 120a and 120a or the wall surfaces 120b and 120b, and the housing 107, the outer rotor 12 and the output shaft 114 which are provided integrally is changed. As such, a simple actuator having the pistons 108, . . . , and 108 is used as the rotating mechanism 105. Therefore, it is possible to make an induced voltage constant variable easily and properly and with desired timing while suppressing complication of the motor 10.

In addition, other various rotating mechanisms can be applied as the rotating mechanism if they can change the relative phase relative between the inner rotor 11 and the outer rotor 12 by rotating at least one of the inner rotor 11 and the outer rotor 12 around the axis of rotation depending on working fluid pressure.

As described above, the motor of the invention offers the following features.

(1) In a motor (for example, the motor 10 in the embodiment) including an inner rotor (for example, the inner rotor 11 in the embodiment) having inner permanent magnets (for example, the inner permanent magnets 11a in the embodiment) arranged in a peripheral direction and an outer rotor (for example, the outer rotor 12 in the embodiment) having outer permanent magnets (for example, the outer permanent magnets 12a in the embodiment) arranged in the peripheral direction, the mutual axes of rotation of the inner and outer rotors being arranged coaxially, and a rotating means (for example, the rotating mechanism 14, 70, or 105 in the embodiment) capable of making at least one of the inner rotor and the outer rotor rotate around the axes of rotation to change the relative phase between the inner rotor and the outer rotor, the rotating device includes a first member (for example, the vane rotor 32, the drive plate 71, the supporting member 74, the flange portion 82, or the housing 107 in the embodiment) which is integrally and rotatably provided with respect to the outer rotor, for example, in a state of being fixed or connected to or abutting on the outer rotor, and a second member (for example, the housing 33, the ring gear 78, or the piston 108 in the embodiment) which is integrally and rotatably provided with respect to the inner rotor, for example, in a state of being fixed or connected to or abutting on the inner rotor and which defines pressure chambers (for example, the first pressure chamber 56, 101, or 116 and the second pressure chamber 57, 102, or 117 in the embodiment) inside the inner rotor with the first member, and a working fluid is supplied to the pressure chambers to change the relative phase between the inner rotor and the outer rotor.

According to the motor, the permanent magnets are arranged in the peripheral direction in the inner rotor and the outer rotor. Thereby, for example, the amount of interlinking magnetic fields that the field fluxes generated by the permanent magnets of the outer rotor interlink the stator windings can be efficiently increased or reduced by the field fluxes generated by the permanent magnets of the inner rotor. Also, in the field-strengthening state, the torque constant (that is, torque/phase current) of the motor can be set to a relatively high value. The maximum value of the torque output by the motor can be increased without reducing a current loss during the operation of the motor or without changing the maximum value of the output current of an inverter (not shown) which controls application of a current to the stator windings.

Moreover, the rotating mechanism supplies a working fluid to the pressure chambers which are defined inside the inner rotor by the first member integrally and rotatably provided with respect to the outer rotor and by the second member integrally and rotatably provided with respect to the inner rotor, thereby changing the relative phase between the inner rotor and the outer rotor. Therefore, it is possible to make an induced voltage constant variable easily and properly and with desired timing while suppressing complication of the motor. As a result, it is possible to expand an operational rotational frequency range and torque range, improve operating efficiency, and expand an operational range at high efficiency. Moreover, the relative phase between the inner rotor and the outer rotor can be set to a desired phase by controlling the amount of supply of the working fluid to the pressure chambers. In addition, since the first member and the second member define the pressure chambers inside the inner rotor, particularly an increase in axial thickness of the motor can be suppressed, and the motor can be miniaturized.

(2) In the above (1), a configuration in which the first member is a vane rotor (for example, the vane rotor 32 in the embodiment) which is arranged inside the inner rotor, and is integrally provided in the outer rotor, and the second member is a housing (for example, the housing 33 in the embodiment) having concave portions (for example, the concave portions 48 in the embodiment) which rotatably accommodate impeller portions (for example, the impeller portions 36 in the embodiment) of the vane rotor and which defines the pressure chambers (for example, the first pressure chamber 56 and the second pressure chamber 57 in the embodiment) with the vane rotor, and is integrally provided inside the inner rotor may be adopted.

In this case, if a working fluid is supplied to the pressure chambers defined by the impeller portions of the vane rotor which is a first member and the concave portions of the housing which is a second member, the relative phase between the housing and the vane rotor changes in a direction in which the pressure chambers are expanded. As a result, the relative phase between the inner rotor integrally provided outside the housing and the outer rotor integrally provided in the vane rotor is changed. As such, a simple vane actuator mechanism having the vane rotor and the housing is used as the rotating device. Therefore, it is possible to make an induced voltage constant variable easily and properly and with desired timing while suppressing complication of the motor.

(3) In the above (2), a configuration in which the vane rotor is integrally provided in the outer rotor via end plates (for example, the drive plates 31 in the embodiment) fixed to the outer rotor so as to cover axial end surfaces, and is integrally provided even in a rotating shaft (for example, the output shaft 16 in the embodiment) to which the driving force of the outer rotor is transmitted may be adopted.

In this case, since the vane rotor is integrally provided in the outer rotor via the end plates fixed to the outer rotor so as to cover the axial end surfaces, and is also integrally provided in the rotating shaft which outputs the driving force of the outer rotor, the rotation of the outer rotor can be transmitted to the rotating shaft by direct coupling, while the pressure of the working fluid introduced into the pressure chambers is mainly used for change of the relative phase between the housing which is integrally provided inside the inner rotor and the vane rotor, i.e., the relative phase between the inner rotor and the outer rotor. Accordingly, the pressure which is required to be generated by the working fluid can be suppressed low.

(4) In the above (2), a configuration in which the vane rotor is integrally provided in the outer rotor via end plates (for example, the drive plates 31 in the embodiment) fixed to the outer rotor so as to cover one axial end surface, and a rotating shaft (for example, the output shaft 65 in the embodiment) which transmits the driving force of the outer rotor is integrally provided in the inner rotor and the housing from the other axial side may be adopted.

In this case, the vane rotor is integrally provided in the outer rotor via the end plate fixed to the outer rotor so as to cover one axial end surface, and the rotating shaft which outputs the driving force of the outer rotor is integrally provided in the inner rotor and the housing from the other axial side, the driving force of the outer rotor is transmitted to the rotating shaft integrally provided in the inner rotor and the housing via the working fluid of the pressure chambers. Since the driving force is transmitted via the working fluid in this way, the vibration to be generated can be absorbed by the fluid, and silence can be improved.

(5) In any one of the above (2) to (4), a configuration in which the working fluid is supplied to the pressure chambers via the vane rotor may be adopted.

In this case, since the working fluid is supplied to the pressure chambers via the vane rotor, an increase in axial thickness accompanying formation of flow passages for the working fluid can be suppressed.

(6) In the above (1), a configuration in which the first member is end plates (for example, the drive plates 71, the supporting member 74, or the flange portion 82 in the embodiment) which are integrally provided in the outer rotor and the rotating shaft (for example, the output shaft 72 and the cylindrical portion 81 in the embodiment) so as to cover both end surfaces of the inner rotor and the outer rotor and which transmits torque to the rotating shaft, and the second member is a ring gear (for example, the ring gear 78 in the embodiment) which is arranged between the inner rotor and the rotating shaft, is connected with the inner rotor and the rotating shaft by helical splines (for example, the helical splines 81a, 91a, 94a, and 95a in the embodiment), defines the pressure chambers (for example, the first pressure chamber 101 and the second pressure chamber 102 in the embodiment,) with the drive plates, and is moved axially by supply of the working fluid to the pressure chambers may be adopted.

In this case, if a working fluid is supplied to the pressure chambers which are formed by the end plates which are the first member and the ring gear which is the second member, the ring gear move axially relative to the end plates and the outer rotor integrally provided therein. However, the ring gear is arranged between the rotating shaft and the inner rotor which are provide integrally with the end plates, and is connected with the rotating shaft and the inner rotor by the helical splines. Therefore, the relative phase between the inner rotor, and the output shaft, the end plates, or the outer rotor is changed by axial movement. As such, a simple actuator mechanism which axially moves the ring gear having the helical splines is used as the rotating device. Therefore, it is possible to make an induced voltage constant variable easily and properly and with desired timing while suppressing complication of the motor.

(7) In the above (1), a configuration in which the first member is a housing (for example, the housing 107 in the embodiment) which is integrally provided in the outer rotor and a rotating shaft (for example, the output shaft 114 in the embodiment) to which the driving force of the outer rotor is transmitted, and the second member is pistons (for example, the pistons 108 in the embodiment) which are inserted into holes (for example, the holes 107c and 107d in the embodiment) formed in the housing to define the pressure chambers (for example, the first pressure chamber 116 and the second pressure chamber 117 in the embodiment) with the holes, and abut on wall surfaces (for example, the wall surfaces 120a and 102b in the embodiment) of the inner rotor may be adopted.

In this case, if a working fluid is supplied to the pressure chambers formed in the housing which is the first member, and the pistons which are the second member, the protruding amount of the pistons from the pressure chambers increases. As a result, the relative phase between the inner rotor which makes the pistons abut on the wall surfaces, and the housing, the outer rotor and the rotating shaft which are provided integrally is provided. As such, a simple actuator having the pistons is used as the rotating device. Therefore, it is possible to make an induced voltage constant variable easily and properly and with desired timing while suppressing complication of the motor.

Fifth Embodiment

Figure 15:
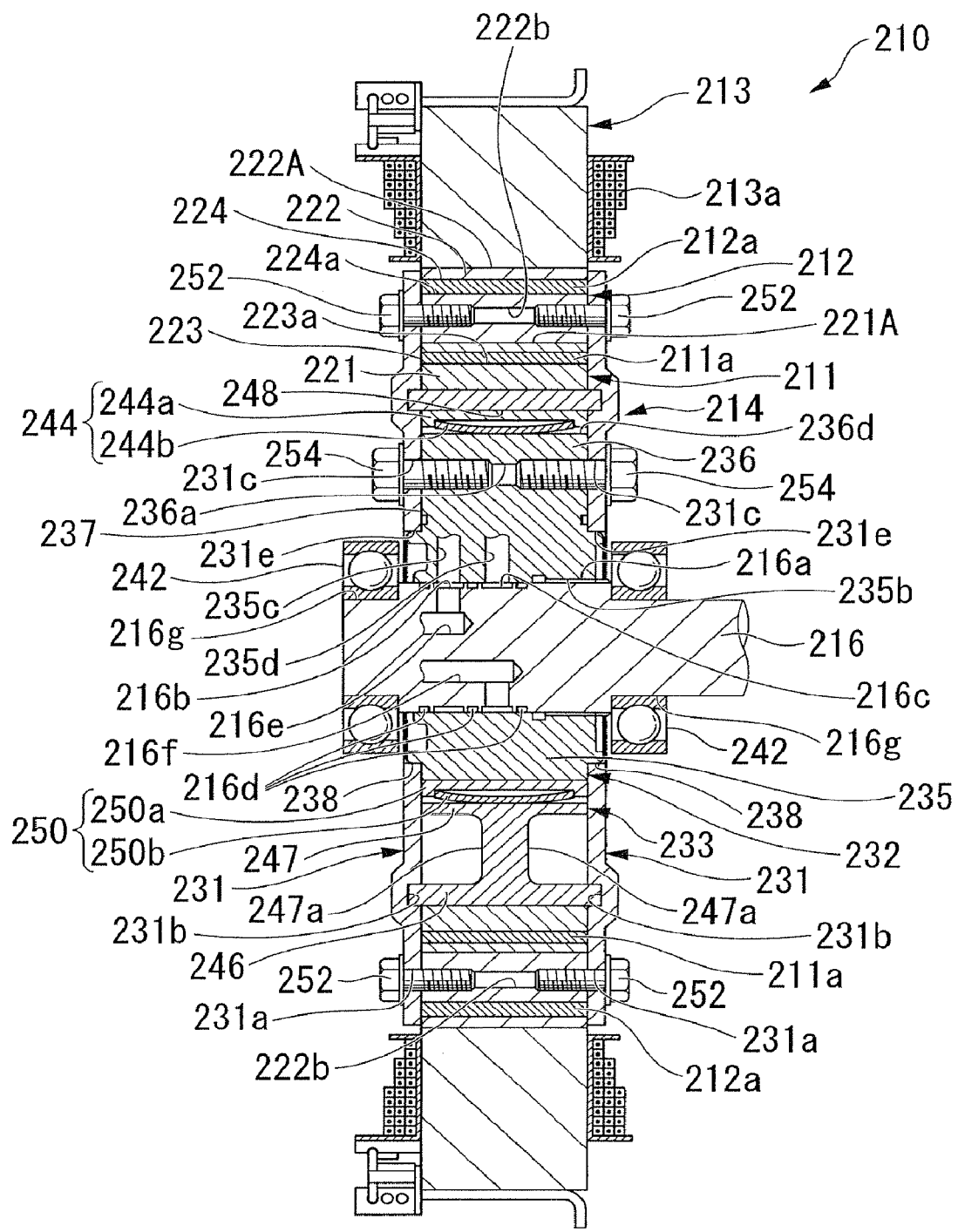
FIG. 15 is a sectional view of principal parts showing a motor according to a fifth embodiment of the invention.
Figure 16:
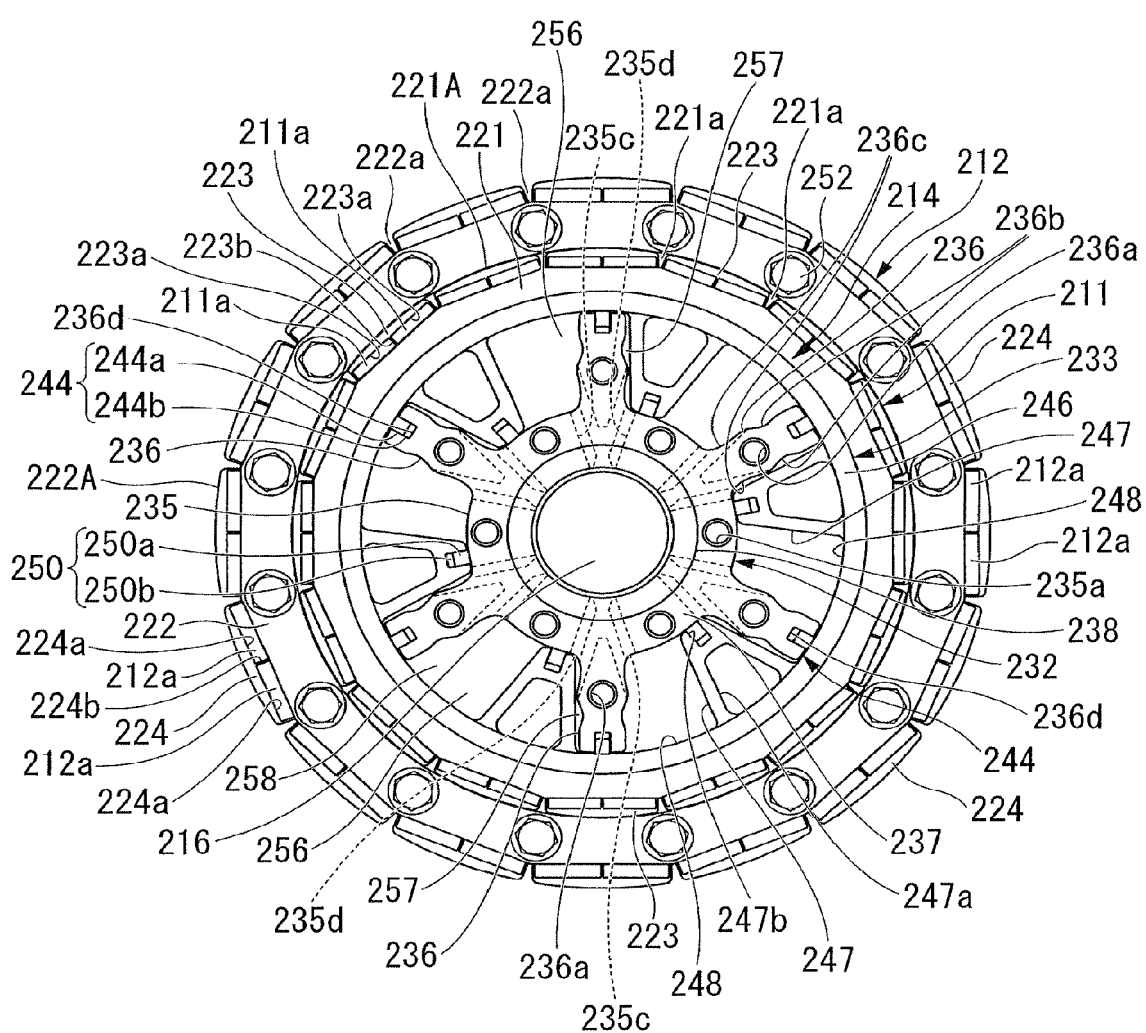
FIG. 16 is a front view showing a field-weakening state of an inner rotor, an outer rotor, and a rotating mechanism of the motor, with a front drive plate omitted.
Figure 17:
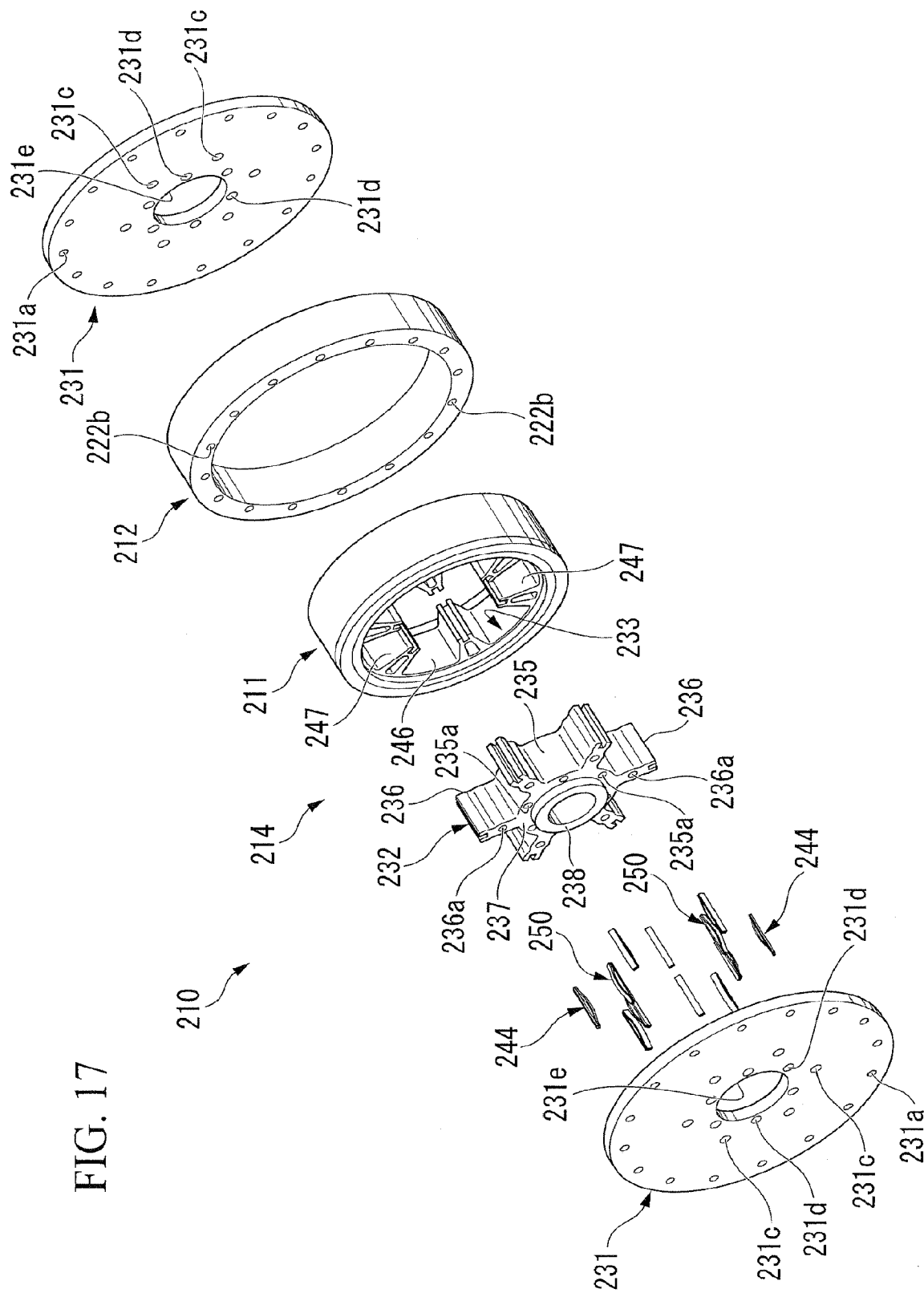
FIG. 17 is an exploded perspective view showing the inner rotor, outer rotor, and rotating mechanism of the motor.

Hereinafter, a motor according to a fifth embodiment of the present invention is described, referring to FIG. 15 to FIG. 24B. As shown in FIGS. 15 to 17, the motor 210 according to this embodiment is a brushless DC motor including a substantially annular inner rotor 211 which is rotatably provided about the axis of rotation of the motor 210, a substantially annular outer rotor 212 which is rotatably provided about the same axis of rotation radially outside the inner rotor 211 and which is provided so as to be matched with the inner rotor in position in the direction of the axis of rotation, a stator 213 which has a plurality of phases of stator windings 213a, shown in FIG. 15, which generate a rotating magnetic field which rotate the inner rotor 211 and the outer rotor 212, a rotating mechanism (rotating device) 214 which is connected to the inner rotor 211 and the outer rotor 212, and changes the relative phase between the inner rotor 211 and the outer rotor 212 with the hydraulic pressure (fluid pressure) of the hydraulic oil (working fluid) which is an incompressible fluid, and a hydraulic controller (not shown) which controls the hydraulic pressure to the rotating mechanism 214. The motor 210 is mounted on, for example, a vehicle, such as a hybrid vehicle or electric vehicle, as a driving source. In that case, an output shaft (rotating shaft) 216 of the motor is connected to an input shaft of a transmission (not shown), and the driving force of the motor 210 is transmitted to driving wheels (not shown) of a vehicle via a transmission.

In addition, when a driving force is transmitted to the motor 210 from the driving-wheel side during deceleration of a vehicle, the motor 210 functions as a power generator, thereby generating a so-called regenerative braking force, and recovering kinetic energy of a vehicle body as electrical energy (regeneration energy). Moreover, for example in a hybrid vehicle, the axis of rotation of the motor 210 is connected with a crankshaft of an internal combustion engine (not shown), and even in a case where the output of the internal combustion engine is transmitted to the motor 210, the motor 210 functions as a power generator, thereby generating power generation energy.

The inner rotor 211 is arranged so that its axis of rotation is coaxial with the axis of rotation of the motor 210, as shown in FIG. 16, the inner rotor has a substantially cylindrical inner rotor core 221. In an outer peripheral portion of the inner rotor core 221, a plurality of (specifically, sixteen) inner magnet mounting portions 223, . . . , and 223 are provided at predetermined pitches in the peripheral direction. Further, on an outer peripheral surface 221A of the inner rotor core 221, recessed grooves 221a which extend parallel to the axis of rotation are formed in positions between all the inner magnet mounting portions 223 and 223 which are adjacent to each other in the peripheral direction so as to be recessed radially. The inner rotor core 221 is formed, for example, by sintering, etc.

Each of the inner magnet mounting portions 223, . . . , and 223 includes a pair of magnet mounting holes 223a and 223a passing through the inner rotor core 221 parallel to the axis of rotation. The pair of magnet mounting holes 223a and 223a are formed in a substantially oblong shape in a cross-section in a direction parallel to the axis of rotation, and are arranged in the same plane so as to be adjacent to each other in the peripheral direction via a center rib 223b. In addition, this plane is orthogonal to a radial line which connects the center rib 223b and the axis of rotation. Each of the magnet mounting holes 223a and 223a is mounted with a substantially plate-like permanent magnet 211a which extends parallel to the axis of rotation.

All the permanent magnets 211a mounted on the magnet mounting holes 223a, . . . , and 223a, respectively, are similarly magnetized in their thickness directions (that is, the radial direction of each of the rotors 211 and 212), and a pair of permanent magnets 211a and 211a mounted on a pair of magnet mounting holes 223a and 223a provided in the same inner magnet mounting portion 223 are set so that their magnetizing directions become the same direction. Also, for the inner magnet mounting portions 223 and 223 which are adjacent to each other in the peripheral direction in all the inner magnet mounting portions 223, . . . , and 223, a pair of permanent magnets 211a and 211a mounted on one of the inner magnet mounting portions and a pair of permanent magnets 211a and 211a mounted on the other thereof are set so that their magnetizing directions become different directions. That is, an inner magnet mounting portion 223 mounted with one pair of permanent magnets 211a and 211a having S poles on their outer peripheral side is adjacent to an inner magnet mounting portion 223 mounted with one pair of permanent magnets 211a and 211a having N poles on their outer peripheral side, in the peripheral direction via the recessed groove 221a. From the above, the inner rotor 211 includes a plurality of permanent magnets 211a, . . . , and 211a which are arranged in the peripheral direction.

The outer rotor 212 is also arranged so that its axis of rotation is coaxial with the axis of rotation of the motor 210, the outer rotor has a substantially cylindrical outer rotor core 222. In an outer peripheral portion of the outer rotor core 222, outer magnet mounting portions 224, . . . , and 224 of the same number as the aforementioned inner magnet mounting portions 223, . . . , and 223 are provided at predetermined pitches in the peripheral direction. Further, on an outer peripheral surface 222A of the outer rotor core 222, a recessed groove 222a which extends parallel to the axis of rotation is formed in a position between all the outer magnet mounting portions 224 and 224 which are adjacent to each other in the peripheral direction so as to be recessed radially. Moreover, a screw hole 222b shown in FIG. 15 is formed so as to pass axially through the outer rotor in a position on the internal diameter side of each of the recessed grooves 222a, . . . , and 222a of the outer rotor core 222, i.e., in a position between adjacent ones of the outer magnet mounting portions 224, . . . , and 224. The outer rotor core 222 is also formed, for example, by sintering, etc.

Each of the outer magnet mounting portions 224, . . . , and 224 includes a pair of magnet mounting holes 224a and 224a passing through the outer rotor core parallel to the axis of rotation. The pair of magnet mounting holes 224a and 224a are formed in a substantially oblong shape in a cross-section in a direction parallel to the axis of rotation, and are arranged in the same plane so as to be adjacent to each other in the peripheral direction via a center rib 224b. In addition, this plane is orthogonal to a radial line which connects the center rib 224b and the axis of rotation. Each of the magnet mounting holes 224a and 224a is mounted with a substantially plate-like permanent magnet 212a which extends parallel to the axis of rotation.

All the permanent magnets 212a mounted on the magnet mounting holes 224a, . . . , and 224a, respectively, are similarly magnetized in their thickness directions (that is, the radial direction of each of the rotors 211 and 212), and a pair of permanent magnets 212a and 212a mounted on a pair of magnet mounting holes 224a and 224a provided in the same outer magnet mounting portion 224 are set so that their magnetizing directions become the same direction. Also, for the outer magnet mounting portions 224 and 224 which are adjacent to each other in the peripheral direction in all the outer magnet mounting portions 224, . . . , and 224, a pair of permanent magnets 212a and 212a mounted on one of the inner magnet mounting portions and a pair of permanent magnets 212a and 212a mounted on the other thereof are set so that their magnetizing directions become different directions. That is, an outer magnet mounting portion 224 mounted with one pair of permanent magnets 212a and 212a having S poles on their outer peripheral side is adjacent to an inner magnet mounting portion 224 mounted with one pair of permanent magnets 212a and 212a having N poles on their outer peripheral side, in the peripheral direction via the recessed groove 222a. From the above, the outer rotor 212 also includes a plurality of permanent magnets 212a, . . . , and 212a which are arranged in the peripheral direction.

Also, each of the magnet mounting portions 223, . . . , and 223 of the inner rotor 211 and each of the magnet mounting portions 224, . . . , and 224 of the outer rotor 212 are arranged so as to face each other in the radial direction of each of the rotors 211 and 212. In this facing arrangement state, all the pairs of permanent magnets 211a and 211a are matched with any corresponding pairs of permanent magnets 212a and 212a on one-on-one level in phase of the direction of rotation. Further, even for each of the recessed grooves 221a, . . . , and 221a of the inner rotor 211, and each of the recessed grooves 222a, . . . , and 222a of the outer rotor 212, all the recessed grooves 221a, . . . , and 221a are matched with any corresponding recessed grooves 222a on one-on-one level in phase of the direction of rotation.

Figure 18:
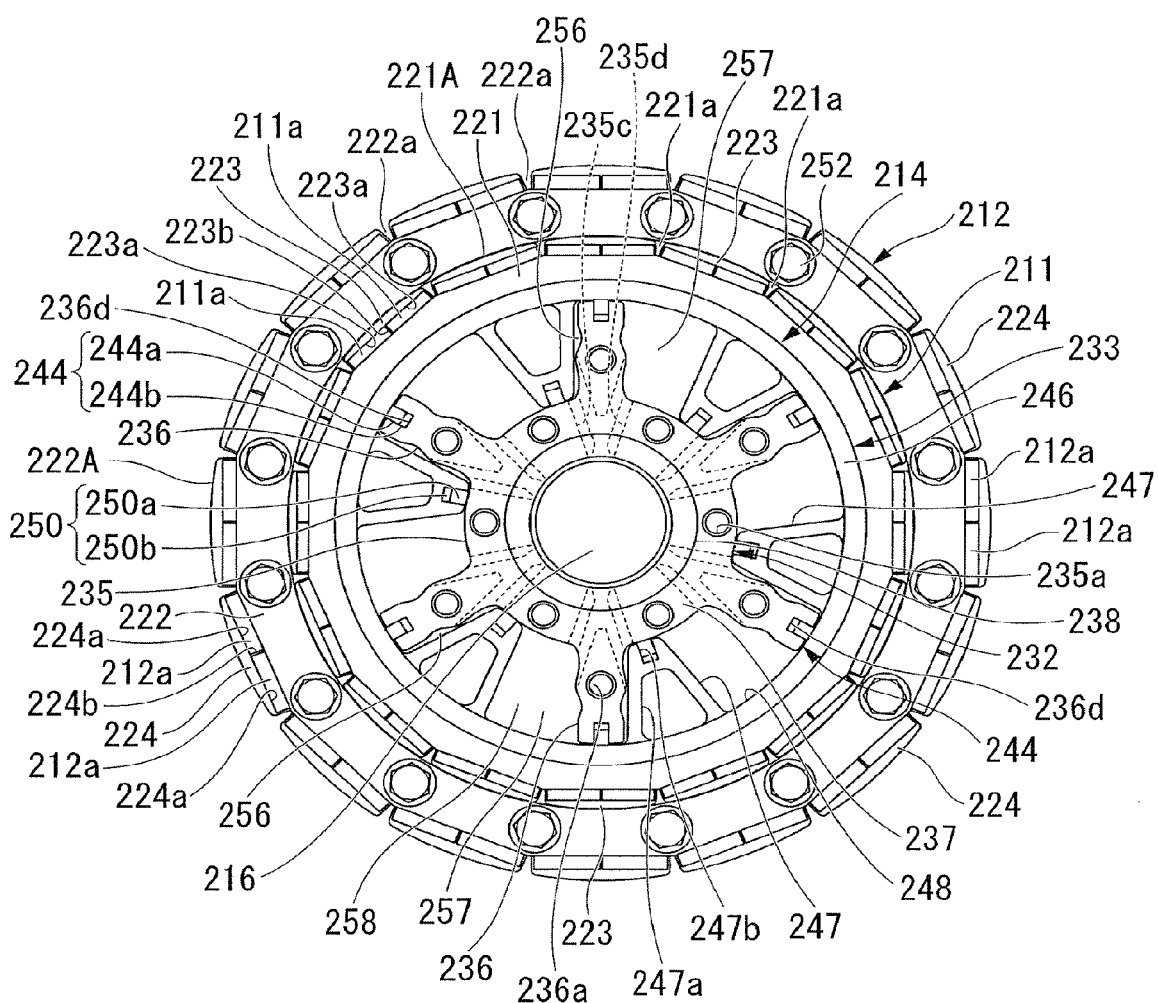
FIG. 18 is a front view showing a field-strengthening state of the inner rotor, outer rotor, and rotating mechanism of the motor, with a front drive plate omitted.

Thereby, the state of the motor 210 can be set to a proper state ranging from a field-weakening state shown in FIG. 16 where same magnetic poles of the permanent magnets 211a and 211a which makes a pair and the permanent magnets 212a and 212a which makes a pair are arranged to face each other (that is, the permanent magnets 211a and 211a which makes a pair and the permanent magnets 212a and 212a which makes a pair have an opposite pole arrangement) to a field-strengthening state shown in FIG. 18 where different magnetic poles of the permanent magnets 211a and 211a which makes a pair and the permanent magnets 212a and 212a which makes a pair are arranged to face each other (that is, the permanent magnets 211a and 211a which makes a pair and the permanent magnets 212a and 212a which makes a pair have the same pole arrangement), in all the permanent magnets 211a, . . . , and 211a of the inner rotor 211, and all the permanent magnets 212a, . . . , and 212a of the outer rotor 212, according to the relative positions of the inner rotor 211 and the outer rotor 212 around the axis of rotation.

Here, the stator 213 shown in FIG. 15 is formed in a substantially cylindrical shape that is arranged to face an outer peripheral portion of the outer rotor 212, and is fixed to, for example, a housing (not shown), etc. of a transmission of a vehicle.

Next, the rotating mechanism 214 which performs a change in relative phase between the inner rotor 211 and the outer rotor 212 as described above is explained.

The rotating mechanism 214 of this embodiment, as shown in FIGS. 15 and 17, has a pair of disk-shaped drive plates (end plates) 231 and 231 which are fixed so as to cover the space inside the outer rotor 212 on both axial sides of the outer rotor 212, a vane rotor 232 which is sandwiched by the drive plates 231 and 231 and thereby is integrally provided inside the outer rotor 212, and a housing 233 which is integrally fixed inside the inner rotor 211 and is arranged between the vane rotor 232, the outer rotor 212, and the drive plates 231 and 231, along with the inner rotor 211. The vane rotor 232 and the housing 233 are formed, for example, by sintering, etc.

In the pair of drive plates 231 and 231, a plurality of bolt insertion holes 231a, . . . , and 231a (having the same number as the screw holes 222b) which pass axially through each plate are formed at regular intervals on the same circumference of the plate, and an annular groove 231b, shown in the FIG. 15, which is recessed axially, is formed on one side inside the bolt insertion holes 231a, . . . , and 231a. Further, in the drive plate 231, a plurality of bolt insertion holes 231c, . . . , and 231c which pass axially through the plate are formed at regular intervals on the same circumference inside the annular groove 231b, and a plurality of bolt insertion holes 231d, . . . , and 231d, shown in FIG. 17, which pass axially through the plate, are formed by the same number as the insertion holes 231c, . . . , and 231c at regular intervals on the same circumference inside the insertion holes 231c, . . . , and 231c. Here, in all the bolt insertion holes 231c, . . . , and 231c, inside bolt insertion holes 231d are formed in middle positions between the bolt insertion holes 231c and 231c which are adjacent to each other in the peripheral direction. Moreover, a fitting hole 231e which passes axially through the plate is formed in the central position of the drive plate 231 further inside of the inside bolt insertion holes 231d . . . , and 231d.

The vane rotor 232 has a cylindrical boss 235, and a plurality of (of the same number as the aforementioned bolt insertion holes 31c (specifically, six)) impeller portions 236, . . . , and 236 which extend radially outward from equidistant positions in the peripheral direction on an outer peripheral surface of the boss 235.

The boss 235 is formed in the shape of a step having an outer nipping base portion 237 of the same axial length as the impeller portions 236, . . . , and 236, and a pair of cylindrical fitting portions 238 which protrude in axially opposite directions from the inner peripheral side of the nipping base portion 237. In the nipping base portion 237, a plurality of (of the same number as the aforementioned bolt insertion holes 231d) screw holes 235a which pass axially through the base portion are formed in middle positions between the impeller portions 236 and 236 which are adjacent to each other. Further, on the internal diameter side of the boss 235, a connecting spline 235b shown in FIG. 15 is formed on one axial side of the boss. On the other axial side of the boss, as shown in FIG. 16, passage holes 235c, . . . , and 235c which pass through the boss are foamed on the same one side in the direction of the rotation of a base end of the impeller portion 236 nearest from the inner peripheral side of the position of each of the impeller portions 236 . . . , and 236, and passage holes 235d, . . . , and 235d which pass through the boss are formed on the same opposite side in the direction of the rotation of the base end of the impeller portion 236 nearest from the inner peripheral side of the position of each of the impeller portions 236 . . . , and 236 such that their axial positions are made different from one another as shown in FIG. 15.

On the internal diameter side of the vane rotor 232, an output shaft 216 to which the driving force of the outer rotor 212 is transmitted is attached. The output shaft 216 is provided with a connecting spline 216a coupled with the connecting spline 235b of the boss 235, an annular communication groove 216b which allows all the passage holes 235c of the boss 235 to communicate with one another in the state of being coupled by the connecting spline 216a, an annular communication groove 216c which allows all the passage holes 235d to communicate with one another in the same state, and seal grooves 216d, 216d, and 216d formed in the position between the communication grooves 216b and 216c and in both outside positions thereof, and seal rings (not shown) which seal the gaps with the vane rotor 232 are arranged in the seal grooves 216d, 216d, and 216d, respectively. Further, the output shaft 216 is formed with a passage hole 216e for supplying and discharging hydraulic oil to/from the communication groove 216b through the inside thereof, and a passage hole 216f for supplying and discharging hydraulic oil to/from the communication groove 216c. In addition, bearing fitting portions 216g into which a pair of bearings 242 and 242 held by, for example, a housing of a transmission of a vehicle is made to fit are respectively formed in the portions of the output shaft 216 which protrude further axially outward than the drive plates 231 and 231.

Each of the impeller portions 236, . . . , and 236 forms a substantially plate shape, and as shown in FIG. 16, a screw hole 236a which passes axially through the impeller portion is formed in an intermediate position between the impeller portions. Further, on both sides of the impeller portion in the peripheral direction, a pair of recessed portions 236b and 236b are formed on the outer peripheral side of the formation position of the screw hole 236a over the entire axial length, and a pair of recessed portions 236c and 236c are also formed inside the formation position of the screw hole 236a over the entire axial length. Moreover, on an outer peripheral surface of each of the impeller portions 236, . . . , and 236, a seal holding groove 236d which is recessed toward the center from the outer peripheral surface is formed over the entire axial length. Spring seals 244 which seal the gaps with the housing 233 are arranged in the seal holding portions 236d, . . . , and 236d, respectively. Each of the spring seals 244, . . . , and 244 is constituted by a seal 244a which is provided outside and comes into sliding contact with the housing 233, and a spring 244b which is provided inside and presses the seal 244a toward the housing 233 radially outward.

The housing 233 which is integrally fitted into the inner rotor 211 so as to have a predetermined phase relationship has a cylindrical base portion 246 with a small radial thickness, and protruding portions 247, . . . , and 247 which protrude radially inward from the equidistant positions in the peripheral direction on an inner peripheral surface of the base portion 246, and has the same number as the impeller portions 236. Here, as shown in FIG. 15, the base portion 246 protrudes over its entire periphery so as to be longer in axially opposite directions than the protruding portion 247. As shown in FIG. 16, each of the protruding portions 247, . . . , and 247 forms a tapered, substantially isosceles triangular shape as seen axially. Between the protruding portions 247 and 247 which are adjacent to each other in the peripheral direction in all the protruding portions 247, . . . , and 247, a concave portion 248 where the impeller portion 236 of the aforementioned vane rotor 232 can be arranged is formed. Each of the protruding portions 247, . . . , and 247 is formed with a pair of lightening holes 247a and 247a which are recessed with a predetermined equal depth from its both axial surfaces, and a seal holding groove 247b which is recessed toward the external diameter side is formed in an inner end surface of the protruding portion over the entire axial length. Spring seals 250 which seal the gaps with an outer peripheral surface of the boss 235 of the vane rotor 232 are arranged in the seal holding portions 247b, . . . , and 247b, respectively. The spring seals 250, . . . , and 250 are constituted by a seal 250a which is provided on the inner peripheral side and comes into sliding contact with the boss 235 of the vane rotor 232, and a seal spring 250b which is provided on the external diameter side and presses the seal 250a toward the vane rotor 232. In addition, the housing 233 may be integrally connected with the inner rotor 211 by fastening of bolts, etc.

In a case where the above respective parts are assembled, for example with the outer rotor 212 being matched with one drive plate 231, the bolts 252 are inserted into the bolt insertion holes 231a, . . . , and 231a, respectively, of the drive plate 231, and the bolts 252, . . . , and 252 are screwed to the screw holes 222b, respectively, of the outer rotor 212. Further, in a state where the vane rotor 232 is matched with the drive plate 231 by making one fitting portion 238 of the vane rotor fit into the fitting hole 231e, bolts (not shown) are inserted into bolt insertion holes 231d, . . . , and 231d, respectively, of the drive plate 231, and the bolts are screwed to the screw holes 235a, respectively, of the boss 235 of the vane rotor 232. Moreover, the bolts 254 are inserted into the bolt insertion holes 231c, . . . , and 231c, respectively, of the drive plate 231 and bolts 254, . . . , and 254 are screwed to the screw holes 236a, respectively, of the impeller portions 236 of the vane rotor 232. Also, by inserting the impeller portions 236, . . . , and 236 into the concave portions 248, respectively, on one-on-one level in a state where the spring seals 244 are attached to the impeller portions 236, . . . , and 236, respectively, of the vane rotor 232, the inner rotor 211 into which the housing 233 is press-fitted in advance is inserted in a state where the spring seals 250, . . . , and 250 are attached.

Also, in a state where the other drive plate 231 is matched from the opposite side by making the other fitting portion 238 of the vane rotor 232 fit into the fitting hole 231e, bolts 252 are inserted into the bolt insertion holes 231a, . . . , and 231a, respectively, of the drive plate 231, and the bolts 252, . . . , and 252 are screwed to the screw holes 222b, respectively, of the outer rotor 212. Further, bolts (not shown) are inserted into the bolt insertion holes 231d, . . . , and 231d, respectively, of the drive plate 231, and the bolts are screwed to the screw holes 235a, respectively, of the boss 235 of the vane rotor 232. Moreover, the bolts 254 are inserted into the bolt insertion holes 231c, . . . , and 231c, respectively, and the bolts 254, . . . , and 254 are screwed to the screw holes 236a, respectively, of the impeller portions 236 of the vane rotor 232. As a result, the drive plates 231 and 231 fixed to both axial end surfaces of the outer rotor 212 are integrally fixed by the impeller portions 236, . . . , and 236 of the vane rotor 232 and bolts 254, . . . , and 254, and are integrally fixed by the boss 235 and bolts (not shown). In addition, as the bolts 254, . . . , and 254 which fix the impeller portions 236, . . . , and 236 to the drive plate 231, ones which are fewer in number than and larger in size than the bolts 252, . . . , and 252 which fix the outer rotor 212 to the drive plate 231 are used.

Then, the output shaft 216 is fitted into the vane rotor 232. At that time, the connecting spline 216a and the connecting spline 235b are coupled together. As a result, the output shaft 216 is integrally fixed to the vane rotor 232. Of course, the above assembling procedure is an example, and assembling can also be made by a procedure different from the above.

From the above, the inner rotor 211 integrated with the housing 233 is provided in a space 258 between the drive plates 231 and 231 inside the outer rotor 212 and outside the vane rotor 232, and consequently, is rotatably held by both axial portions of the base portion 246 inserted into the annular grooves 231b and 231b of the drive plates 231 and 231. Moreover, the impeller portions 236 of the vane rotor 232 are arranged in the concave portions 248, . . . , and 248, respectively, of the housing 233 one by one. Further, the output shaft 216 spline-coupled with the vane rotor 232 becomes integral and rotatable with the outer rotor 212, the drive plates 231 and 231, and the vane rotor 232, and specifically is integrally fixed thereto.

Here, in a field-strengthening state where different poles of the permanent magnets 212a, . . . , and 212a of the outer rotor 212 and the permanent magnets 211a, . . . , and 211a of the inner rotor 211 are made to face each other, as shown in FIG. 18, each of all the impellers 236, . . . , and 236 abut on the protruding portion 247 which is adjacent to the impeller on the same one side in the direction of rotation within the corresponding concave portion 248, and consequently, forms a first pressure chamber 256 with the abutting protruding portion 247, and forms a second pressure chamber 257, which is wider than the first pressure chamber 256, with the protruding portion 247 which is adjacent to the impeller on the same opposite side in the direction of rotation (in other words, the first pressure chambers 256, . . . , and 256 and the second pressure chambers 257, . . . , and 257 are formed by the impellers 236, . . . , and 236 accommodated in the concave portions 248, . . . , and 248 and concave portions 248, . . . , and 248). As a result, the first pressure chambers 256, . . . , and 256 and the second pressure chambers 257, . . . , and 257 are defined inside the inner rotor 211.

On the contrary, in a field-weakening state where same poles of the permanent magnets 212a, . . . , and 212a of the outer rotor 212 and the permanent magnets 211a, . . . , and 211a of the inner rotor 211 are made to face each other, as shown in FIG. 16, each of all the impellers 236, . . . , and 236 abut on the protruding portion 247 which is adjacent to the impeller on the same opposite side in the direction of rotation within the corresponding concave portion 248, and consequently, reduces the second pressure chamber 257, and expand the first pressure chamber 256 with the protruding portion 247 which is adjacent to the impeller the same one side in the direction of rotation. In addition, the passage holes 235c, . . . , and 235c of the vane rotor 232 are provided in the first pressure chambers 256, . . . , and 256, respectively, so as to always open on one-on-one relation, and the passage holes 235d, . . . , and 235d of the vane rotor 232 are provided in the second pressure chambers 257, . . . , and 257, respectively, so as to always open on one-on-one relation.

Here, in the outer rotor 212 and the inner rotor 211, the field-strengthening position shown in the FIG. 18 which the permanent magnets 212a, . . . , and 212a and the permanent magnets 211a, . . . , and 211a face and attract each other with mutually different polarities is set to an origin position when the first pressure chambers 256, . . . , and 256 and the second pressure chambers 257, . . . , and 257 do not receive any hydraulic oil pressure substantially. In addition, the first pressure chambers 256, . . . , and 256 and the second pressure chambers 257, . . . , and 257 are also filled with hydraulic oil in a state where they do not receive any hydraulic oil pressure. Also, from the state of being in this origin position, when hydraulic oil is discharged via each of the passage holes 235d, . . . , and 235d from each of the second pressure chambers 257, . . . , and 257 simultaneously when hydraulic oil is introduced into each of the first pressure chambers 256, . . . , and 256 via each of the passage holes 235c, . . . , and 235c (that is, hydraulic oil is introduced into the first pressure chambers 256, . . . , and 256), the outer rotor 212 and the inner rotor 211 relatively rotate against a magnetic force, and are brought into a field-weakening state. On the contrary, when hydraulic oil is discharged via each of the passage holes 235c, . . . , and 235c from each of the first pressure chambers 256, . . . , and 256 simultaneously when hydraulic oil is introduced into each of the second pressure chambers 257, . . . , and 257 via each of the passage holes 235d, . . . , and 235d, the outer rotor 212 and the inner rotor 211 return to an origin position and are brought into a field-strengthening state. In this case, the permanent magnets 212a, . . . , and 212a of the outer rotor 212 and the permanent magnets 211a, . . . , and 211a of the inner rotor 211 attract each other by a magnetic force. Therefore, the pressure of the hydraulic oil introduced into each of the second pressure chambers 257, . . . , and 257 is only required to be lower than a pressure required in a case where phase is changed to the field-weakening state. In some cases, even if hydraulic pressure is not introduced, only the supply and discharge of hydraulic oil is required.

Further, in the motor 210, the rotational direction when the inner rotor 211 returns to an origin position from a weakening state where same polarities of the permanent magnets 212a, . . . , and 212a and the permanent magnets 211a, . . . , and 211a are made to face each other with respect to the outer rotor 212 is made to coincide with the direction of the moment of inertia caused during deceleration rotation. That is, the motor 210 is set so as to rotate the outer rotor 212 and the inner rotor 211 in the clockwise direction in FIGS. 16 and 18 during forward traveling of a vehicle, and when the outer rotor 212 decelerates from the field-weakening state shown in FIG. 16, the moment of inertia to return to a field-strengthening state shown in FIG. 18 is generated in the inner rotor 211 in a floating state.

Here, since hydraulic oil is incompressible, in not only the change of phase to both limit ends of the field-strengthening state and the field-weakening state as described above, even in an intermediate position between both the limit ends, a hydraulic controller (not shown) stops the supply and discharge of the hydraulic oil to/from all the first pressure chambers 256, . . . , and 256 and the second pressure chambers 257, . . . , and 257, for example, by shutoff of an opening and closing valve (not shown), whereby the outer rotor 212 and the inner rotor 211 maintains the phase relationship at that point of time. As a result, a phase change in an arbitrary field state can be stopped.

From the above, the aforementioned vane rotor 232 is integrally fixed to the outer rotor 212 and becomes integral and rotatable, and is arranged inside the inner rotor 211. Moreover, the vane rotor 232 is integrally fixed to the outer rotor 212 via the drive plates 231 and 231 fixed to the outer rotor 212 so as to cover both axial end surfaces of the outer rotor 212 and the inner rotor 211, and is integrally provided even in the output shaft 216 which outputs the driving force of the outer rotor 212. Further, the aforementioned housing 233 is integrally fitted to the inner rotor 211 and becomes integral and rotatable, and its concave portion 248 defines the first pressure chamber 256 and the second pressure chamber 257 inside the inner rotor 211 with the vane rotor 232. Moreover, by supply and discharge of hydraulic oil, i.e., by control of introduction of hydraulic oil pressure to/from the first pressure chamber 256 and the second pressure chamber 257, the relative phase of the vane rotor 232 to the housing 233 is changed. As a result, the relative phase between the inner rotor 211 and the outer rotor 212 is changed. Here, the relative phase between the inner rotor 211 and the outer rotor 212 can be changed to advance side or retard side by an electrical angle of 180°, and the state of the motor 210 can be set to a proper state between a field-weakening state where the same magnetic poles of the permanent magnets 211a of the inner rotor 211 and the permanent magnets 212a of the outer rotor 212 are arranged to face each other and a field-strengthening state where different magnetic poles of the permanent magnets 211a of the inner rotor 211 and the permanent magnets 212a of the outer rotor 212 are arranged to face each other.

In addition, the integrated inner rotor 211 and housing 233 are arranged so as to be rotatable in the peripheral direction in the space 258 shown in the FIG. 16 between the outer rotor 212, the vane rotor 232, and both the drive plates 231 and 231, which is formed as the drive plates 231 which transmit the driving force of the outer rotor 212 to the output shaft 216 are fixed to both axial end surfaces, respectively, of the outer rotor 212 and the vane rotor 232. In addition, an integrated article of the inner rotor 211 and the housing 233 is rotatably provided in a floating state within the space 258 (that is, the integrated article is not fixed to the drive plates 231 and 231 and the output shaft 216).

Figure 19A:
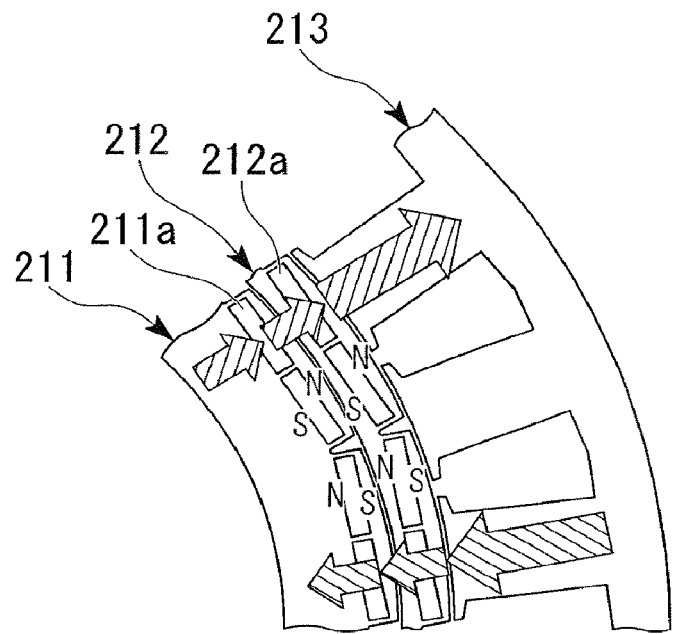
FIG. 19A is a view schematically showing a field-strengthening state where permanent magnets of the inner rotor and permanent magnets of the outer rotor have a same pole arrangement.
Figure 19B:
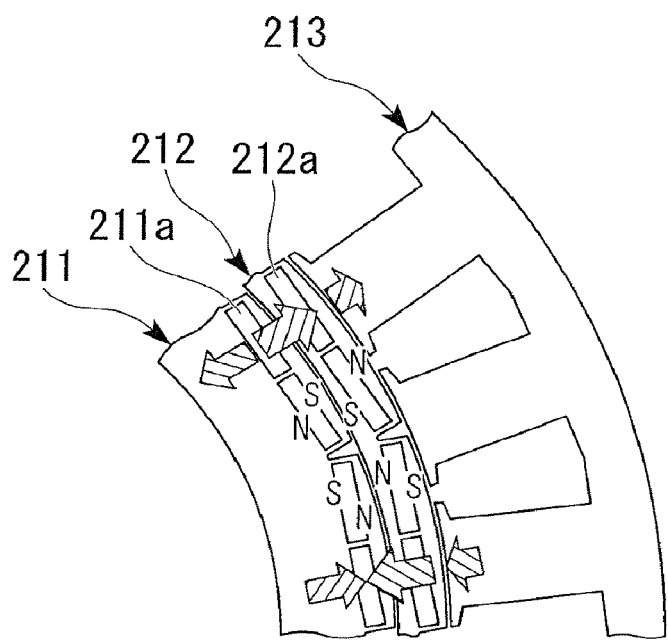
FIG. 19B is a view schematically showing a field-weakening state where permanent magnets of the inner rotor and permanent magnets of the outer rotor have an opposite pole arrangement.
Figure 20:
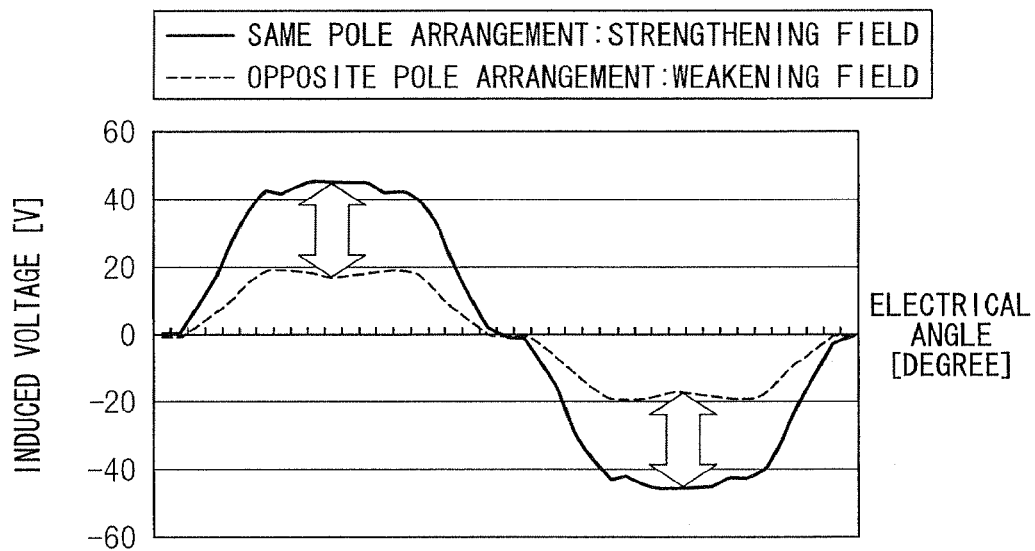
FIG. 20 is a graph showing an induced voltage in the field-strengthening state and the field-weakening state shown in FIG. 19A.

In addition, in the field-strengthening state where the permanent magnets 211a of the inner rotor 211 and the permanent magnets 212a of the outer rotor 212 have a same pole arrangement as shown in, for example, FIG. 19A, and in the field-weakening state where the permanent magnets 211a of the inner rotor 211 and the permanent magnets 212a of the outer rotor 212 have an opposite pole arrangement as shown in, for example, FIG. 19B, the intensity of an induced voltage changes as shown in, for example, FIG. 20. Therefore, an induced voltage constant Ke is changed by changing the state of the motor 210 between the field-strengthening state and the field-weakening state.

The induced voltage constant Ke is, for example, a rotational frequency ratio of an induced voltage induced by winding ends of the stator windings 213a by the rotation of each of the rotors 211 and 212, and can be described as Ke=8×p×R× L×B×T×π by the product of the number of pole pairs p, the external diameter of a motor R, motor stacking thickness L, magnetic flux density B, and the number of turns T. Thereby, by changing the state of the motor 210 between the field-strengthening state and the field-weakening state, the intensity of the magnetic flux density B of a field flux by the permanent magnets 211a of the inner rotor 211 and the permanent magnets 212a of the outer rotor 212 changes, and the induced voltage constant Ke is changed.

Figure 21A:
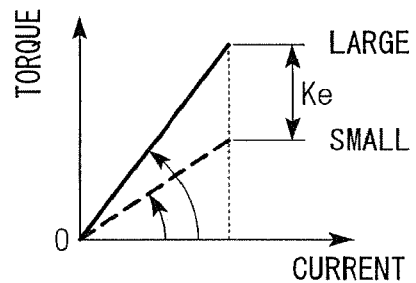
FIG. 21A is a graph showing the relationship between the current and torque of the motor which change according to an induced voltage constant Ke.
Figure 21B:
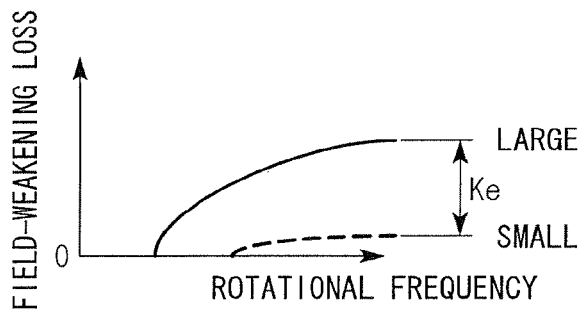
FIG. 21B is a graph showing the relationship between the rotational frequency and field-weakening loss of the motor which change according to an induced voltage constant Ke.

Here, as shown in, for example, FIG. 21A, the torque of the motor 210 is proportional to the product of the induced voltage constant Ke and a current applied to the stator windings 213a (Torque ∝ (Ke×Current)). Further, as shown in, for example, FIG. 21B, the field-weakening loss of the motor 210 is proportional to the product of the induced voltage constant Ke and a rotational frequency (Field-weakening loss ∝ (Ke× Rotational frequency)). Therefore, the allowable rotational frequency of the motor 210 is proportional to an inverse number of the product of the induced voltage constant Ke and the rotational frequency (Allowable rotational frequency ∝ (1/(Ke×Rotational frequency))).

Figure 22:
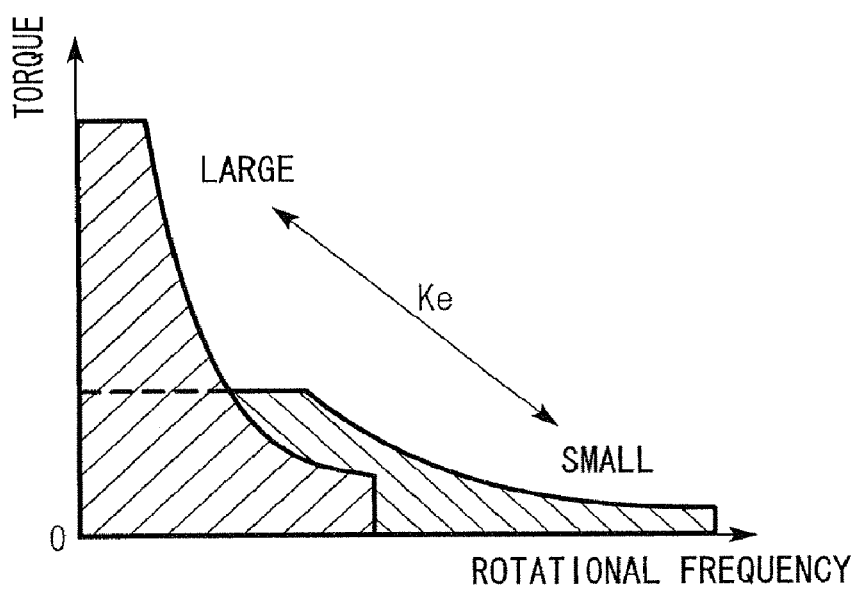
FIG. 22 is a view showing an operational region relevant to the rotational frequency and torque of the motor which change according to the induced voltage constant Ke.
Figure 23A:
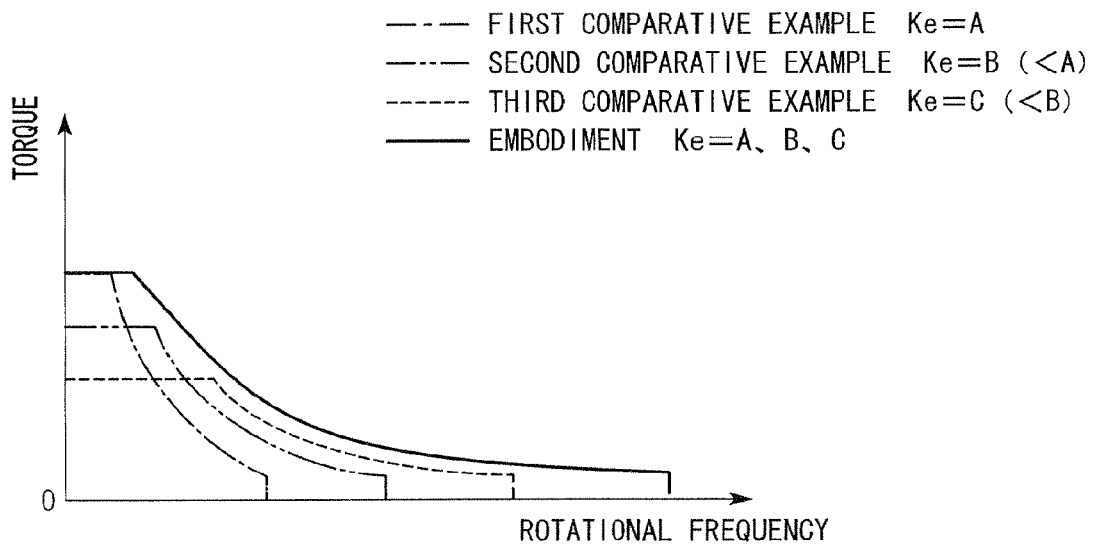
FIG. 23A is a graph showing the relationship between the rotational frequency and torque of the motor which change according to an induced voltage constant Ke.
Figure 23B:
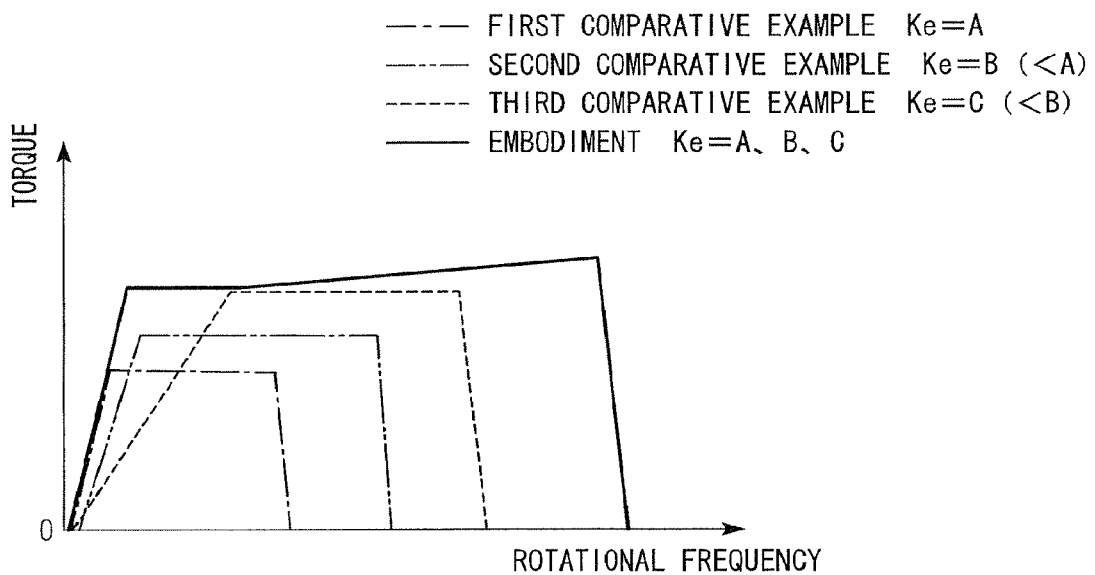
FIG. 23B is a graph showing the relationship between the rotational frequency and output of the motor which change according to an induced voltage constant Ke.
Figure 24A:
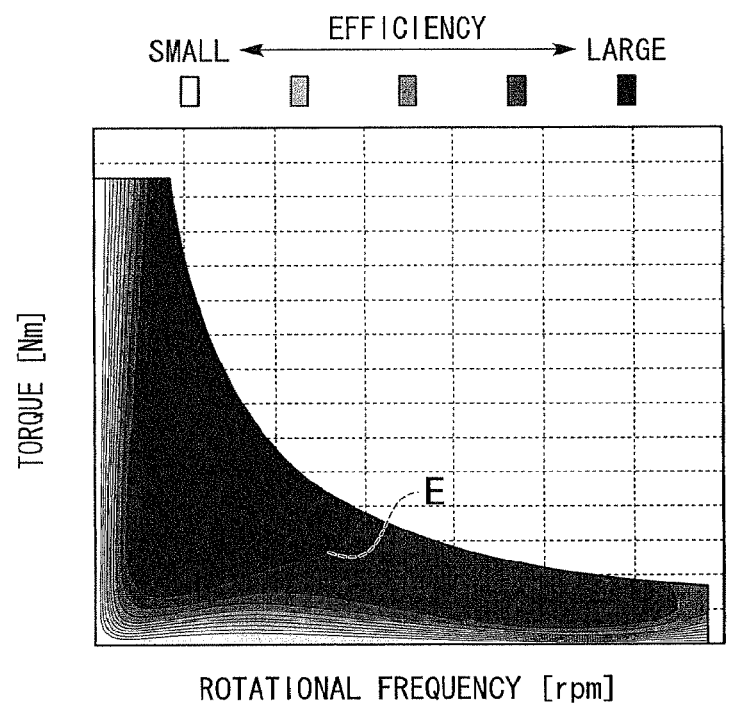
FIG. 24A is a view showing an operational region and efficiency distribution relevant to the rotational frequency and torque of the motor which change according to the induced voltage constant Ke in the embodiment.
Figure 24B:
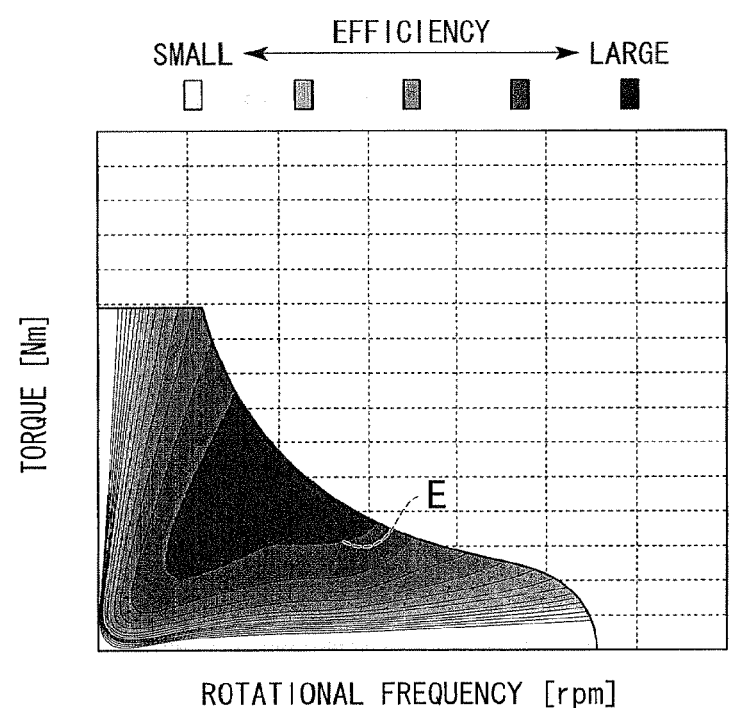
FIG. 24B is a view showing an operational region and efficiency distribution relevant to the rotational frequency and torque of the motor which change according to the induced voltage constant Ke in the second comparative embodiment.

That is, as shown in, for example, FIG. 22, in the motor 210 in which the induced voltage constant Ke is relatively large, an operational rotational frequency falls relatively, but it is possible to output a relatively large torque. On the other hand, in the motor 210 in which the induced voltage constant Ke is relatively small, the torque which can be output falls relatively, but the operation to a relatively high rotational frequency becomes possible. As a result, an operational region relevant to a torque and a rotational frequency changes according to the induced voltage constant Ke. For this reason, like an embodiment shown in, for example, FIG. 23A, by making a setting so that the induced voltage constant Ke may change to a falling tendency as the rotational frequency of the motor 210 increases (for example, sequential change to A, B (<A), and C (<B)), an operational region relevant to a torque and a rotational frequency is expanded, compared with a case (for example, first to third comparative examples) where the induced voltage constant Ke is not changed.

Further, the output of the motor 210 is proportional to a value which is obtained by subtracting the field-weakening loss and other losses from the product of the induced voltage constant Ke, a current applied to the stator windings 213a, and a rotational frequency (Output ∝ (Ke×Current×Rotational frequency–Field-weakening loss–Other losses)). That is, as shown in, for example, FIG. 23B, in the motor 210 in which the induced voltage constant Ke is relatively large, an operational rotational frequency falls relatively, but the output in a relatively low rotational frequency region increases. On the other hand, in the motor 210 in which the induced voltage constant Ke is relatively small, the output in a relatively low rotational frequency region decreases, but the operation to a relatively high rotational frequency becomes possible, and the output at a relatively high rotational frequency increases. As a result, an operational region relevant to an output and a rotational frequency changes according to the induced voltage constant Ke. For this reason, by making a setting so that the induced voltage constant Ke may change to a falling tendency as the rotational frequency of the motor 210 increases (for example, sequential change to A, B (<A), and C (<B)), an operational region relevant to an output and a rotational frequency is expanded, compared with a case (for example, the first to third comparative examples) where the induced voltage constant Ke is not changed.

Further, the efficiency of the motor 210 is proportional to a value which is obtained by subtracting a copper loss, the field-weakening loss, and other losses from the input power to the stator windings 213a (Efficiency ∝ (Input power–Copper loss–Field-weakening loss–Other losses)/Input power)). For this reason, by selecting a relatively large induced voltage constant Ke in a relatively low rotational frequency region to a middle rotational frequency region, the current which is required to output a desired torque decreases, and the copper loss decreases.

Also, by selecting a relatively small induced voltage constant Ke in the middle rotational frequency region to a relatively high rotational frequency region, a field-weakening current decreases, and the field-weakening loss decreases. Thereby, like an embodiment shown in, for example, FIG. 24A, by making a setting so that the induced voltage constant Ke may change to a falling tendency as the rotational frequency of the motor 210 increases, an operational region relevant to a rotational frequency and a rotational frequency is expanded, an efficient region E where the efficiency of the motor 210 becomes a predetermined efficiency or more is expanded, and the value of maximum efficiency which is reachable increases, compared with a case (for example, the second comparative example shown in FIG. 24B) where the induced voltage constant Ke is not changed.

As described above, according to this embodiment, first, the permanent magnets 211a and the permanent magnets 212a are arranged in the peripheral direction in the inner rotor 211 and the outer rotor 212. Thereby, for example, the amount of interlinking magnetic fields that the field fluxes generated by the permanent magnets 212a of the outer rotor 212 interlink the stator windings 213a can be efficiently increased or reduced by the field fluxes generated by the permanent magnets 211a of the inner rotor 211. Also, in the field-strengthening state, the torque constant (that is, torque/phase current) of the motor 210 can be set to a relatively high value. The maximum value of the torque output by the motor 210 can be increased without reducing a current loss during the operation of the motor or without changing the maximum value of the output current of an inverter (not shown) which controls application of a current to the stator windings 213a.

Moreover, as the rotating mechanism 214, a simple vane actuator mechanism having the housing 233 which is integrally provided in the inner rotor 211, and the vane rotor 232 which is integrally provided in the outer rotor 212, forms the first pressure chambers 256, . . . , and 256 and the second pressure chambers 257, . . . , and 257 with the housing 233, and changes the relative phase with respect to the housing 233 by the hydraulic oil pressure introduced into the first pressure chambers 256, . . . , and 256 and the second pressure chambers 257, . . . , and 257 is used. Therefore, it is possible to make an induced voltage constant variable easily and properly and with desired timing while suppressing complication of the motor 210.

Moreover, by controlling the amount of supply of hydraulic oil to the first pressure chambers 256, . . . , and 256 and the second pressure chambers 257, . . . , and 257, the relative phase between the inner rotor 211 and the outer rotor 212 can be changed without steps within a range of an electrical angle of 180° between a field-weakening state and a field-strengthening state. In addition, since the vane rotor 232 and the housing 233 define the first pressure chambers 256, . . . , and 256 and the second pressure chambers 257, . . . , and 257 inside the inner rotor 211, particularly an increase in axial thickness of the motor can be suppressed, and the motor can be miniaturized.

In addition, the integrated inner rotor 211 and housing 233 are arranged so as to be rotatable in the peripheral direction in the space 258 between the outer rotor 212, the vane rotor 232, and both the drive plates 231 and 231, which is surrounded as the drive plates 231 and 231 which directly connect the driving force of the outer rotor 212, and transmit the driving force to the output shaft 216 are fixed to both axial end surfaces, respectively, of the outer rotor 212 and the vane rotor 232. Therefore, the inner rotor 211 and the housing 233 are held in a floating state where they are neither fixed nor connected to any one of the outer rotor 212, the vane rotor 232, both the drive plates 231 and 231, and the output shaft 216. Moreover, the pressure of the hydraulic oil introduced to the first pressure chambers 256, . . . , and 256 and the second pressure chambers 257, . . . , and 257 is mainly used for the change of the relative phase between the housing 233 which is integrally provided inside the inner rotor 211 and the vane rotor 232, i.e., the relative phase between the inner rotor 211 and the outer rotor 212. Accordingly, the pressure which is required to be generated by the hydraulic oil can be suppressed low.

Moreover, since the drive plates 231 and 231 fixed to both axial end surfaces of the outer rotor 212 are integrally fixed to the impeller portions 236, . . . , and 236 of the vane rotor 232, respectively, hydraulic oil can be kept from passing through the gap between the impeller portions 236, . . . , and 236 and the drive plates 231 and 231, and deformation of the impeller portions 236, . . . , and 236 and displacement at the tip side of the impeller portions 236, . . . , and 236 resulting from this deformation can be suppressed.

In addition, since the drive plates 231 and 231 fixed to both axial end surfaces of the outer rotor 212 are integrally fixed to the output shaft 216 via the vane rotor 232, the outer rotor 212, the vane rotor 232, and both the drive plates 231 and 231 are supported on both sides with respect to the output shaft 216. Accordingly, the outer rotor 212, the vane rotor 232, and both the drive plates 231 and 231 can be supported well.

Moreover, since the outer rotor 212 and the inner rotor 211 are such that the position where the permanent magnets 211a, . . . , and 211a and the permanent magnets 212a, . . . , and 212a face each other with mutually different polarities is set to an origin position when the first pressure chambers 256, . . . , and 256 and the second pressure chambers 257, . . . , and 257 do not receive any hydraulic oil pressure substantially, these rotors can return rapidly to the origin position by a magnetic force.

Further, since the rotational direction when the inner rotor 212 returns to an origin position from a state where same polarities of the permanent magnets 211a, . . . , and 211a and the permanent magnets 212a, . . . , and 212a are made to face each other with respect to the outer rotor 211 is made to coincide with the direction of the moment of inertia caused during deceleration rotation, the inner rotor can return to an origin position more smoothly even by the moment of inertia in addition to the magnetic force during deceleration rotation. Consequently, since the return to the origin position during deceleration can be made more rapidly, and the response during the next acceleration rotation can be improved, the motor becomes suitable particularly when being used for traveling of a vehicle.

In addition, since hydraulic oil is supplied to and discharged from the first pressure chambers 256, . . . , and 256 and the second pressure chambers 257, . . . , and 257 via the vane rotor 232, an increase in axial thickness can be suppressed by formation of flow passages for hydraulic oil. In addition, since the first pressure chambers 256, . . . , and 256 and the second pressure chambers 257, . . . , and 257 are defined by the housing 233 press-fitted into the inner rotor 211, the hydraulic oil of the first pressure chambers 256, . . . , and 256 and the second pressure chambers 257, . . . , and 257 draws the heat of the inner rotor 211 via the housing 233, thereby cooling the inner rotor. Moreover, the hydraulic oil of the first pressure chambers 256, . . . , and 256 and the second pressure chambers 257, . . . , and 257 is going to move to the outside by the centrifugal force generated by the rotation of the outer rotor 212 and the inner rotor 211. As a result, if a special seal structure is not adopted, the hydraulic oil will leak to the outside via a gap between the pair of drive plates 231 and 231, and the housing 233, the inner rotor 211 and the outer rotor 212. However, during this passage through the gap, the hydraulic oil draws heat from the inner rotor 211 and the outer rotor 212, thereby cooling the rotors. Moreover, the leaked hydraulic oil is also applied to mainly the stator windings 213a of the stator 213 by its centrifugal force, thereby cooling the stator 213.

As described above, the motor of the invention offers the following features.

(8) In a motor (for example, the motor 210 in the embodiment) including an inner rotor (for example, the inner rotor 211 in the embodiment) having inner permanent magnets (for example, the inner permanent magnets 211a in the embodiment) arranged in a peripheral direction and an outer rotor (for example, the outer rotor 212 in the embodiment) having outer permanent magnets (for example, the outer permanent magnets 212a in the embodiment) arranged in the peripheral direction, the mutual axes of rotation of the inner and outer rotors being arranged coaxially, and a rotating device (for example, the rotating mechanism 214 in the embodiment) capable of making at least one of the inner rotor and the outer rotor rotate around the axes of rotation to change the relative phase between the inner rotor and the outer rotor, the rotating means includes a housing (for example, the housing 233 in the embodiment) which is integrally provided in the inner rotor, and a vane rotor (for example, vane rotor 232 in the embodiment) which is integrally provided in the outer rotor, forms pressure chambers (for example, the first pressure chamber 256 and the second pressure chamber 257 in the embodiment) with the housing, and changes the relative phase with respect to the housing by the pressure of a working fluid supplied to the pressure chambers, and the inner rotor and the housing which are integrated are arranged so as to be rotatable in the peripheral direction in a space (for example, the space 258 in the embodiment) between the outer rotor, the vane rotor, and both end plates, which is surrounded as the end plates (for example, the drive plates 231 in the embodiment) which transmit the driving force of the outer rotor to an output shaft (for example, the output shaft 216 in the embodiment) are fixed to both axial ends of the outer rotor and the vane rotor.

According to the motor, the permanent magnets are arranged in the peripheral direction in the inner rotor and the outer rotor. Thereby, for example, the amount of interlinking magnetic fields that the field fluxes generated by the permanent magnets of the outer rotor interlink the stator windings can be efficiently increased or reduced by the field fluxes generated by the permanent magnets of the inner rotor. Also, in the field-strengthening state, the torque constant (that is, torque/phase current) of the motor can be set to a relatively high value. The maximum value of the torque output by the motor can be increased without reducing a current loss during the operation of the motor or without changing the maximum value of the output current of an inverter (not shown) which controls application of a current to the stator windings.

Moreover, as the rotating device, a simple vane actuator mechanism having the housing which is integrally provided in the inner rotor, and the vane rotor which is integrally provided in the outer rotor, forms pressure chambers with the housing, and changes the relative phase with respect to the housing by the working fluid pressure introduced into the pressure chambers is used. Therefore, it is possible to make an induced voltage constant variable easily and properly and with desired timing while suppressing complication of the motor.

In addition, since the inner rotor and the housing which are integrated are arranged so as to be rotatable in the peripheral direction in a space between the outer rotor, the vane rotor, and both end plates, which is surrounded as the end plates which transmit the driving force of the outer rotor to an output shaft are fixed to both the axial ends of the outer rotor and the vane rotor, the pressure of the working fluid is mainly used for the change of the relative phase between the housing which is integrally provided inside the inner rotor and the vane rotor, i.e., the relative phase between the inner rotor and the outer rotor. Accordingly, the pressure which is required to be generated by the working fluid can be suppressed low.

9) In the above (8), a configuration in which the impeller portions (for example, the impeller portions 236 in the embodiment) formed in the vane rotor are accommodated in concave portions (for example, concave portions 248 in the embodiment) formed in the housing, and the pressure chambers are formed in the impeller portions and the concave portions may be adopted.

In this case, if working fluid pressure is supplied to the pressure chambers defined by the impeller portions of the vane rotor and the concave portions of the housing, the relative phase between the housing and the vane rotor changes in a direction in which the pressure chambers are expanded. As a result, the relative phase between the inner rotor integrally provided outside the housing and the outer rotor integrally provided in the vane rotor is changed.

(10) In the above (9), a configuration in which the end plates fixed to both the axial ends of the outer rotor are integrally fixed to the impeller portions of the vane rotor, respectively, may be adopted.

In this case, since the end plates fixed to both the axial ends of the outer rotor are integrally fixed to the impeller portions of the vane rotor, respectively, hydraulic oil can be kept from passing through the gap between the impeller portions and the drive plates, and deformation of the impeller portions and displacement at the tip side of the impeller portions resulting from this deformation can be suppressed.

(11) In any one of the above (8) to (10), a configuration in which the end plates fixed to both the axial ends of the outer rotor are integrally fixed to the outer shaft, respectively, may be adopted.

In this case, since the end plates fixed to both the axial ends of the outer rotor are integrally fixed to the output shaft, the outer rotor, the vane rotor, and both the end plates are supported on both sides with respect to the output shaft. Accordingly, the outer rotor, the vane rotor, and both the drive plates can be supported well.

(12) In any one of the above (8) to (11), a configuration in which the outer rotor and the inner rotor are such that the position where the outer permanent magnets and the inner permanent magnets face each other with mutually different polarities is set to an origin position may be adopted.

In this case, since the outer rotor and the inner rotor are such that the position where the outer permanent magnets and the inner permanent magnets face each other with mutually different polarities is set to an origin position, these rotors can return rapidly to the origin position by a magnetic force if working fluid pressure is released.

(13) In the above (12), a configuration in which the rotational direction when the inner rotor returns to the origin position from a state where same polarities of the outer permanent magnets and the inner permanent magnets are made to face each other with respect to the outer rotor is made to coincide with the direction of the moment of inertia caused during deceleration rotation may be adopted.

In this case, since the rotational direction when the inner rotor returns to an origin position from a state where same polarities of the outer permanent magnets and the inner permanent magnets are made to face each other with respect to the outer rotor is made to coincide with the direction of the moment of inertia caused during deceleration rotation, the inner rotor can return to an origin position more smoothly even by the moment of inertia in addition to the magnetic force if working fluid pressure is released during deceleration. Consequently, the return to the origin position during deceleration can be made more rapidly, and the response during the next acceleration rotation can be improved.

Sixth Embodiment

Figure 25:
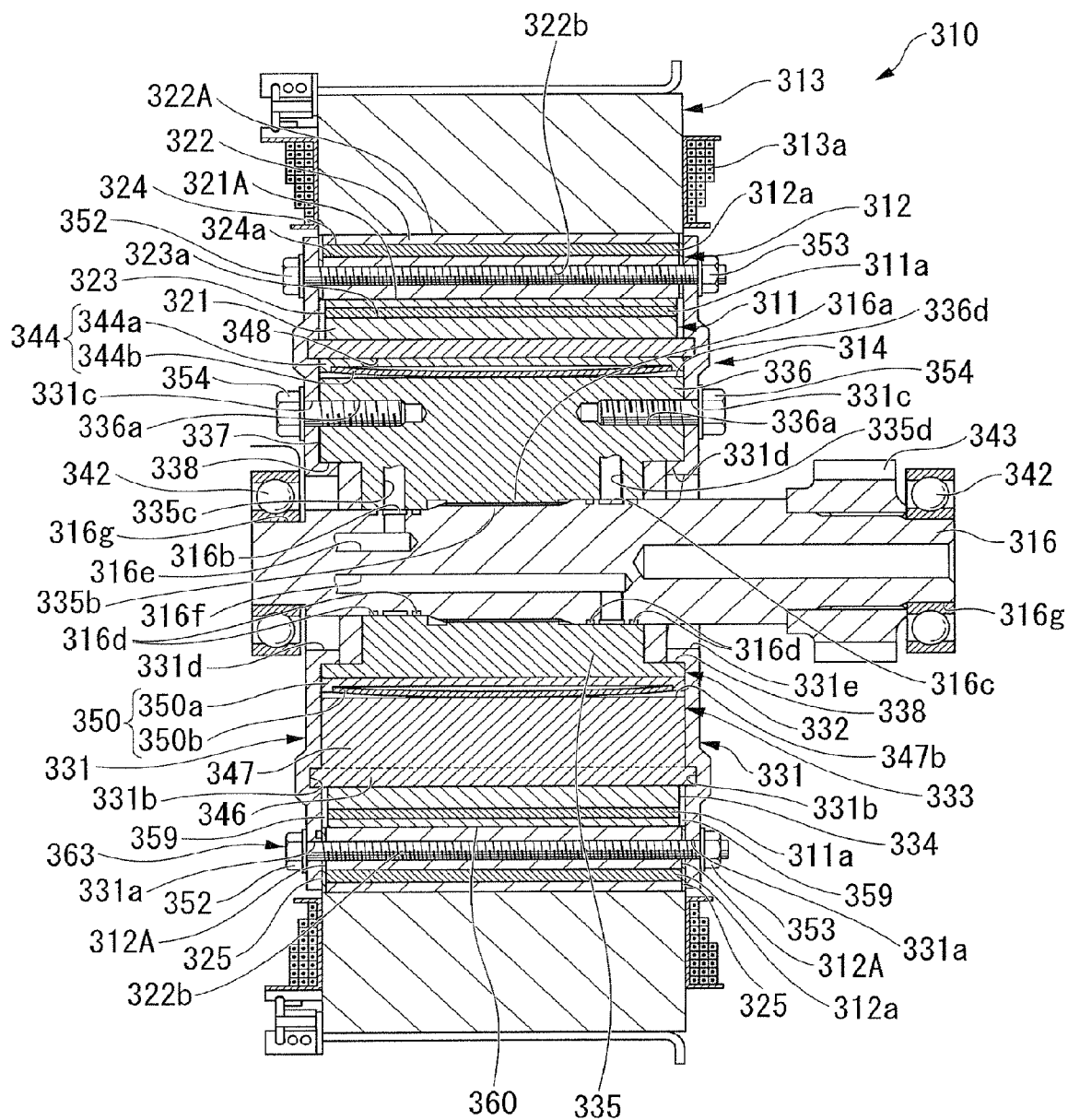
FIG. 25 is a sectional view of principal parts showing a motor according to a sixth embodiment of the invention.
Figure 26:
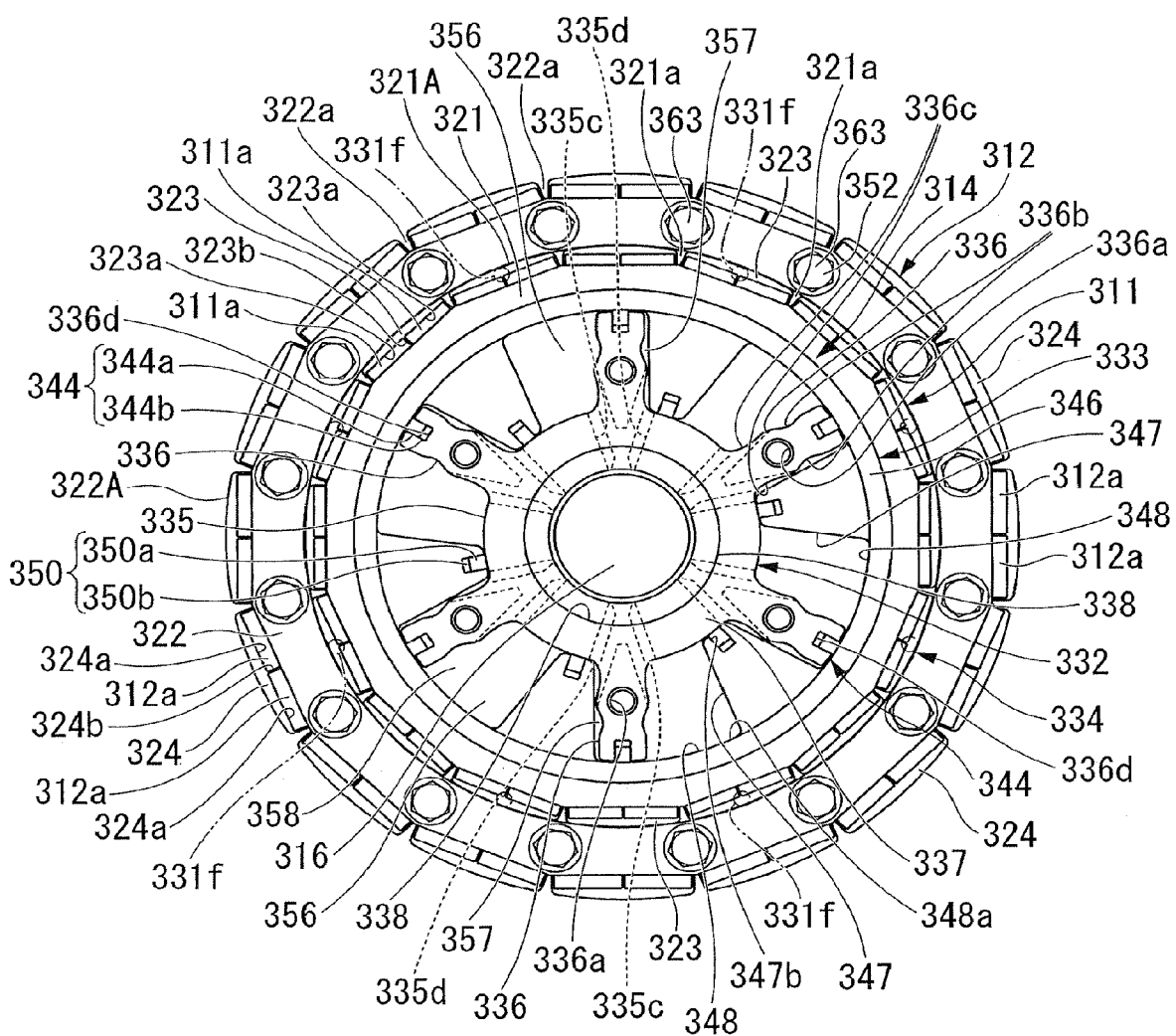
FIG. 26 is a front view showing a field-weakening state of an inner rotor, an outer rotor, and a rotating mechanism of the motor, with a front drive plate omitted.

Hereinafter, a motor according to a sixth embodiment of the invention will be described, referring to FIG. 25 to FIG. 34B. As shown in FIGS. 25 and 26, the motor 310 according to this embodiment is a brushless DC motor including a substantially annular inner rotor 311 which is rotatably provided about the axis of rotation of the motor 310, a substantially annular outer rotor 312 which is rotatably provided about the same axis of rotation radially outside the inner rotor 311 and which is provided so as to be matched with the inner rotor in position in the direction of the axis of rotation, a stator 313 which has a plurality of phases of stator windings 313a, shown in FIG. 25, which generate a rotating magnetic field which rotate the inner rotor 311 and the outer rotor 312, a rotating mechanism (rotating device) 314 which is connected to the inner rotor 311 and the outer rotor 312, and changes the relative phase between the inner rotor 311 and the outer rotor 312 with the hydraulic pressure (fluid pressure) of the hydraulic oil (working fluid) which is an incompressible fluid, and a hydraulic controller (not shown) which controls the hydraulic pressure to the rotating mechanism 314. The motor 310 is mounted on, for example, a vehicle, such as a hybrid vehicle or electric vehicle, as a driving source. In that case, an output shaft (rotating shaft) 316 of the motor is connected to an input shaft of a transmission (not shown), and the driving force of the motor 310 is transmitted to driving wheels (not shown) of a vehicle via a transmission.

In addition, when a driving force is transmitted to the motor 310 from the driving-wheel side during deceleration of a vehicle, the motor 310 functions as a power generator, thereby generating a so-called regenerative braking force, and recovering kinetic energy of a vehicle body as electrical energy (regeneration energy). Moreover, for example in a hybrid vehicle, the axis of rotation of the motor 310 is connected with a crankshaft of an internal combustion engine (not shown), and even in a case where the output of the internal combustion engine is transmitted to the motor 310, the motor 310 functions as a power generator, thereby generating power generation energy.

The inner rotor 311 is arranged so that its axis of rotation is coaxial with the axis of rotation of the motor 310, as shown in FIG. 26, the inner rotor has a substantially cylindrical inner rotor core 321. In an outer peripheral portion of the inner rotor core 321, a plurality of (specifically, sixteen) inner magnet mounting portions 323, . . . , and 323 are provided at predetermined pitches in the peripheral direction. Further, on an outer peripheral surface 321A of the inner rotor core 321, recessed grooves 321a which extend parallel to the axis of rotation are formed in positions between all the inner magnet mounting portions 323 and 323 which are adjacent to each other in the peripheral direction so as to be recessed radially. The inner rotor core 321 is formed, for example, by sintering, etc.

Each of the inner magnet mounting portions 323, . . . , and 323 includes a pair of magnet mounting holes 323a and 323a passing through the inner rotor core 321 parallel to the axis of rotation. The pair of magnet mounting holes 323a and 323a are formed in a substantially oblong shape in a cross-section in a direction parallel to the axis of rotation, and are arranged in the same plane so as to be adjacent to each other in the peripheral direction via a center rib 323b. In addition, this plane is orthogonal to a radial line which connects the center rib 323b and the axis of rotation. Each of the magnet mounting holes 323a and 323a is mounted with a substantially plate-like permanent magnet 311a which extends parallel to the axis of rotation.

All the permanent magnets 311a mounted on the magnet mounting holes 323a, . . . , and 323a, respectively, are similarly magnetized in their thickness directions (that is, the radial direction of each of the rotors 311 and 312), and a pair of permanent magnets 311a and 311a mounted on a pair of magnet mounting holes 323a and 323a provided in the same inner magnet mounting portion 323 are set so that their magnetizing directions become the same direction. Also, for the inner magnet mounting portions 323 and 323 which are adjacent to each other in the peripheral direction in all the inner magnet mounting portions 323, . . . , and 323, a pair of permanent magnets 311a and 311a mounted on one of the inner magnet mounting portions and a pair of permanent magnets 311a and 311a mounted on the other thereof are set so that their magnetizing directions become different directions. That is, an inner magnet mounting portion 323 mounted with one pair of permanent magnets 311a and 311a having S poles on their outer peripheral side is adjacent to an inner magnet mounting portion 323 mounted with one pair of permanent magnets 311a and 311a having N poles on their outer peripheral side, in the peripheral direction via the recessed groove 321a. From the above, the inner rotor 311 includes a plurality of permanent magnets 311a, . . . , and 311a which are arranged in the peripheral direction.

The outer rotor 312 is also arranged so that its axis of rotation may be coaxial with the axis of rotation of the motor 310, the outer rotor has a substantially cylindrical outer rotor core 322. In an outer peripheral portion of the outer rotor core 322, outer magnet mounting portions 323, . . . , and 323 of the same number as the aforementioned inner magnet mounting portions 324, . . . , and 324 are provided at predetermined pitches in the peripheral direction. Further, on an outer peripheral surface 22A of the outer rotor core 322, a recessed groove 322a which extends parallel to the axis of rotation is formed in a position between all the outer magnet mounting portions 324 and 324 which are adjacent to each other in the peripheral direction so as to be recessed radially. Moreover, a bolt insertion hole 322b shown in FIG. 25 is formed so as to pass axially through the outer rotor in a position on the internal diameter side of each of the recessed grooves 322a, . . . , and 322a of the outer rotor core 322, i.e., in a position between adjacent ones of the outer magnet mounting portions 324, . . . , and 324. The outer rotor core 322 is also formed, for example, by sintering, etc.

Each of the outer magnet mounting portions 324, . . . , and 324 includes a pair of magnet mounting holes 324a and 324a passing through the outer rotor core parallel to the axis of rotation. The pair of magnet mounting holes 324a and 324a are formed in a substantially oblong shape in a cross-section in a direction parallel to the axis of rotation, and are arranged in the same plane so as to be adjacent to each other in the peripheral direction via a center rib 324b. In addition, this plane is orthogonal to a radial line which connects the center rib 324b and the axis of rotation. Each of the magnet mounting holes 324a and 324a is mounted with a substantially plate-like permanent magnet 312a which extends parallel to the axis of rotation.

All the permanent magnets 312a mounted on the magnet mounting holes 324a, . . . , and 324a, respectively, are similarly magnetized in their thickness directions (that is, the radial direction of each of the rotors 311 and 312), and a pair of permanent magnets 312a and 312a mounted on a pair of magnet mounting holes 324a and 324a provided in the same outer magnet mounting portion 324 are set so that their magnetizing directions become the same direction. Also, for the outer magnet mounting portions 324 and 324 which are adjacent to each other in the peripheral direction in all the outer magnet mounting portions 324, . . . , and 324, a pair of permanent magnets 312a and 312a mounted on one of the inner magnet mounting portions and a pair of permanent magnets 312a and 312a mounted on the other thereof are set so that their magnetizing directions become different directions. That is, an outer magnet mounting portion 324 mounted with one pair of permanent magnets 312a and 312a having S poles on their outer peripheral side is adjacent to an inner magnet mounting portion 324 mounted with one pair of permanent magnets 312a and 312a having N poles on their outer peripheral side, in the peripheral direction via the recessed groove 322a. From the above, the outer rotor 312 also includes a plurality of permanent magnets 312a, . . . , and 312a which are arranged in the peripheral direction.

Also, each of the magnet mounting portions 323, . . . , and 323 of the inner rotor 311 and each of the magnet mounting portions 324, . . . , and 324 of the outer rotor 312 are arranged so as to face each other in the radial direction of each of the rotors 311 and 312. In this facing arrangement state, all the pairs of permanent magnets 311a and 311a are matched with any corresponding pairs of permanent magnets 312a and 312a on one-on-one level in phase of the direction of rotation. Further, even for each of the recessed grooves 321a, . . . , and 321a of the inner rotor 311, and each of the recessed grooves 322a, . . . , and 322a of the outer rotor 312, all the recessed grooves 321a, . . . , and 321a are matched with any corresponding recessed grooves 322a on one-on-one level in phase of the direction of rotation.

Figure 28:
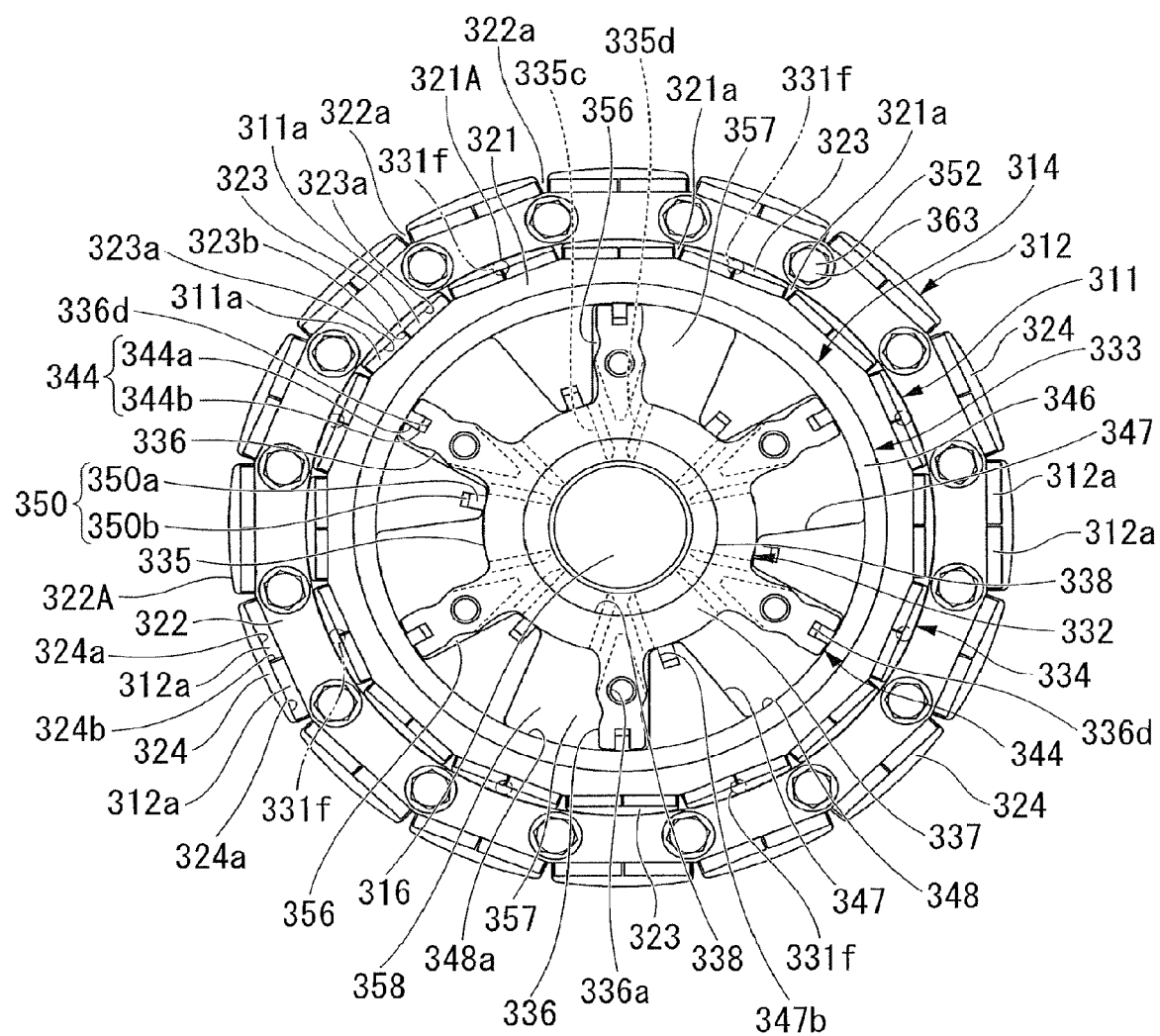
FIG. 28 is a front view showing a field-strengthening state of the inner rotor, outer rotor, and rotating mechanism of the motor, with a front drive plate omitted.

Thereby, the state of the motor 310 can be set to a proper state ranging from a field-weakening state shown in FIG. 26 where same magnetic poles of the permanent magnets 311a and 311a which makes a pair and the permanent magnets 312a and 312a which makes a pair are arranged to face each other (that is, the permanent magnets 311a and 311a which makes a pair and the permanent magnets 312a and 312a which makes a pair have an opposite pole arrangement) to a field-strengthening state shown in FIG. 28 where different magnetic poles of the permanent magnets 311a and 311a which makes a pair and the permanent magnets 312a and 312a which makes a pair are arranged to face each other (that is, the permanent magnets 311a and 311a which makes a pair and the permanent magnets 312a and 312a which makes a pair have the same pole arrangement), in all the permanent magnets 311a, ..., and 311a of the inner rotor 311, and all the permanent magnets 312a, ..., and 312a of the outer rotor 312, according to the relative positions of the inner rotor 311 and the outer rotor 312 around the axis of rotation.

Here, the stator 313 shown in FIG. 25 is formed in a substantially cylindrical shape that is arranged to face an outer peripheral portion of the outer rotor 312, and is fixed to, for example, a housing (not shown), etc. of a transmission of a vehicle.

Next, the rotating mechanism 314 which performs a change in relative phase between the inner rotor 311 and the outer rotor 312 as described above is explained.

The rotating mechanism 314 of this embodiment, as shown in FIG. 25, has a pair of disk-shaped drive plates (end plates) 331 and 331 which are joined and fixed to both axial end surfaces 312A and 312A of the outer rotor 312 via shims 325, respectively, so as to cover the space inside the outer rotor 312, a vane rotor 332 which is directly sandwiched by the drive plates 331 and 331 and thereby is integrally provided inside the outer rotor 312, and a housing 333 which constitutes a portion inside the inner rotor 311 arranged between the vane rotor 332, the outer rotor 312, and the drive plates 331 and 331, along with the inner rotor 311. The vane rotor 332 and the housing 333 are formed, for example, by sintering, etc.

Figure 27A:
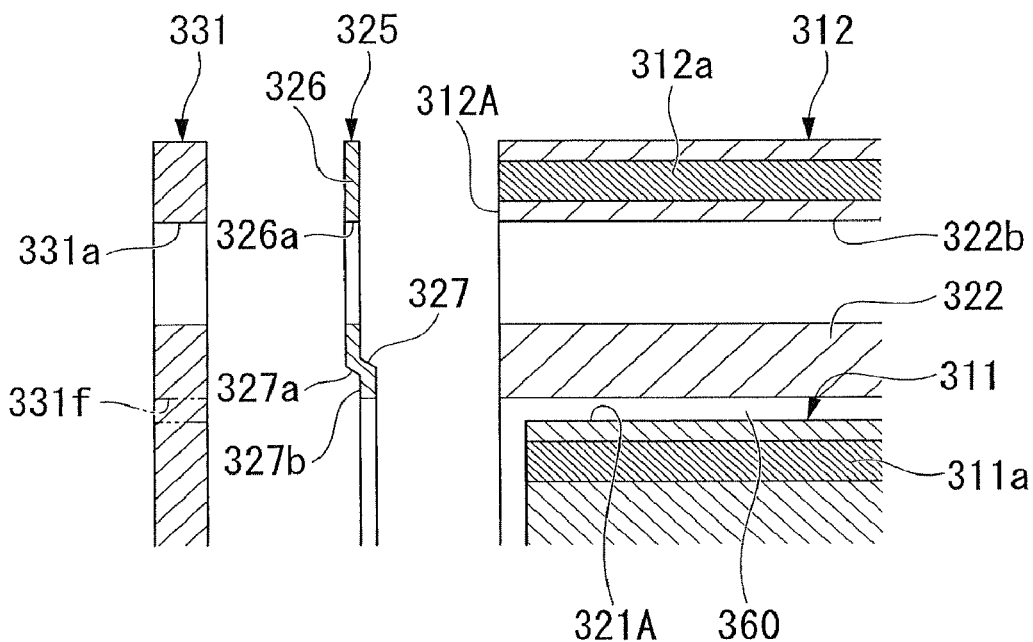
FIG. 27A is a partially enlarged sectional view before attachment, showing peripheries of bolt fastening portions of the outer rotor and drive plates of the motor.
Figure 27B:
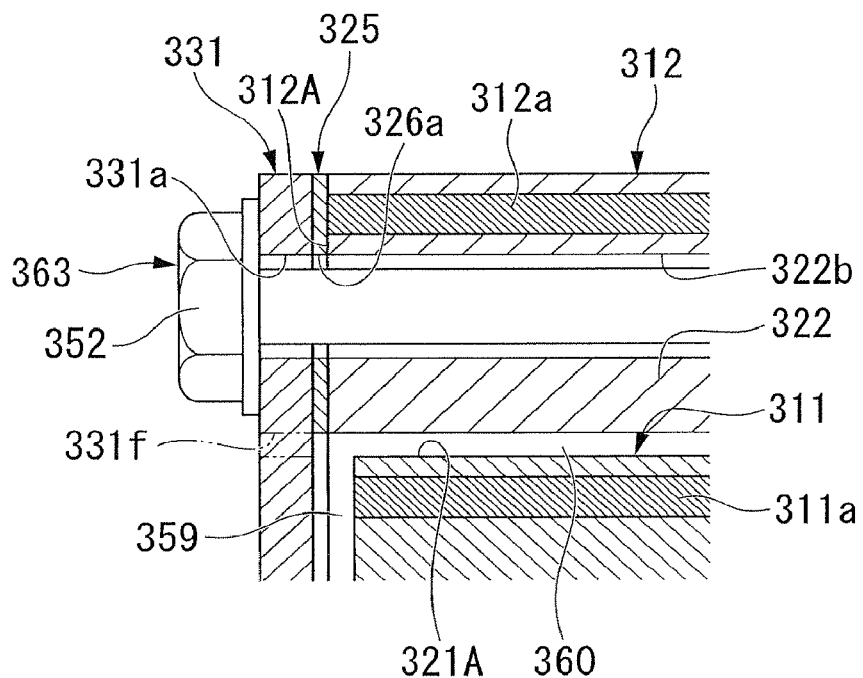
FIG. 27B is a partially enlarged sectional view after attachment, showing the peripheries of bolt fastening portions of the outer rotor and drive plates of the motor.

In the pair of drive plates 331 and 331, a plurality of bolt insertion holes 331a, ..., and 331a (having the same number as the bolt insertion holes 322b) which pass axially through each plate are formed at regular intervals on the same circumference of the plate, and an annular groove 331b which is recessed axially is formed on one side inside the bolt insertion holes 331a, ..., and 331a. Further, in the drive plate 331, a plurality of bolt insertion holes 331c, ..., and 331c which pass axially through the drive plate are formed at regular intervals on the same circumference inside the annular groove 331b. Moreover, a cylindrical portion 331d which protrudes in a cylindrical shape along the axial direction is formed on the same side as the side where the annular groove 331b is formed, in the central position of the drive plate 331 inside the bolt insertion holes 331c, ..., and 331c, and a central hole 331e which passes axially through the plate is formed inside the side where the annular groove is formed. In addition, in the drive plate 331, as shown in FIG. 27A and FIG. 27B, through holes 331f, ..., and 331f are formed at regular intervals on the same circumference such that they deviate slightly nearer to the axial center than the bolt insertion holes 331a, ..., and 331a. Here, all the through holes 331f, ..., and 331f are formed in positions (specifically, middle positions) between the bolt insertion holes 331a and 331a which are adjacent to each other.

A pair of shims 325 and 325 are formed in an annular shape as a whole, and has an annular flat-plate-shaped flat plate portion 326 which is orthogonal to the central axis, and a bead (curved portion) 327 which extends inward while being curved in a stepped shape axially from the entire periphery of an inner peripheral edge of the flat plate portion 326. In the flat plate portion 326, a plurality of (of the same number as the bolt insertion holes 331a) bolt insertion holes 326a, ..., and 326a which pass axially through each shim are formed at regular intervals. Hereinafter, the bead 327 is a so-called half bead which is formed in a stepped shape on one side axially from the flat plate portion 326, and specifically, has an annular tapered plate portion 327a which extends obliquely inward from the flat plate portion 326, and an annular inner end plate portion 327b which extends parallel to the flat plate portion 326 inward from the inner peripheral edge of the tapered plate portion 327a. When the bead 327 is sandwiched between the drive plate 331 and the outer rotor 312, the bead is deformed in the same flat plate shape as the flat plate portion 326 as a whole, and is brought into close contact with the drive plate 331 and the outer rotor 312 by an elastic force caused in such case, thereby sealing a gap between them. In addition, a so-called full bead which forms a stepped shape on opposite axial sides may be adopted.

The vane rotor 332, as shown in FIG. 26, has a cylindrical boss 335, and a plurality of (of the same number as the aforementioned bolt insertion holes 331c (specifically, six)) impeller portions 336, ..., and 336 which extend radially outward from equidistant positions in the peripheral direction on an outer peripheral surface of the boss 335.

On the opposite axial sides of the boss 335, a nipping base portion 337 of the same axial length as the impeller portions 336, ..., and 336 is formed on the outer peripheral side of the boss, and a stepped portion 338 which is recessed in a stepped shape axially inward than the nipping base portion 337 is formed on the inner peripheral side of the boss. On the internal diameter side of the boss 335, a connecting spline 335b shown in FIG. 25 is formed in an axial intermediate position of the boss. On one axial side of the connecting spline 335b, passage holes 335c, ..., and 335c which pass through the boss are formed on the same one side in the direction of the rotation of a base end of the impeller portion 336 nearest from the inner peripheral side of the position of each of the impeller portions 336 ..., and 336, and on the opposite axial side of the connecting spline 335b, as shown in FIG. 26, passage holes 335d, ..., and 335d which pass through the boss are formed on the same opposite side in the direction of the rotation of the base end of the impeller portion 336 nearest from the inner peripheral side of the position of each of the impeller portions 336 ..., and 336.

As shown in FIG. 25, on the internal diameter side of the vane rotor 332, an output shaft 316 to which the driving force of the outer rotor 312 is transmitted is attached. The output shaft 316 is provided with a connecting spline 316a coupled with the connecting spline 335b of the boss 335, an annular communication groove 316b which allows all the passage holes 335c of the boss 335 to communicate with one another in the state of being coupled by the connecting spline 316a, an annular communication groove 316c which allows all the passage holes 335d to communicate with one another in the same state, and seal grooves 316d, ..., and 316d formed in both outside positions of each of the communication grooves 316b and 316c and, and seal rings (not shown) which seal the gaps with the vane rotor 332 are arranged in the seal grooves 316d, ..., and 316d, respectively. Further, the output shaft 316 is formed with a passage hole 316e for supplying and discharging hydraulic oil to/from the communication groove 316b through the inside thereof, and a passage hole 316f for supplying and discharging hydraulic oil to/from the communication groove 316c. In addition, bearing fitting portions 316g into which a pair of bearings 342 and 342 held by, for example, a housing of a transmission of a vehicle is made to fit are respectively formed in the portions of the output shaft 316 which protrude further axially outward than the drive plates 331 and 331, and a gear 343 which transmits the rotation of the output shaft 316 is spline-coupled with the portion of one bearing fitting portion 316g on the side of the drive plate 331.

Each of the impeller portions 336, . . . , and 336 forms a substantially plate shape, and as shown in FIG. 26, a screw hole 336a which passes axially through the impeller portion is formed in an intermediate position between the impeller portions. Further, on both sides of the impeller portion in the peripheral direction, a pair of recessed portions 336b and 336b are formed on the outer peripheral side of the formation position of the screw hole 336a over the entire axial length, and a pair of recessed portions 336c and 336c are also formed inside the formation position of the screw hole 336a over the entire axial length. Moreover, on an outer peripheral surface of each of the impeller portions 336, . . . , and 336, a seal holding groove 336d which is recessed toward the center from the outer peripheral surface is formed over the entire axial length. Spring seals 344 which seal the gaps with the housing 333 are arranged in the seal holding portions 336d, . . . , and 336d, respectively. Each of the spring seals 344, . . . , and 344 is constituted by a seal 344a which is provided outside and comes into sliding contact with the housing 333, and a spring 344b which is provided inside and presses the seal 344a toward the housing 333 radially outward.

The inner rotor 311 has a ring-shaped inner rotor body 334 which is configured such that the permanent magnets 311a, . . . , and 311a are mounted on the aforementioned inner rotor core 321, and a housing 333 which is integrally fitted into the inner rotor body 334 so as to have a predetermined phase relationship. The housing 333 which constitutes part of the inner rotor 311 has a cylindrical base portion 346 with a small radial thickness, and protruding portions 347, . . . , and 347 which protrude radially inward from the equidistant positions in the peripheral direction on an inner peripheral surface of the base portion 346, and has the same number as the impeller portions 336. Here, as shown in FIG. 25, the base portion 346 protrudes over its entire periphery so as to be longer in axially opposite directions than the protruding portion 347 and the inner rotor body 334. As shown in FIG. 26, each of the protruding portions 347, . . . , and 347 forms a tapered, substantially isosceles triangular shape as seen axially. Between the protruding portions 347 and 347 which are adjacent to each other in the peripheral direction in all the protruding portions 347, . . . , and 347, a concave portion 348 where the impeller portion 336 of the aforementioned vane rotor 332 can be arranged is formed. Moreover, on an inner end surface of each of the protruding portions 347, . . . , and 347, a seal holding groove 347b which is recessed toward the external diameter side is formed over the entire axial length. Spring seals 350 which seal the gaps with an outer peripheral surface of the boss 335 of the vane rotor 332 are arranged in the seal holding portions 347b, . . . , and 347b, respectively. The spring seals 350, . . . , and 350 are constituted by a seal 350a which is provided on the inner peripheral side and comes into sliding contact with the boss 335 of the vane rotor 332, and a seal spring 350b which is provided on the external diameter side and presses the seal 350a toward the vane rotor 332. In addition, the housing 333 may be integrally connected with the inner rotor body 334 by fastening of bolts, etc.

The axial length of the aforementioned outer rotor 312 is set to be shorter than the axial length of the impeller portions 336 and the nipping base portion 337 of the vane rotor 332 even if a manufacturing error allowed at the maximum has been caused. During assembling, the axial length of an actual product of the outer rotor 312 and the axial length of the impeller portions 336 and the nipping base portion 337 of an actual product of the vane rotor 332 are measured.

Also, in a case where respective parts are assembled, first, for example, two shims 325 having a thickness of half of the difference between the axial length of the actual product of the outer rotor 312 which is measured as mentioned above, and the axial length of the impeller portions 336 and the nipping base portion 337 of the actual product of the vane rotor 332 are selected from two or more kinds of shims having different thicknesses, which are prepared in advance.

Next, in a state where the drive plate 331 and the vane rotor 332 are combined together by making the cylindrical portion 331d of one drive plate 331 fit into one stepped portion 338 of the vane rotor 332, bolts 354 are inserted into bolt insertion holes 331c, . . . , and 331c, respectively, of the drive plate 331, and the bolts 354, . . . , and 354 are screwed to the screw hole 336a, respectively, of the impeller portions 336 of the vane rotor 332. Also, by inserting the impeller portions 336, . . . , and 336 into the concave portions 348, respectively, on one-on-one level in a state where the spring seals 344 are attached to the impeller portions 336, . . . , and 336, respectively, of the vane rotor 332, the inner rotor 311 which is configured such that the housing 333 is press-fitted into the inner rotor body 334 in advance is combined with one drive plate 331 in a state where the spring seals 350, . . . , and 350 are attached. Then, after the end surface 312A of the outer rotor 312 is combined with one drive plate 331 via the shim 325 so as to cover the outside of the inner rotor 311, the shim 325 is also arranged in the opposite end surface 312A of the outer rotor 312, the other drive plate 331 is combined from the opposite side by making the other fitting portion 338 of the vane rotor 332 fit into the central hole 331e, and bolts 352 are respectively inserted into the bolt insertion holes 331a, . . . , and 331a of the drive plate 331, the bolt insertion holes 326a, . . . , and 326a of the shim 325, the bolt insertion holes 322b, . . . , and 322b of the outer rotor 312, the bolt insertion holes 326a, . . . , and 326a of the shim 325, and the bolt insertion holes 331a, . . . , and 331a of the aforementioned one drive plate 331, and nuts 353 are screwed to the bolts 352, . . . , and 352, respectively. Moreover, the bolts 354 are inserted into the bolt insertion holes 331c, . . . , and 331c, respectively, of the other drive plate 331, and the bolts 354, . . . , and 354 are screwed to the screw holes 336a, respectively, of the impeller portions 336 of the vane rotor 332.

Here, the aforementioned bolt 352 and nut 353 constitute a bolt fastening portion 363 which fasten a surrounding portion of the bolt insertion hole 331a of one drive plate 331, a surrounding portion of the bolt insertion hole 326a of one shim 325, a surrounding portion of the bolt insertion hole 322b of the outer rotor 312, a surrounding portion of the bolt insertion hole 326a of the other shim 325, and a surrounding portion of the bolt insertion hole 331a of the other drive plate 331, and such a bolt fastening portion 363 is formed at predetermined intervals in the peripheral direction. By fastening of the bolt fastening portions 363, . . . , and 363, the annular beads 327 of both the shims 325 and 325 which are nearer to the axial center than each of the bolt fastening portions 363, . . . , and 363 are sandwiched between the drive plate 331 and the outer rotor 312, and are deformed in a flat plate shape as a whole, and consequently are brought into close contact with the drive plate 331 and the outer rotor 312 by a restoring force, thereby sealing a gap between them. In addition, since the through holes 331f, . . . , and 331f of the drive plate 331 are formed in positions (specifically, middle positions) between the bolt insertion holes 331a and 331a which are adjacent to each other in the peripheral direction as described above, the through holes are formed in positions (specifically, middle positions) between the adjacent bolt fastening portions 363 and 363 inserted through the adjacent bolt insertion holes 331a and 331a (refer to FIG. 26).

From the above, the drive plates 331 and 331 fixed to both axial end surfaces of the outer rotor 312 are integrally fixed by the impeller portions 336, . . . , and 336 of the vane rotor 332 and bolts 354, . . . , and 354. In addition, as the bolts 354, . . . , and 354 which fix the impeller portions 336, . . . , and 336 to the drive plate 331, ones which are fewer in number than and larger in size than the bolts 352, . . . , and 352 which fix the outer rotor 312 to the drive plate 331 are used.

Then, the output shaft 316 is fitted into the vane rotor 332. At that time, the connecting spline 316a and the connecting spline 335b are coupled together. As a result, the output shaft 316 is integrally fixed to the vane rotor 332. Of course, the above assembling procedure is an example, and assembling can also be made by a procedure different from the above.

From the above, the inner rotor 311 which is configured such that the housing 333 and the inner rotor body 334 are integrated is provided in a space 358 between the drive plates 332 and 331 inside the outer rotor 312 and outside the vane rotor 332, and consequently, is rotatably held by both axial portions of the base portion 346 inserted into the annular grooves 331b and 331b of the drive plates 331 and 331. Moreover, the impeller portions 336 of the vane rotor 332 are arranged in the concave portions 348, . . . , and 348, respectively, of the housing 333 one by one. Further, the output shaft 316 spline-coupled with the vane rotor 332 becomes integral and rotatable with the outer rotor 312, the drive plates 331 and 331, and the vane rotor 332, and specifically is integrally fixed thereto. In addition, since the inner rotor 311 becomes rotatable with respect to the outer rotor 312 and the drive plates 331 and 331 which are provided integrally, both axial end surfaces of the inner rotor can form a gap 359 between the drive plates 331 which face each other, and the outer peripheral surface 321A also has a slight gap 360 with the outer rotor 312. In addition, the shims 325 and 325 which are interposed between both the end surfaces 312A and 312A of the outer rotor 312, and the drive plates 331 and 331 are formed within the ranges of the end surfaces 312A of the outer rotor 312, and do not extend up to the region of the gap 360 between the outer rotor 312 and the inner rotor 311. Further, the through holes 331f, . . . , and 331f of the drive plate 331 are nearer to the axial center than the shim 325, and are formed at a side of the gap 360, and specifically on an extension line of the gap 360 which runs along the central axis so as to open to the gap 360.

Here, in a field-strengthening state where different poles of the permanent magnets 312a, . . . , and 312a of the outer rotor 312 and the permanent magnets 311a, . . . , and 311a of the inner rotor 311 are made to face each other, as shown in FIG. 28, each of all the impellers 336, . . . , and 336 abut on the protruding portion 348 which is adjacent to the impeller on the same one side in the direction of rotation within the corresponding concave portion 347, and consequently, forms a first pressure chamber 356 with the abutting protruding portion 347, and forms a second pressure chamber 357, which is wider than the first pressure chamber 356, with the protruding portion 347 which is adjacent to the impeller on the same opposite side in the direction of rotation (in other words, the first pressure chambers 356, . . . , and 356 and the second pressure chambers 357, . . . , and 357 are formed by the impellers 336, . . . , and 336 accommodated in the concave portions 348, . . . , and 348 and concave portions 348, . . . , and 348). As a result, the first pressure chambers 356, . . . , and 356 and the second pressure chambers 357, . . . , and 357 are defined inside the inner rotor 311.

On the contrary, in a field-weakening state where same poles of the permanent magnets 312a, . . . , and 312a of the outer rotor 312 and the permanent magnets 311a, . . . , and 311a of the inner rotor 311 are made to face each other, as shown in FIG. 26, each of all the impellers 336, . . . , and 336 abut on the protruding portion 347 which is adjacent to the impeller on the same opposite side in the direction of rotation within the corresponding concave portion 348, and consequently, reduces the second pressure chamber 357, and expand the first pressure chamber 356 with the protruding portion 347 which is adjacent to the impeller the same one side in the direction of rotation. In addition, the passage holes 335c, . . . , and 335c of the vane rotor 332 are provided in the first pressure chambers 356, . . . , and 356, respectively, so as to always open on one-on-one relation, and the passage holes 335d, . . . , and 335d of the vane rotor 332 are provided in the second pressure chambers 357, . . . , and 357, respectively, so as to always open on one-on-one relation.

Here, in the outer rotor 312 and the inner rotor 311, the field-strengthening position shown in the FIG. 28 which the permanent magnets 312a, . . . , and 312a and the permanent magnets 311a, . . . , and 311a face and attract each other with mutually different polarities is set to an origin position when the first pressure chambers 356, . . . , and 356 and the second pressure chambers 357, . . . , and 357 do not receive any hydraulic oil pressure substantially. In addition, the first pressure chambers 356, . . . , and 356 and the second pressure chambers 357, . . . , and 357 are also filled with hydraulic oil in a state where they do not receive any hydraulic oil pressure. Also, from the state of being in this origin position, when hydraulic oil is discharged via each of the passage holes 335d, . . . , and 335d from each of the second pressure chambers 357, . . . , and 357 simultaneously when hydraulic oil is introduced into each of the first pressure chambers 356, . . . , and 356 via each of the passage holes 335c, . . . , and 335c (that is, hydraulic oil is introduced into the first pressure chambers 356, . . . , and 356), the outer rotor 312 and the inner rotor 311 relatively rotate against a magnetic force, and are brought into a field-weakening state. On the contrary, when hydraulic oil is discharged via each of the passage holes 335c, . . . , and 335c from each of the first pressure chambers 356, . . . , and 356 simultaneously when hydraulic oil is introduced into each of the second pressure chambers 357, . . . , and 357 via each of the passage holes 335d, . . . , and 335d, the outer rotor 312 and the inner rotor 311 return to an origin position and are brought into a field-strengthening state. In this case, the permanent magnets 312a, . . . , and 312a of the outer rotor 312 and the permanent magnets 311a, . . . , and 311a of the inner rotor 311 attract each other by a magnetic force. Therefore, the pressure of the hydraulic oil introduced into each of the second pressure chambers 357, . . . , and 357 is only required to be lower than a pressure required in a case where phase is changed to the field-weakening state. In some cases, even if hydraulic pressure is not introduced, only the supply and discharge of hydraulic oil is required.

Further, in the motor 310, the rotational direction when the inner rotor 311 returns to an origin position from a weakening state where same polarities of the permanent magnets 312a, . . . , and 312a and the permanent magnets 311a, . . . , and 311a are made to face each other with respect to the outer rotor 312 is made to coincide with the direction of the moment of inertia caused during deceleration rotation. That is, the motor 310 is set so as to rotate the outer rotor 312 and the inner rotor 311 in the clockwise direction in FIGS. 26 and 28 during forward traveling of a vehicle, and when the outer rotor 312 decelerates from the field-weakening state shown in FIG. 26, the moment of inertia to return to a field-strengthening state shown in FIG. 28 is generated in the inner rotor 311 in a floating state.

Here, since hydraulic oil is incompressible, in not only the change of phase to both limit ends of the field-strengthening state and the field-weakening state as described above, even in an intermediate position between both the limit ends, a hydraulic controller (not shown) stops the supply and discharge of the hydraulic oil to/from all the first pressure chambers 356, . . . , and 356 and the second pressure chambers 357, . . . , and 357, for example, by shutoff of an opening and closing valve (not shown), whereby the outer rotor 312 and the inner rotor 311 maintains the phase relationship at that point of time. As a result, a phase change in an arbitrary field state can be stopped.

From the above, the aforementioned vane rotor 332 is integrally fixed to the outer rotor 312 and becomes integral and rotatable, and is arranged inside the inner rotor 311. Moreover, the vane rotor 332 is integrally fixed to the outer rotor 312 via the drive plates 331 and 331 fixed to the outer rotor 312 so as to cover both axial end surfaces of the outer rotor 312 and the inner rotor 311, and is integrally provided even in the output shaft 316 which outputs the driving force of the outer rotor 312. Further, the aforementioned housing 333 is integrally fitted to the inner rotor body 334 and becomes integral and rotatable, and its concave portion 348 defines the first pressure chamber 356 and the second pressure chamber 357 inside the inner rotor 311 with the vane rotor 332. Moreover, by supply and discharge of hydraulic oil, i.e., by control of introduction of hydraulic oil pressure to/from the first pressure chamber 356 and the second pressure chamber 357, the relative phase of the vane rotor 332 to the housing 333 is changed. As a result, the relative phase between the inner rotor 311 and the outer rotor 312 is changed. Here, the relative phase between the inner rotor 311 and the outer rotor 312 can be changed to advance side or retard side by an electrical angle of 180°, and the state of the motor 310 can be set to a proper state between a field-weakening state where the same magnetic poles of the permanent magnets 311$a$ of the inner rotor 311 and the permanent magnets 312$a$ of the outer rotor 312 are arranged to face each other and a field-strengthening state where different magnetic poles of the permanent magnets 311$a$ of the inner rotor 311 and the permanent magnets 312$a$ of the outer rotor 312 are arranged to face each other.

In addition, the inner rotor 311 in which the inner rotor body 334 and the housing 333 are integrated is arranged so as to be rotatable in the peripheral direction in the space 358 shown in the FIG. 26 between the outer rotor 312, the vane rotor 332, and both the drive plates 331 and 331, which is formed as the drive plates 331 which transmit the driving force of the outer rotor 312 to the output shaft 316 are fixed to both axial end surfaces, respectively, of the outer rotor 312 and the vane rotor 332. In addition, the inner rotor 311 in which the inner rotor body 334 and the housing 333 are integrated is rotatably provided in a floating state within the space 358 (that is, the inner rotor is not fixed to the drive plates 331 and 331 and the output shaft 316).

Figure 29A:
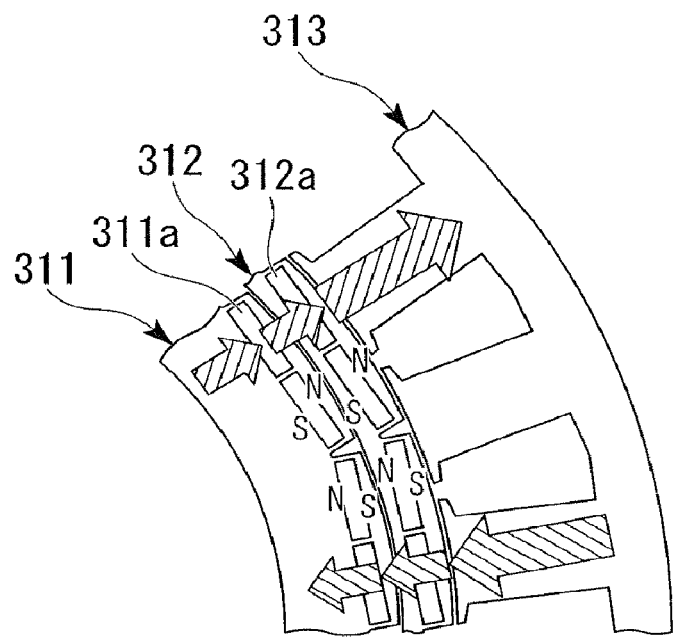
FIG. 29A is a view schematically showing a field-strengthening state where permanent magnets of the inner rotor and permanent magnets of the outer rotor have a same pole arrangement.
Figure 29B:
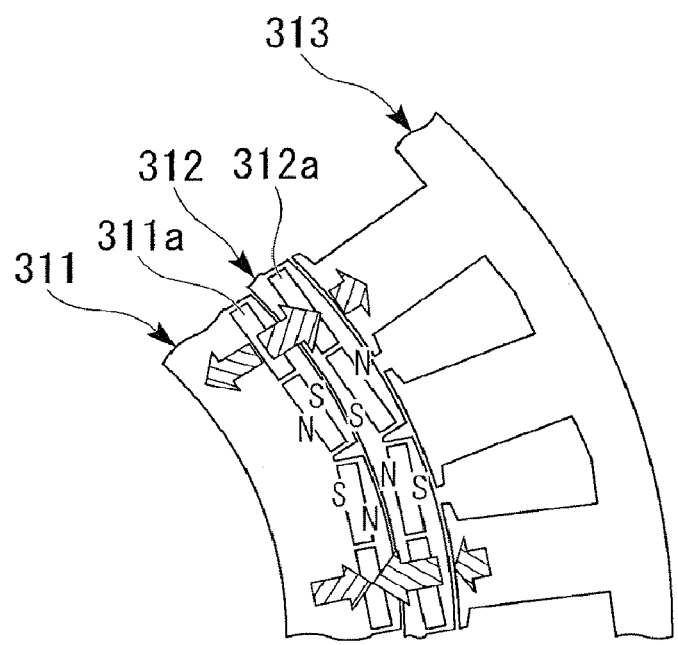
FIG. 29B is a view schematically showing a field-weakening state where permanent magnets of the inner rotor and permanent magnets of the outer rotor have an opposite pole arrangement.
Figure 30:
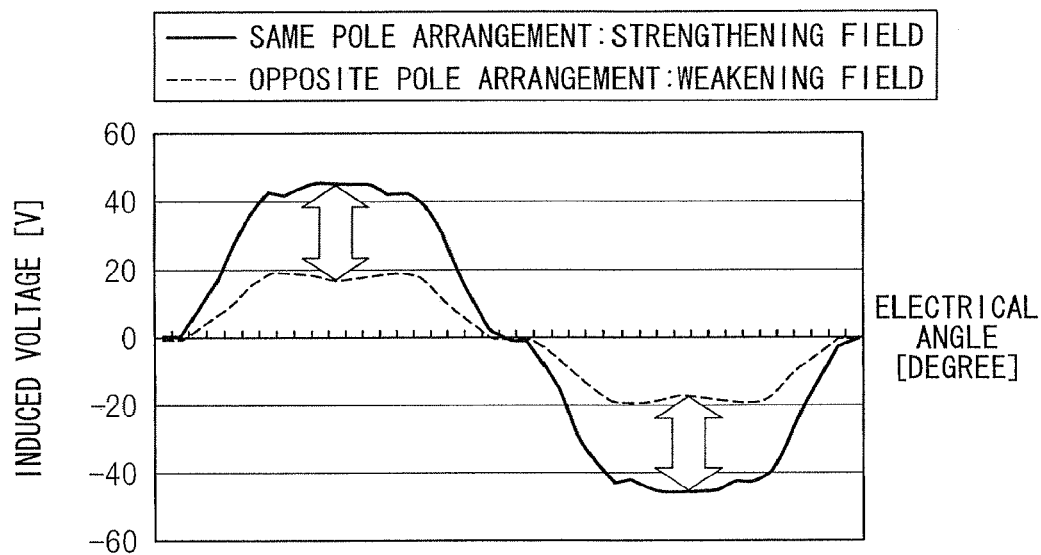
FIG. 30 is a graph showing an induced voltage in the field-strengthening state and the field-weakening state shown in FIG. 29A.

In addition, in the field-strengthening state where the permanent magnets 311$a$ of the inner rotor 311 and the permanent magnets 312$a$ of the outer rotor 312 have a same pole arrangement as shown in, for example, FIG. 29A, and in the field-weakening state where the permanent magnets 311$a$ of the inner rotor 311 and the permanent magnets 312$a$ of the outer rotor 312 have an opposite pole arrangement as shown in, for example, FIG. 29B, the intensity of an induced voltage changes as shown in, for example, FIG. 30. Therefore, an induced voltage constant Ke is changed by changing the state of the motor 310 between the field-strengthening state and the field-weakening state.

The induced voltage constant Ke is, for example, a rotational frequency ratio of an induced voltage induced by winding ends of the stator windings 313$a$ by the rotation of each of the rotors 311 and 312, and can be described as $Ke=8\times p\times R\times L\times B\times T\times \pi$ by the product of the number of pole pairs p, the external diameter of a motor R, motor stacking thickness L, magnetic flux density B, and the number of turns T. Thereby, by changing the state of the motor 310 between the field-strengthening state and the field-weakening state, the intensity of the magnetic flux density B of a field flux by the permanent magnets 311$a$ of the inner rotor 311 and the permanent magnets 312$a$ of the outer rotor 312 changes, and the induced voltage constant Ke is changed.

Figure 31A:
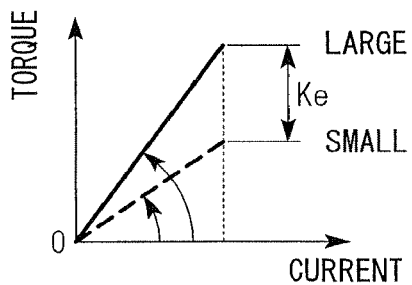
FIG. 31A is a graph showing the relationship between the current and torque of the motor which change according to an induced voltage constant Ke.
Figure 31B:
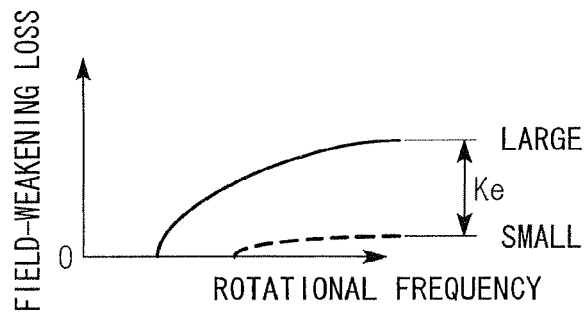
FIG. 31B is a graph showing the relationship between the rotational frequency and field-weakening loss of the motor which change according to an induced voltage constant Ke.

Here, as shown in, for example, FIG. 31A, the torque of the motor 310 is proportional to the product of the induced voltage constant Ke and a current applied to the stator windings 213$a$ (Torque $\propto$ (Ke$\times$Current)). Further, as shown in, for example, FIG. 31B, the field-weakening loss of the motor 310 is proportional to the product of the induced voltage constant Ke and a rotational frequency (Field-weakening loss $\propto$ (Ke$\times$Rotational frequency)). Therefore, the allowable rotational frequency of the motor 310 is proportional to an inverse number of the product of the induced voltage constant Ke and the rotational frequency (Allowable rotational frequency $\propto$ (1/(Ke$\times$Rotational frequency))).

Figure 32:
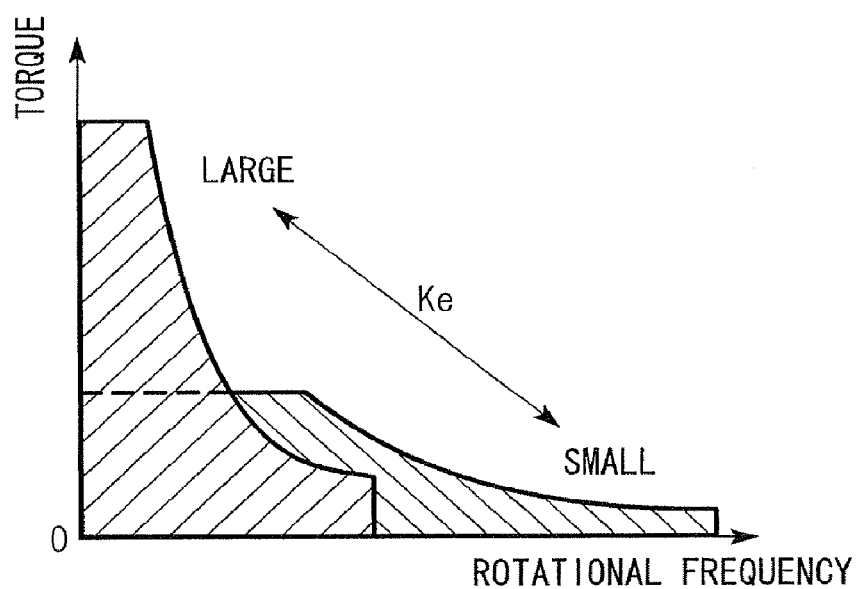
FIG. 32 is a view showing an operational region relevant to the rotational frequency and torque of the motor which change according to the induced voltage constant Ke.
Figure 33A:
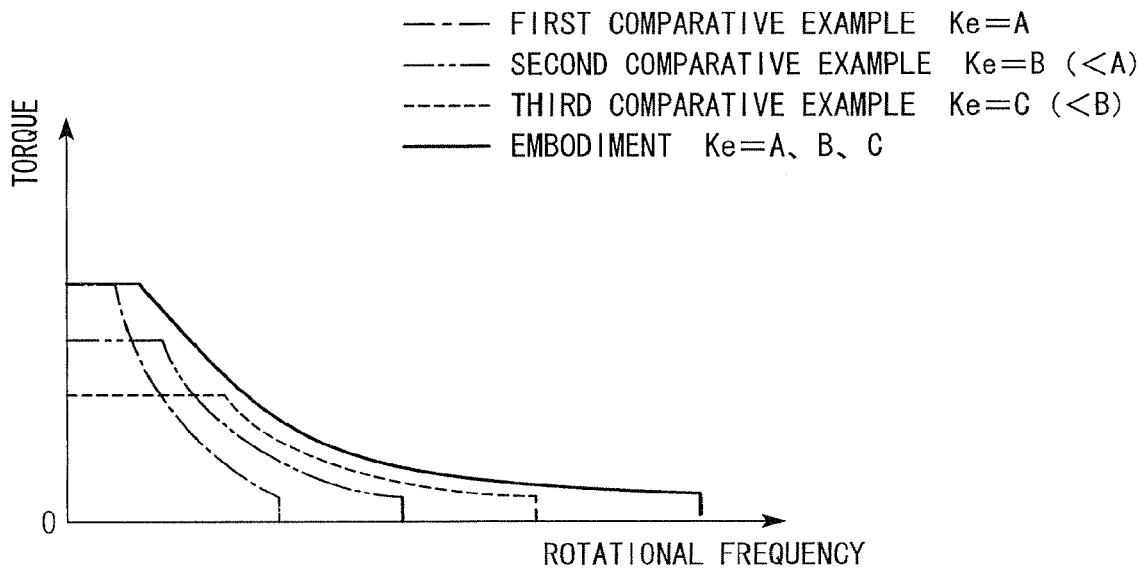
FIG. 33A is a graph showing the relationship between the rotational frequency and torque of the motor which change according to an induced voltage constant Ke.
Figure 33B:
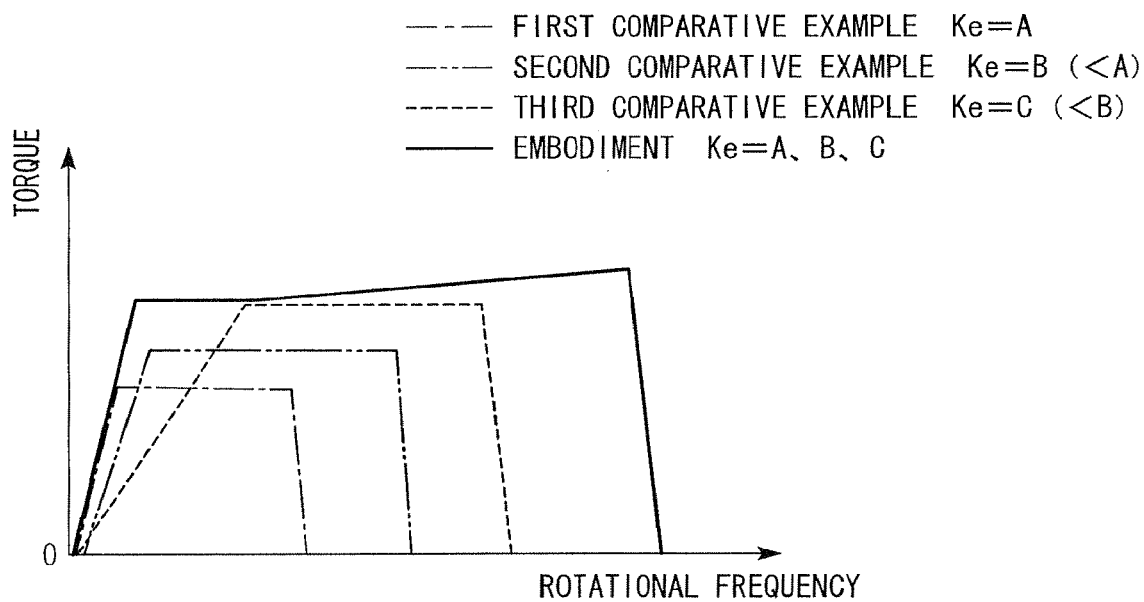
FIG. 33B is a graph showing the relationship between the rotational frequency and output of the motor which change according to an induced voltage constant Ke.
Figure 34A:
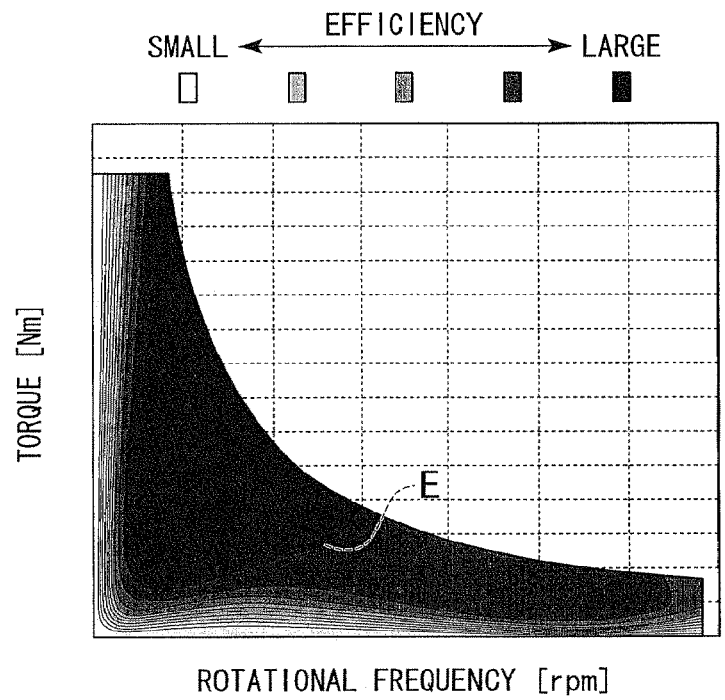
FIG. 34A is a view showing an operational region and efficiency distribution relevant to the rotational frequency and torque of the motor which change according to the induced voltage constant Ke in the embodiment.
Figure 34B:
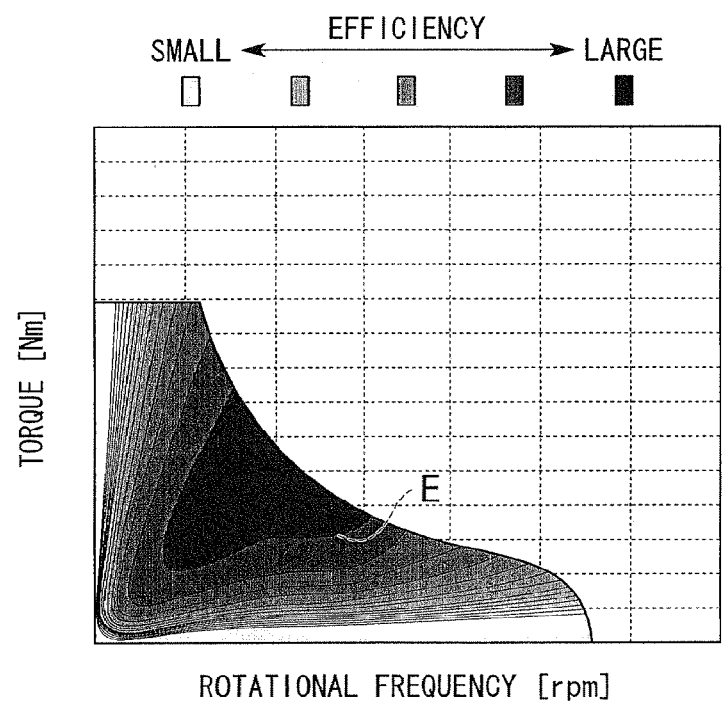
FIG. 34B is a view showing an operational region and efficiency distribution relevant to the rotational frequency and torque of the motor which change according to the induced voltage constant Ke in the second comparative embodiment.

That is, as shown in, for example, FIG. 32, in the motor 310 in which the induced voltage constant Ke is relatively large, an operational rotational frequency falls relatively, but it is possible to output a relatively large torque. On the other hand, in the motor 310 in which the induced voltage constant Ke is relatively small, the torque which can be output falls relatively, but the operation to a relatively high rotational frequency becomes possible. As a result, an operational region relevant to a torque and a rotational frequency changes according to the induced voltage constant Ke. For this reason, like an embodiment shown in, for example, FIG. 33A, by making a setting so that the induced voltage constant Ke may change to a falling tendency as the rotational frequency of the motor 310 increases (for example, sequential change to A, B (<A), and C (<B)), an operational region relevant to a torque and a rotational frequency is expanded, compared with a case (for example, the first to third comparative examples) where the induced voltage constant Ke is not changed.

Further, the output of the motor 310 is proportional to a value which is obtained by subtracting the field-weakening loss and other losses from the product of the induced voltage constant Ke, a current applied to the stator windings 313$a$, and a rotational frequency (Output $\propto$ (Ke$\times$Current$\times$Rotational frequency−Field-weakening loss−Other losses)). That is, as shown in, for example, FIG. 33B, in the motor 310 in which the induced voltage constant Ke is relatively large, an operational rotational frequency falls relatively, but the output in a relatively low rotational frequency region increases. On the other hand, in the motor 310 in which the induced voltage constant Ke is relatively small, the output in a relatively low rotational frequency region decreases, but the operation to a relatively high rotational frequency becomes possible, and the output at a relatively high rotational frequency increases. As a result, an operational region relevant to an output and a rotational frequency changes according to the induced voltage constant Ke. For this reason, by making a setting so that the induced voltage constant Ke may change to a falling tendency as the rotational frequency of the motor 310 increases (for example, sequential change to A, B (<A), and C (<B)), an operational region relevant to an output and a rotational frequency is expanded, compared with a case (for example, the first to third comparative examples) where the induced voltage constant Ke is not changed.

Further, the efficiency of the motor 310 is proportional to a value which is obtained by subtracting a copper loss, the field-weakening loss, and other losses from the input power to the stator windings 313a (Efficiency ∝ (Input power−Copper loss−Field-weakening loss−Other losses)/Input power)). For this reason, by selecting a relatively large induced voltage constant Ke in a relatively low rotational frequency region to a middle rotational frequency region, the current which is required to output a desired torque decreases, and the copper loss decreases.

Also, by selecting a relatively small induced voltage constant Ke in the middle rotational frequency region to a relatively high rotational frequency region, a field-weakening current decreases, and the field-weakening loss decreases. Thereby, like an embodiment shown in, for example, FIG. 34A, by making a setting so that the induced voltage constant Ke may change to a falling tendency as the rotational frequency of the motor 310 increases, an operational region relevant to a rotational frequency and a rotational frequency is expanded, an efficient region E where the efficiency of the motor 310 becomes a predetermined efficiency or more is expanded, and the value of maximum efficiency which is reachable increases, compared with a case (for example, the second comparative example shown FIG. 34B) where the induced voltage constant Ke is not changed.

As described above, according to this embodiment, first, the permanent magnets 311a and the permanent magnets 312a are arranged in the peripheral direction in the inner rotor 311 and the outer rotor 312. Thereby, for example, the amount of interlinking magnetic fields that the field fluxes generated by the permanent magnets 312a of the outer rotor 312 interlink the stator windings 313a can be efficiently increased or reduced by the field fluxes generated by the permanent magnets 311a of the inner rotor 311. Also, in the field-strengthening state, the torque constant (that is, torque/phase current) of the motor 310 can be set to a relatively high value. The maximum value of the torque output by the motor 310 can be increased without reducing a current loss during the operation of the motor or without changing the maximum value of the output current of an inverter (not shown) which controls application of a current to the stator windings 313a.

Moreover, the rotating mechanism 314 supplies and discharges hydraulic oil to/from the first pressure chambers 356, . . . , and 356 and the second pressure chambers 357, and 357 which are defined inside the inner rotor 311 by the vane rotor 332 integrally and rotatably provided with respect to the outer rotor 312 and the housing 333 integrated with the inner rotor body 334 to constitute part of the inner rotor 311, thereby changing the relative phase between the inner rotor 311 and the outer rotor 312. Therefore, it is possible to make an induced voltage constant variable easily and properly and with desired timing while suppressing complication of the motor 310. As a result, it is possible to expand an operational rotational frequency range and torque range, improve operating efficiency, and expand an operational range at high efficiency.

Moreover, by controlling the amount of supply of hydraulic oil to the first pressure chambers 356, . . . , and 356 and the second pressure chambers 357, . . . , and 357, the relative phase between the inner rotor 311 and the outer rotor 312 can be changed without steps within a range of an electrical angle of 180° between a field-weakening state and a field-strengthening state. In addition, since the vane rotor 332 and the housing 333 define the first pressure chambers 356, . . . , and 356 and the second pressure chambers 357, . . . , and 357 inside the inner rotor 311, particularly an increase in axial thickness of the motor 310 can be suppressed, and the motor can be miniaturized.

Specifically, if hydraulic oil is discharged from the second pressure chambers 357, . . . , and 357 while the hydraulic oil is supplied to the first pressure chambers 356, . . . , and 356 defined by the impeller portions 336, . . . , and 336 of the vane rotor 332 and the concave portions 348, . . . , and 348 of the housing 333, the relative phase between the housing 333 and the vane rotor 332 changes in a direction in which the first pressure chambers 356, . . . , and 356 are expanded. As a result, the relative phase between the inner rotor 311 integrally provided outside the housing 333 and the outer rotor 312 integrally provided in the vane rotor 332 is changed, which brings about a field-weakening state. On the other hand, if hydraulic oil is discharged from the first pressure chambers 356, . . . , and 356 while the hydraulic oil is supplied to the second pressure chambers 357, . . . , and 357, the relative phase between the housing 333 and the vane rotor 332 is changed in a direction in which the second pressure chambers 357, . . . , and 357 are expanded. As a result, the relative phase between the inner rotor 311 and the outer rotor 312 is changed, which brings about a field-strengthening state. As described above, a simple vane actuator mechanism having the vane rotor 332 and the housing 333 is used as the rotating mechanism 314. Therefore, it is possible to make an induced voltage constant variable easily and properly and with desired timing while suppressing complication of the motor 310.

In addition, since the vane rotor 332 is integrally provided in the outer rotor 312 via the drive plates 331 and 331 fixed to the outer rotor 312 so as to cover the axial end surfaces, and is also integrally provided in the output shaft 316 which outputs the driving force of the outer rotor 312, the rotation of the outer rotor 312 can be transmitted to the output shaft 316 by direct coupling, while the pressure of the hydraulic oil introduced into the first pressure chambers 356, . . . , and 356 and the second pressure chambers 357, . . . , and 357 is mainly used for change of the relative phase between the housing 333 and the vane rotor 332 which are integrally provided inside the inner rotor 311, i.e., the relative phase between the inner rotor 311 and the outer rotor 312. Accordingly, the pressure which is required to be generated by the hydraulic oil can be suppressed low.

Moreover, when the drive plates 331 and 331 are fixed to both the axial ends of the outer rotor 312 and the vane rotor 332, the shims 325 and 325 are interposed between the drive plates 331 and 331 and the end surfaces 312A and 312A of the outer rotor 312. Therefore, the manufacturing error of the axial length of the outer rotor 312 and the vane rotor 332 can be adjusted by the shims 325 and 325 during attachment. Accordingly, the drive plates 331 and 331 can be prevented from being tilted due to the attachment.

In addition, although the outer rotor 312 and the drive plates 331 and 331 are connected together by the bolt fastening portions 363, . . . , and 363 in a state where the shims 325 and 325 are interposed, the gaps between the outer rotor 312 and the drive plates 331 and 331 can be sealed by the beads 327 of the shims 325 and 325 which are formed nearer to the axial center than the bolt fastening portions 363, . . . , and 363. Thereby, even if hydraulic oil passes through the gaps 359 between the drive plates 331 and 331 and the inner rotor 311 by a centrifugal force from the first pressure chamber 356 and the second pressure chamber 357 which are formed between the housing 333 and the vane rotor 332, the hydraulic oil can be prevented from entering between the drive plates 331 and 331 and the outer rotor 312. Accordingly, the hydraulic oil can be prevented from entering between the outer rotor 312 and the stator 313 through between the outer rotor 312 and the drive plates 331 and 331, and friction can be prevented from being caused between these rotors.

Further, the hydraulic oil which has passed through the gaps 359 between the drive plates 331 and 331 and the inner rotor 311 by a centrifugal force from the first pressure chamber 356 and the second pressure chamber 357 and which is prevented from entering between the drive plates 331 and 331 and the outer rotor 312 by the shims 325 and 325 enters the gap 360 between the outer rotor 312 and the inner rotor 311 to cool down the outer rotor 312 and the inner rotor 311, or is discharged to the outside of the drive plates 331 and 331 from the through holes 331f, . . . , and 331f formed at sides of the gap 360 of the drive plates 331 and 331, and is applied to mainly the stator windings 313a of the stator 313 by a centrifugal force to cool down it. Accordingly, the outer rotor 312 and the stator 313 can also be cooled down well.

Moreover, since the through holes 331f, . . . , and 331f are formed between the adjacent bolt fastening portions 363 and 363, the through holes can be formed even if the axial shift length of the through holes 331f, . . . , and 331f and the bolt fastening portions 363, . . . , and 363 is small. Accordingly, the axial thickness of the outer rotor 312 which affects the axial shift length can be made small.

Moreover, since hydraulic oil is supplied to and discharged from the first pressure chambers 356, . . . , and 356 and the second pressure chambers 357, . . . , and 357 via the vane rotor 332, an increase in axial thickness accompanying formation of flow passages for hydraulic oil can be suppressed.

As described above, the motor of the invention offers the following features.

(14) In a motor (for example, the motor 310 in the embodiment) including an inner rotor (for example, the inner rotor 311 in the embodiment) having inner permanent magnets (for example, the inner permanent magnets 311a in the embodiment) arranged in a peripheral direction and an outer rotor (for example, the outer rotor 312 in the embodiment) having outer permanent magnets (for example, the outer permanent magnets 312a in the embodiment) arranged in the peripheral direction, the mutual axes of rotation of the inner and outer rotors being arranged coaxially, and a rotating means (for example, the rotating mechanism 314 in the embodiment) capable of making at least one of the inner rotor and the outer rotor rotate around the axes of rotation to change the relative phase between the inner rotor and the outer rotor, the rotating device includes a housing (for example, the housing 333 in the embodiment) which constitutes part of the inner rotor, and a vane rotor (for example, vane rotor 332 in the embodiment) which is integrally provided in the outer rotor, forms pressure chambers (for example, the first pressure chamber 356 and the second pressure chamber 357 in the embodiment) with the housing, and changes the relative phase with respect to the housing by the pressure of a working fluid supplied to the pressure chambers, the inner rotor is arranged so as to be rotatable in the peripheral direction in a space (for example, the space 358 in the embodiment) between the outer rotor, the vane rotor, and both end plates, which is surrounded as the end plates (for example, the drive plates 331 in the embodiment) which transmit the driving force of the outer rotor to an output shaft (for example, the output shaft 316 in the embodiment) are fixed to both axial ends of the outer rotor and the vane rotor, and the end plates and end surfaces of the outer rotor are joined via shims (for example, the shims 325 in the embodiment). According to the motor, the permanent magnets are arranged in the peripheral direction in the inner rotor and the outer rotor. Thereby, for example, the amount of interlinking magnetic fields that the field fluxes generated by the permanent magnets of the outer rotor interlink with the stator windings can be efficiently increased or reduced by the field fluxes generated by the permanent magnets of the inner rotor. Also, in the field-strengthening state, the torque constant (that is, torque/phase current) of the motor can be set to a relatively high value. The maximum value of the torque output by the motor can be increased without reducing a current loss during the operation of the motor or without changing the maximum value of the output current of an inverter (not shown) which controls application of a current to the stator windings.

Moreover, as the rotating device, a simple vane actuator mechanism having the housing which constitutes part of the inner rotor, and the vane rotor which is integrally provided in the outer rotor, forms pressure chambers with the housing, and changes the relative phase with respect to the housing by the working fluid pressure introduced into the pressure chambers is used. Therefore, it is possible to make an induced voltage constant variable easily and properly and with desired timing while suppressing complication of the motor.

In addition, since the inner rotor is arranged so as to be rotatable in the peripheral direction in a space between the outer rotor, the vane rotor, and both end plates, which is surrounded as the end plates which transmit the driving force of the outer rotor to an output shaft are fixed to both the axial ends of the outer rotor and the vane rotor, the pressure of the working fluid is mainly used for the change of the relative phase between the housing which constitutes part of the inner rotor and the vane rotor, i.e., the relative phase between the inner rotor and the outer rotor. Accordingly, the pressure which is required to be generated by the working fluid can be suppressed low.

Moreover, when the drive plates are fixed to both the axial ends of the outer rotor and the vane rotor, the shims are interposed between the drive plates and the end surfaces of the outer rotor. Therefore, the manufacturing error of the axial length of the outer rotor and the vane rotor can be adjusted by the shims during attachment. Accordingly, the drive plates can be prevented from being tilted due to the attachment.

(15) In the above (14), a configuration in which through holes (for example, the through holes 331f in the embodiment) are formed at sides of a gap between the outer rotor and the inner rotor (for example, gap 360 in the embodiment) in the end plates may be adopted.

In this case, the working fluid which has passed through the gaps between the end plates and the inner rotor by a centrifugal force from the pressure chambers and which is prevented from entering between the end plates and the outer rotor by the shims is discharged to the outside of the end plates from the through holes formed at sides of the gap between the outer rotor and the inner rotor in the end plates, and is applied to the stator by a centrifugal force to cool down it. Accordingly, the stator can be cooled down well.

(16) In the above (15), a configuration in which the outer rotor and the end plates are connected together by bolt fastening portions (for example, the bolt fastening portions 363 in the embodiment) with every predetermined intervals with the shims interposed therebetween, and curved portions (for example, the beads 327 in the embodiment) are formed nearer to the axial center than the bolt fastening portions in the shims may be adopted.

In addition, although the outer rotor and the end plates are connected together by the bolt fastening portions in a state where the shims are interposed, the gaps between the outer rotor and the end plates can be sealed by the curved portions of the shims which are formed nearer to the axial center than the bolt fastening portions. Thereby, even if a working fluid passes through the gaps between the end plates and the inner rotor by a centrifugal force from the pressure chambers which are formed between the housing and the vane rotor, the hydraulic oil can be prevented from entering between the end plates and the outer rotor. Accordingly, the working fluid can be prevented from entering between the outer rotor and the stator through between the outer rotor and the end plates, and friction can be prevented from being caused between these rotors.

(17) In the above (16), a configuration in which the through holes are formed between the adjacent bolt fastening portions may be adopted.

In this case, since the through holes are formed between the adjacent bolt fastening portions, the through holes can be formed even if the axial shift length of the through holes and the bolt fastening portions is small.

Seventh Embodiment

Figure 35:
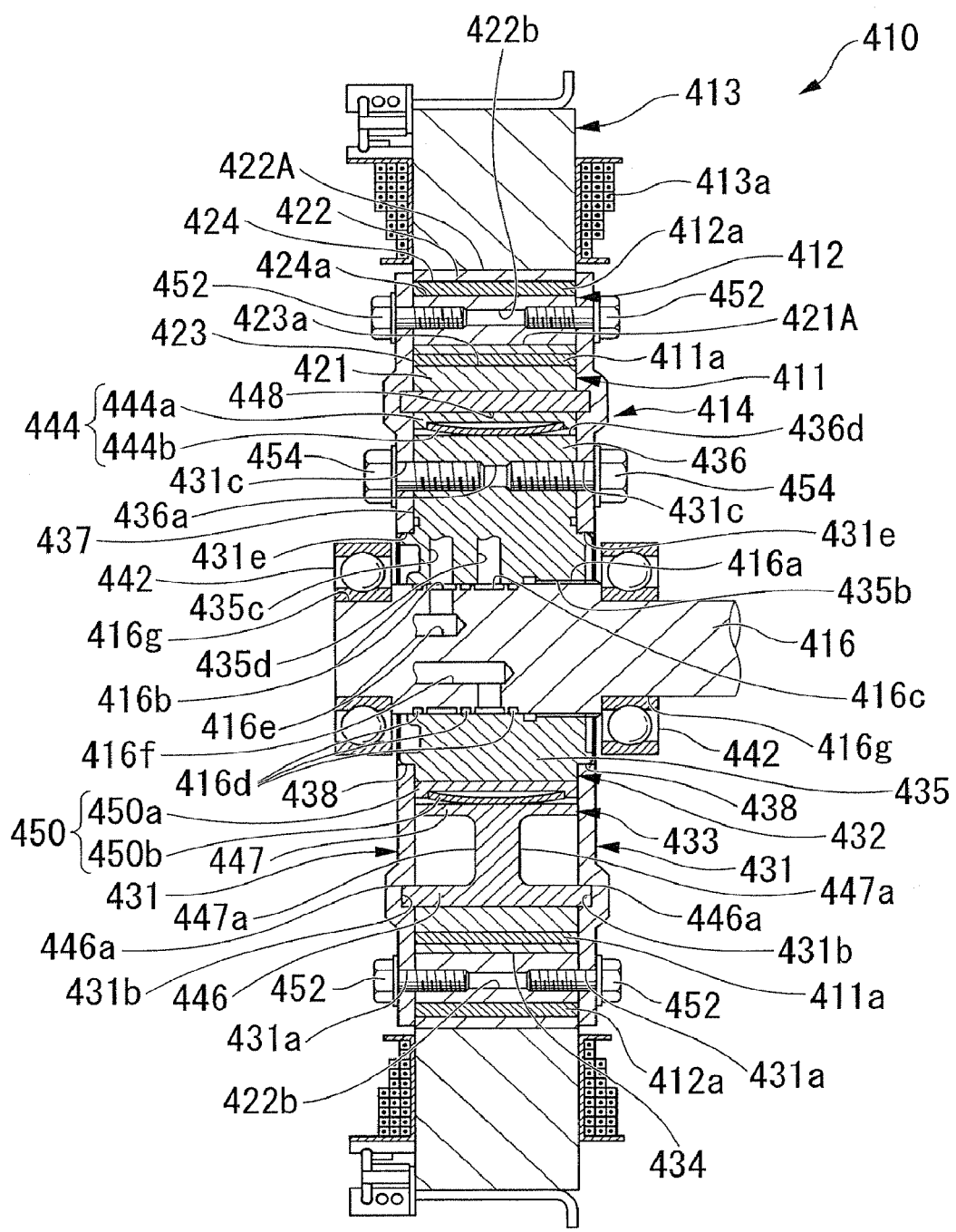
FIG. 35 is a sectional view of principal parts showing a motor according to a seventh embodiment of the invention.
Figure 36:
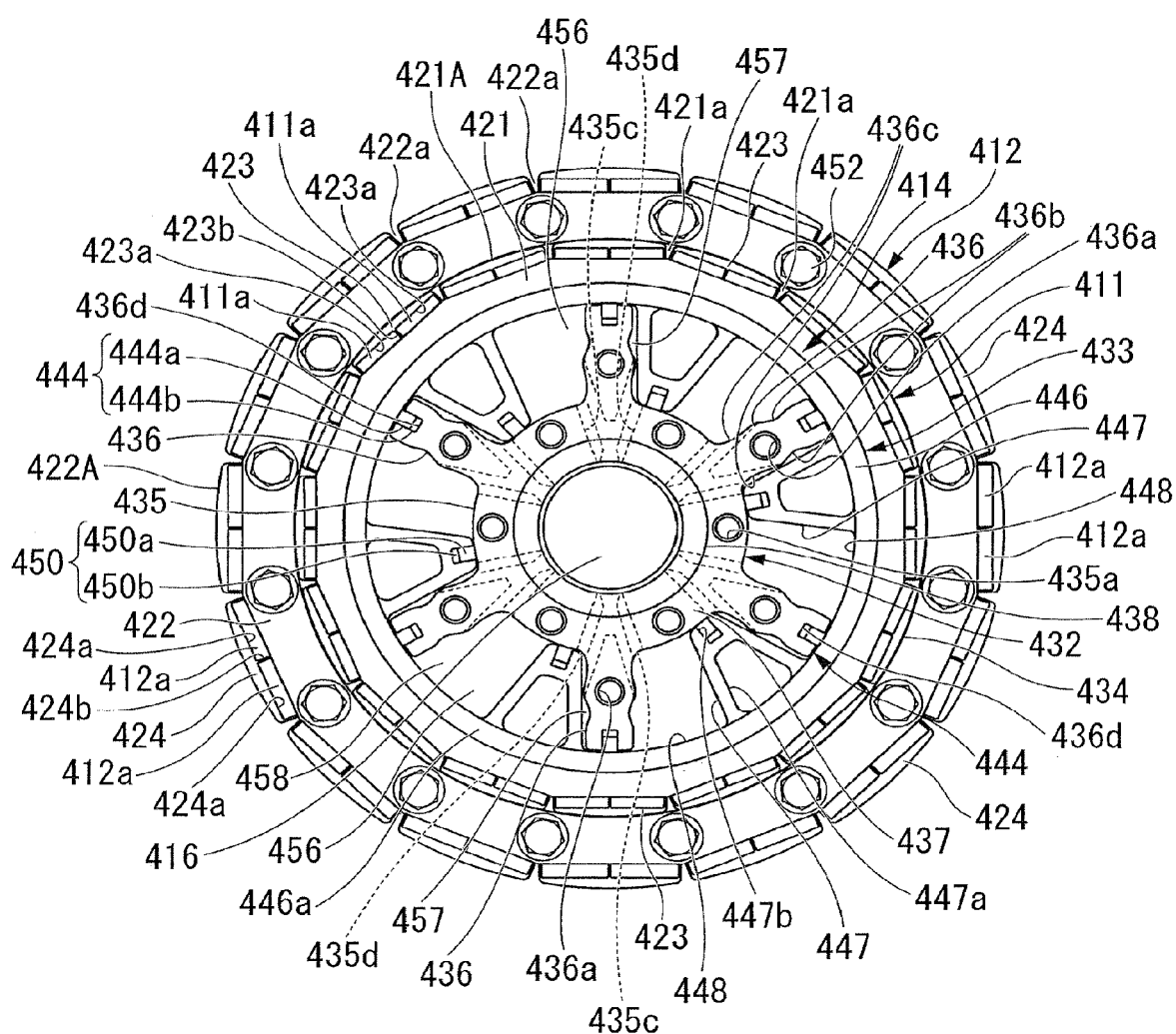
FIG. 36 is a front view showing a field-weakening state of an inner rotor, an outer rotor, and a rotating mechanism of the motor, with a front drive plate omitted.
Figure 37:
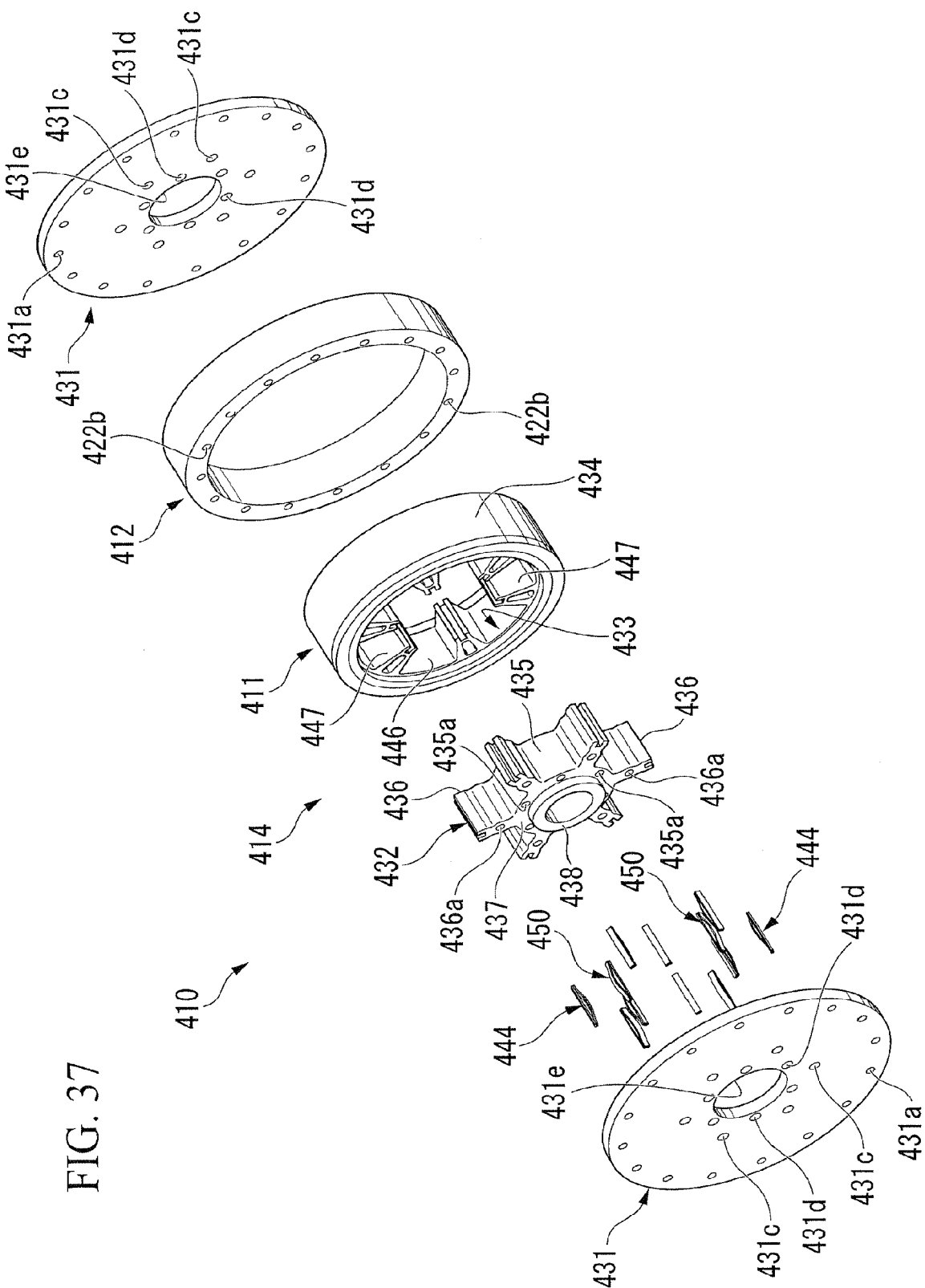
FIG. 37 is an exploded perspective view showing the inner rotor, outer rotor, and rotating mechanism of the motor.

Hereinafter, a motor according to a seventh embodiment of the present invention is described, referring to FIG. 35 to FIG. 45B. As shown in FIGS. 35 to 37, the motor 410 according to this embodiment is a brushless DC motor including a substantially annular inner rotor 411 which is rotatably provided about the axis of rotation of the motor 410, a substantially annular outer rotor 412 which is rotatably provided about the same axis of rotation radially outside the inner rotor 411 and which is provided so as to be matched with the inner rotor in position in the direction of the axis of rotation, a stator 413 which has a plurality of phases of stator windings 413a, shown in FIG. 35, which generate a rotating magnetic field which rotate the inner rotor 411 and the outer rotor 412, a rotating mechanism (rotating device) 414 which is connected to the inner rotor 411 and the outer rotor 412, and changes the relative phase between the inner rotor 411 and the outer rotor 412 with the hydraulic pressure (fluid pressure) of the hydraulic oil (working fluid) which is an incompressible fluid, and a hydraulic controller (not shown) which controls the hydraulic pressure to the rotating mechanism 414. The motor 410 is mounted on, for example, a vehicle, such as a hybrid vehicle or electric vehicle, as a driving source. In that case, an output shaft (rotating shaft) 416 of the motor is connected to an input shaft of a transmission (not shown), and the driving force of the motor 410 is transmitted to driving wheels (not shown) of a vehicle via a transmission.

In addition, when a driving force is transmitted to the motor 410 from the driving-wheel side during deceleration of a vehicle, the motor 410 functions as a power generator, thereby generating a so-called regenerative braking force, and recovering kinetic energy of a vehicle body as electrical energy (regeneration energy). Moreover, for example in a hybrid vehicle, the axis of rotation of the motor 410 is connected with a crankshaft of an internal combustion engine (not shown), and even in a case where the output of the internal combustion engine is transmitted to the motor 410, the motor 410 functions as a power generator, thereby generating power generation energy.

The inner rotor 411 is arranged so that its axis of rotation may be coaxial with the axis of rotation of the motor 410, as shown in FIG. 36, the inner rotor has a substantially cylindrical inner rotor core 421. In an outer peripheral portion of the inner rotor core 421, a plurality of (specifically, sixteen) inner magnet mounting portions 423, . . . , and 423 are provided at predetermined pitches in the peripheral direction. Further, on an outer peripheral surface 421A of the inner rotor core 421, recessed grooves 421a which extend parallel to the axis of rotation are formed in positions between all the inner magnet mounting portions 423 and 423 which are adjacent to each other in the peripheral direction so as to be recessed radially. The inner rotor core 421 is formed, for example, by sintering, etc.

Each of the inner magnet mounting portions 423, . . . , and 423 includes a pair of magnet mounting holes 423a and 423a passing through the inner rotor core 421 parallel to the axis of rotation. The pair of magnet mounting holes 423a and 423a are formed in a substantially oblong shape in a cross-section in a direction parallel to the axis of rotation, and are arranged in the same plane so as to be adjacent to each other in the peripheral direction via a center rib 423b. In addition, this plane is orthogonal to a radial line which connects the center rib 423b and the axis of rotation. Each of the magnet mounting holes 423a and 423a is mounted with a substantially plate-like permanent magnet 411a which extends parallel to the axis of rotation.

All the permanent magnets 411a mounted on the magnet mounting holes 423a, . . . , and 423a, respectively, are similarly magnetized in their thickness directions (that is, the radial direction of each of the rotors 411 and 412), and a pair of permanent magnets 411a and 411a mounted on a pair of magnet mounting holes 423a and 423a provided in the same inner magnet mounting portion 423 are set so that their magnetizing directions become the same direction. Also, for the inner magnet mounting portions 423 and 423 which are adjacent to each other in the peripheral direction in all the inner magnet mounting portions 423, . . . , and 423, a pair of permanent magnets 411a and 411a mounted on one of the inner magnet mounting portions and a pair of permanent magnets 411a and 411a mounted on the other thereof are set so that their magnetizing directions become different directions. That is, an inner magnet mounting portion 423 mounted with one pair of permanent magnets 411a and 411a having S poles on their outer peripheral side is adjacent to an inner magnet mounting portion 423 mounted with one pair of permanent magnets 411a and 411a having N poles on their outer peripheral side, in the peripheral direction via the recessed groove 421a. From the above, the inner rotor 411 includes a plurality of permanent magnets 411a, . . . , and 411a which are arranged in the peripheral direction.

The outer rotor 412 is also arranged so that its axis of rotation is coaxial with the axis of rotation of the motor 410, the outer rotor has a substantially cylindrical outer rotor core 422. In an outer peripheral portion of the outer rotor core 422, outer magnet mounting portions 424, . . . , and 424 of the same number as the aforementioned inner magnet mounting portions 423, . . . , and 423 are provided at predetermined pitches in the peripheral direction. Further, on an outer peripheral surface 422A of the outer rotor core 422, a recessed groove 422a which extends parallel to the axis of rotation is formed in a position between all the outer magnet mounting portions 424 and 424 which are adjacent to each other in the peripheral direction so as to be recessed radially. Moreover, a screw hole 422b shown in FIG. 35 is formed so as to pass axially through the outer rotor in a position on the internal diameter side of each of the recessed grooves 422a, . . . , and 422a of the outer rotor core 422, i.e., in a position between adjacent ones of the outer magnet mounting portions 424, . . . , and 424. The outer rotor core 422 is also formed, for example, by sintering, etc.

Each of the outer magnet mounting portions 424, . . . , and 424 includes a pair of magnet mounting holes 424a and 424a passing through the outer rotor core parallel to the axis of rotation. The pair of magnet mounting holes 424a and 424a are formed in a substantially oblong shape in a cross-section in a direction parallel to the axis of rotation, and are arranged in the same plane so as to be adjacent to each other in the peripheral direction via a center rib 424b. In addition, this plane is orthogonal to a radial line which connects the center rib 424b and the axis of rotation. Each of the magnet mounting holes 424a and 424a is mounted with a substantially plate-like permanent magnet 412a which extends parallel to the axis of rotation.

All the permanent magnets 412a mounted on the magnet mounting holes 424a, ..., and 424a, respectively, are similarly magnetized in their thickness directions (that is, the radial direction of each of the rotors 411 and 412), and a pair of permanent magnets 412a and 412a mounted on a pair of magnet mounting holes 424a and 424a provided in the same outer magnet mounting portion 424 are set so that their magnetizing directions become the same direction. Also, for the outer magnet mounting portions 424 and 424 which are adjacent to each other in the peripheral direction in all the outer magnet mounting portions 424, ..., and 424, a pair of permanent magnets 412a and 412a mounted on one of the inner magnet mounting portions and a pair of permanent magnets 412a and 412a mounted on the other thereof are set so that their magnetizing directions become different directions. That is, an outer magnet mounting portion 424 mounted with one pair of permanent magnets 412a and 412a having S poles on their outer peripheral side is adjacent to an inner magnet mounting portion 424 mounted with one pair of permanent magnets 412a and 412a having N poles on their outer peripheral side, in the peripheral direction via the recessed groove 422a. From the above, the outer rotor 412 also includes a plurality of permanent magnets 412a, ..., and 412a which are arranged in the peripheral direction.

Also, each of the magnet mounting portions 423, ..., and 423 of the inner rotor 411 and each of the magnet mounting portions 424, ..., and 424 of the outer rotor 412 are arranged so as to face each other in the radial direction of each of the rotors 411 and 412. In this facing arrangement state, all the pairs of permanent magnets 411a and 411a are matched with any corresponding pairs of permanent magnets 412a and 412a on one-on-one level in phase of the direction of rotation. Further, even for each of the recessed grooves 421a, ..., and 421a of the inner rotor 411, and each of the recessed grooves 422a, ..., and 422a of the outer rotor 412, all the recessed grooves 421a, ..., and 421a are matched with any corresponding recessed grooves 422a on one-on-one level in phase of the direction of rotation.

Figure 38:
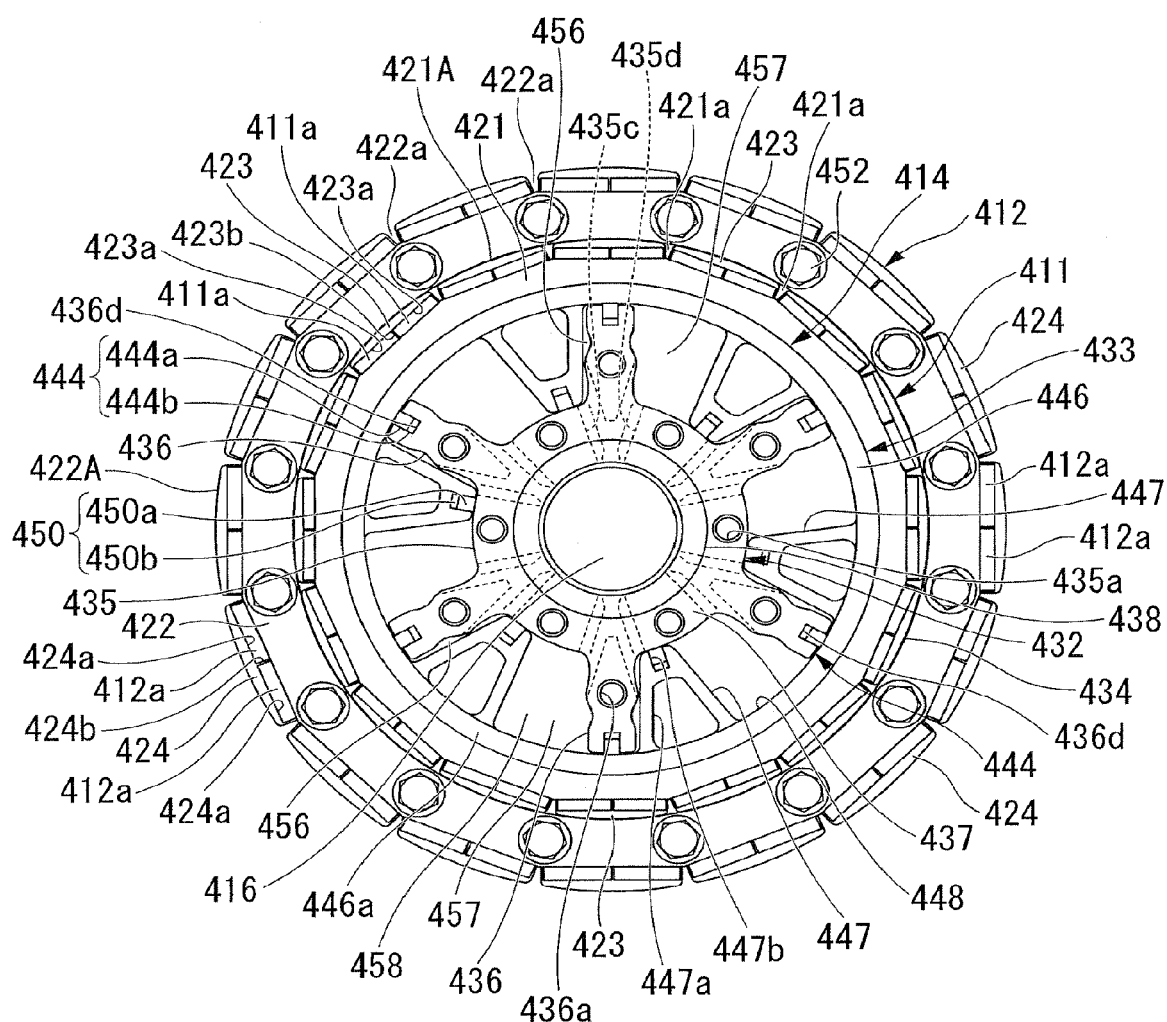
FIG. 38 is a front view showing a field-strengthening state of the inner rotor, outer rotor, and rotating mechanism of the motor, with a front drive plate omitted.

Thereby, the state of the motor 410 can be set to a proper state ranging from a field-weakening state shown in FIG. 36 where same magnetic poles of the permanent magnets 411a and 411a which makes a pair and the permanent magnets 412a and 412a which makes a pair are arranged to face each other (that is, the permanent magnets 411a and 411a which makes a pair and the permanent magnets 412a and 412a which makes a pair have an opposite pole arrangement) to a field-strengthening state shown in FIG. 38 where different magnetic poles of the permanent magnets 411a and 411a which makes a pair and the permanent magnets 412a and 412a which makes a pair are arranged to face each other (that is, the permanent magnets 411a and 411a which makes a pair and the permanent magnets 412a and 412a which makes a pair have the same pole arrangement), in all the permanent magnets 411a, ..., and 411a of the inner rotor 411, and all the permanent magnets 412a, ..., and 412a of the outer rotor 412, according to the relative positions of the inner rotor 411 and the outer rotor 412 around the axis of rotation.

Here, the stator 413 shown in FIG. 35 is formed in a substantially cylindrical shape that is arranged to face an outer peripheral portion of the outer rotor 412, and is fixed to, for example, a housing (not shown), etc. of a transmission of a vehicle.

Next, the rotating mechanism 414 which performs a change in relative phase between the inner rotor 411 and the outer rotor 412 as described above is explained.

The rotating mechanism 414 of this embodiment, as shown in FIGS. 35 and 37, has a pair of disk-shaped drive plates (end plates) 431 and 431 which are fixed so as to cover the space inside the outer rotor 412 on both axial sides of the outer rotor 412, a vane rotor 432 which is sandwiched by the drive plates 431 and 431 and thereby is integrally provided inside the outer rotor 412, and a housing 433 constituting part of the inner rotor 411 which is arranged between the outer rotor 412, and the drive plates 431 and 431. The vane rotor 432 and the housing 433 are formed, for example, by sintering, etc.

Figure 39:
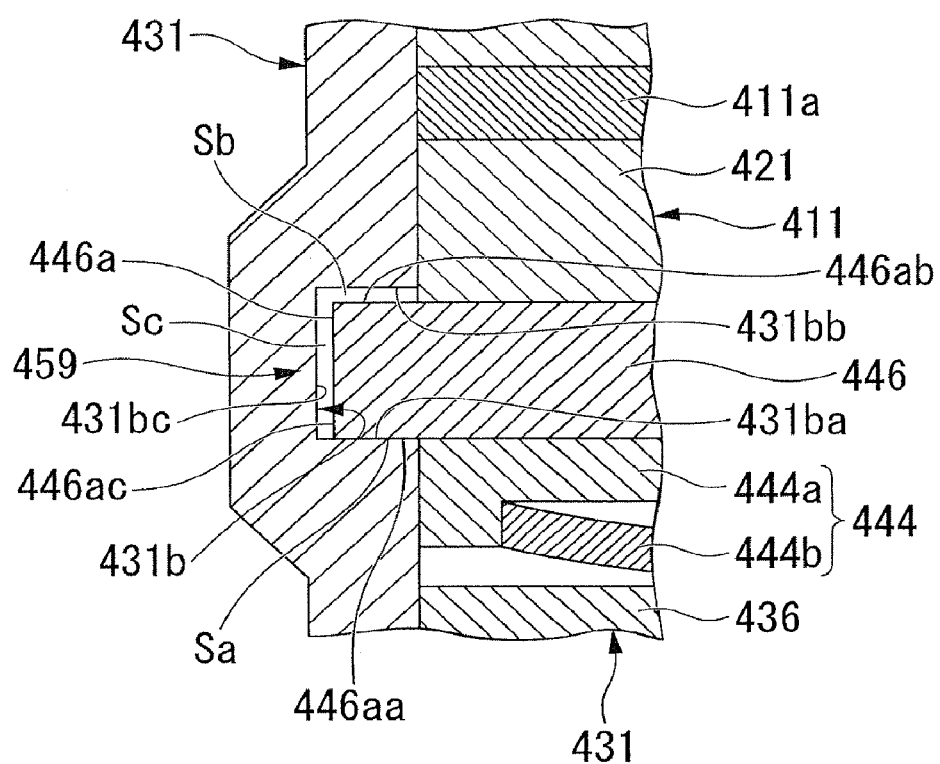
FIG. 39 is an enlarged sectional view of principal parts of the rotating mechanism of the motor.

In the pair of drive plates 431 and 431, a plurality of bolt insertion holes 431a, ..., and 431a (having the same number as the screw holes 422b) which pass axially through each plate are formed at regular intervals on the same circumference of the plate, and an annular groove (concave portion) 431b, shown in the FIG. 35, which is formed in an annular shape about the central axis of the drive plate 431 and is recessed axially, is formed on one side inside the bolt insertion holes 431a, ..., and 431a. Each of the annular grooves 431b and 431b has an inner cylindrical surface 431ba and an outer cylindrical surface 431bb, as shown in FIG. 39, both of which run along the central axis of the drive plate 431, and a groove bottom surface 431bc which runs along a direction orthogonal to the axis of the drive plate 431.

Further, in the pair of drive plates 431 and 431, as shown in FIG. 35, a plurality of bolt insertion holes 431c, ..., and 431c which passes axially through the plates are formed at regular intervals on the same circumference inside the annular groove 431b, and a plurality of bolt insertion holes 431d, ..., and 431d, shown in FIG. 37, which pass axially through the plates, are formed by the same number as the insertion holes 431c, ..., and 431c at regular intervals on the same circumference inside the insertion holes 431c, ..., and 431c. Here, in all the bolt insertion holes 431c, ..., and 431c, inside bolt insertion holes 431d are formed in middle positions between the bolt insertion holes 431c and 431c which are adjacent to each other in the peripheral direction. Moreover, a fitting hole 431e which passes axially through the plate is formed in the central position of the drive plate 431 further inside of the inside bolt insertion holes 431d ..., and 431d.

The vane rotor 432 has a cylindrical boss 435, and a plurality of (of the same number as the aforementioned bolt insertion holes 431c (specifically, six)) impeller portions 436, ..., and 436 which extend radially outward from equidistant positions in the peripheral direction on an outer peripheral surface of the boss 435.

The boss 435 is formed in the shape of a step having an outer nipping base portion 437 of the same axial length as the impeller portions 436, ..., and 436, and a pair of cylindrical fitting portions 438 which protrude in axially opposite directions from the inner peripheral side of the nipping base portion 437. In the nipping base portion 437, a plurality of (of the same number as the aforementioned bolt insertion holes 431d) screw holes 435a which pass axially through the base portion are formed in middle positions between the impeller portions 436 and 436 which are adjacent to each other. Further, on the internal diameter side of the boss 435, a connecting spline 435b shown in FIG. 35 is formed on one axial side of the boss. On the other axial side of the boss, as shown in FIG. 36, passage holes 435c, ..., and 435c which pass through the boss are formed on the same one side in the direction of the rotation of a base end of the impeller portion 436 nearest from the inner peripheral side of the position of each of the impeller portions 436 . . . , and 436, and passage holes 435*d*, . . . , and 435*d* which pass through the boss are formed on the same opposite side in the direction of the rotation of the base end of the impeller portion 436 nearest from the inner peripheral side of the position of each of the impeller portions 436 . . . , and 436 such that their axial positions are made different from one another as shown in FIG. 35.

On the internal diameter side of the vane rotor 432, an output shaft 416 to which the driving force of the outer rotor 412 is transmitted is attached. The output shaft 416 is provided with a connecting spline 416*a* coupled with the connecting spline 435*b* of the boss 435, an annular communication groove 416*b* which allows all the passage holes 435*c* of the boss 435 to communicate with one another in the state of being coupled by the connecting spline 416*a*, an annular communication groove 416*c* which allows all the passage holes 435*d* to communicate with one another in the same state, and seal grooves 416*d*, 416*d*, and 416*d* formed in the position between the communication grooves 416*b* and 416*c* and in both outside positions thereof, and seal rings (not shown) which seal the gaps with the vane rotor 432 are arranged in the seal grooves 416*d*, 416*d*, and 416*d*, respectively. Further, the output shaft 416 is formed with a passage hole 416*e* for supplying and discharging hydraulic oil to/from the communication groove 416*b* through the inside thereof, and a passage hole 416*f* for supplying and discharging hydraulic oil to/from the communication groove 416*c*. In addition, bearing fitting portions 416*g* into which a pair of bearings 442 and 442 held by, for example, a housing of a transmission of a vehicle is made to fit are respectively formed in the portions of the output shaft 416 which protrude further axially outward than the drive plates 431 and 431.

Each of the impeller portions 436, . . . , and 436 forms a substantially plate shape, and as shown in FIG. 36, a screw hole 436*a* which passes axially through the impeller portion is formed in an intermediate position of the impeller portion. Further, on both sides of the impeller portion in the peripheral direction, a pair of recessed portions 436*b* and 436*b* are formed on the outer peripheral side of the formation position of the screw hole 436*a* over the entire axial length, and a pair of recessed portions 436*c* and 436*c* are also formed inside the formation position of the screw hole 436*a* over the entire axial length. Moreover, on an outer peripheral surface of each of the impeller portions 436, . . . , and 436, a seal holding groove 436*d* which is recessed toward the center from the outer peripheral surface is formed over the entire axial length. Spring seals 444 which seal the gaps with the housing 433 are arranged in the seal holding portions 436*d*, . . . , and 436*d*, respectively. Each of the spring seals 444, . . . , and 444 is constituted by a seal 444*a* which is provided outside and comes into sliding contact with the housing 433, and a spring 444*b* which is provided inside and presses the seal 444*a* toward the housing 433 radially outward.

The inner rotor 411 is constituted by a ring-shaped inner rotor body 434 which is configured such that the permanent magnets 411*a*, . . . , and 411*a* are mounted on the aforementioned inner rotor core 421, and a housing 433 which is integrally fitted into the inner rotor body 434 so as to have a predetermined phase relationship. The housing 433 which constitutes part of the inner rotor 411 has a cylindrical base portion 446 with a small radial thickness, and protruding portions 447, . . . , and 447 which protrude radially inward from the equidistant positions in the peripheral direction on an inner peripheral surface of the base portion 446, and has the same number as the impeller portions 436. The base portion 446, as shown in FIG. 35, protrudes over its entire periphery so as to be longer in axially opposite directions from the protruding portion 447 and the inner rotor body 434. As a result, on axially opposite sides of the base portion 446, convex portions 446*a* which protrude axially in an annular shape about the central axis of the inner rotor 411 are formed in the inner rotor 411. Each of the convex portions 446*a* and 446*a* has an inner cylindrical surface 446*aa* and an outer cylindrical surface 446*ab*, as shown in FIG. 39, both of which run along the central axis of the inner rotor 411, and a tip surface 446*ac* which runs along a direction orthogonal to the axis of the inner rotor 411.

As shown in FIG. 36, each of the protruding portions 447, . . . , and 447 of the housing 433 which constitute part of the inner rotor 411 forms a tapered, substantially isosceles triangular shape as seen axially. Between the protruding portions 447 and 447 which are adjacent to each other in the peripheral direction in all the protruding portions 447, . . . , and 447, a radially recessed radial concave portion 448 where the impeller portion 436 of the aforementioned vane rotor 432 can be arranged is formed. Each of the protruding portions 447, . . . , and 447 is formed with a pair of lightening holes 447*a* and 447*a* which are recessed with a predetermined equal depth from its both axial surfaces, and a seal holding groove 447*b* which is recessed toward the external diameter side is formed in an inner end surface of the protruding portion over the entire axial length. Spring seals 450 which seal the gaps with an outer peripheral surface of the boss 435 of the vane rotor 432 are arranged in the seal holding portions 447*b*, . . . , and 447*b*, respectively. The spring seals 450, . . . , and 450 are constituted by a seal 450*a* which is provided on the inner peripheral side and comes into sliding contact with the boss 435 of the vane rotor 432, and a seal spring 450*b* which is provided on the external diameter side and presses the seal 450*a* toward the vane rotor 432. Here, the base portion 446 including the convex portions 446*a* and 446*a* of the housing 433 is radially outside the radial concave portions 448, . . . , and 448. In addition, the housing 433 may be integrally connected with the inner rotor body 434 by fastening of bolts, etc.

In a case where the above respective parts are assembled, for example with the outer rotor 412 being matched with one drive plate 431, the bolts 452 are inserted into the bolt insertion holes 431*a*, . . . , and 431*a*, respectively, of the drive plate 431, and the bolts 452, . . . , and 452 are screwed to the screw holes 422*b*, respectively, of the outer rotor 412. Further, in a state where the vane rotor 432 is matched with the drive plate 431 by making one fitting portion 438 of the vane rotor fit into the fitting hole 431*e*, bolts (not shown) are inserted into bolt insertion holes 431*d*, . . . , and 431*d*, respectively, of the drive plate 431, and the bolts are screwed to the screw holes 435*a*, respectively, of the boss 435 of the vane rotor 432. Moreover, the bolts 454 are inserted into the bolt insertion holes 431*c*, . . . , and 431*c*, respectively, of the drive plate 431, and bolts 454, . . . , and 454 are screwed to the screw holes 436*a*, respectively, of the impeller portions 436 of the vane rotor 432. Also, by inserting the impeller portions 436, . . . , and 436 into the radial concave portions 448, respectively, on one-on-one level in a state where the spring seals 444 are attached to the impeller portions 436, . . . , and 436, respectively, of the vane rotor 432, the inner rotor 411 which is configured such that the housing 433 is press-fitted into the outer rotor body 434 in advance is inserted in a state where the spring seals 450, . . . , and 450 are attached. In this case, one convex portion 446*a* of the inner rotor 411 is fitted into the annular groove 431*b* of the drive plate 431.

The other drive plate 431 is matched from the opposite side by fitting the other fitting portion 438 of the vane rotor 432 into the fitting hole 431e. In this case, the other convex portion 446a of the inner rotor 411 is fitted into the annular groove 431b of the other drive plate 431. The bolts 452 are inserted into the bolt insertion holes 431a, . . . , and 431a, respectively, of the drive plate 431, and the bolts 452, . . . , and 452 are screwed to the screw holes 422b, respectively, of the outer rotor 412. Further, bolts (not shown) are inserted into the bolt insertion holes 431d, . . . , and 431d, respectively, of the drive plate 431, and the bolts are screwed to the screw holes 435a, respectively, of the boss 435 of the vane rotor 432. Moreover, the bolts 454 are inserted into the bolt insertion holes 431c, . . . , and 431c, respectively, and the bolts 454, . . . , and 454 are screwed to the screw holes 436a, respectively, of the impeller portions 436 of the vane rotor 432. As a result, the drive plates 431 and 431 fixed to both axial end surfaces of the outer rotor 412 are integrally fixed by the impeller portions 436, . . . , and 436 of the vane rotor 432 and bolts 454, . . . , and 454, and are integrally fixed by the boss 435 and bolts (not shown). In addition, as the bolts 454, . . . , and 454 which fix the impeller portions 436, . . . , and 436 to the drive plate 431, ones which are fewer in number than and larger in size than the bolts 452, . . . , and 452 which fix the outer rotor 412 to the drive plate 431 are used.

Then, the output shaft 416 is fitted into the vane rotor 432. At that time, the connecting spline 416a and the connecting spline 435b are coupled together. As a result, the output shaft 416 is integrally fixed to the vane rotor 432. Of course, the above assembling procedure is an example, and assembling can also be made by a procedure different from the above.

From the above, the inner rotor 411 which is configured such that the housing 433 and the inner rotor body 434 are integrated is provided in a space 458 between the drive plates 431 and 431 inside the outer rotor 412 and outside the vane rotor 432, and consequently, is rotatably held by the axially opposite convex portions 446a and 446a of the base portion 446 inserted into the annular grooves 431b and 431b of the drive plates 431 and 431. Moreover, the impeller portions 436 of the vane rotor 432 are arranged in the radial concave portions 448, . . . , and 448, respectively, of the housing 433 one by one. Further, the output shaft 416 spline-coupled with the vane rotor 432 becomes integral and rotatable with the outer rotor 412, the drive plates 431 and 431, and the vane rotor 432, and specifically is integrally fixed thereto.

Here, in the above attachment state, as shown in FIG. 39, the axially opposite convex portions 446a and 446a of the inner rotor 411 enter the facing annular grooves 431b of the drive plate 431. In this case, the central axes of the inner rotor 411 and the drive plate 431 are matched with each other as the inner cylindrical surface 446aa of the convex portion 446a comes into sliding contact with the inner cylindrical surface 431ba of the annular groove 431b over its entire periphery (so-called faucet fitting). Further, as the convex portion 446a enters the annular groove 431b, a minute gap 400Sa for sliding contact between the inner cylindrical surface 431ba and the inner cylindrical surface 446aa, a gap 400Sc between the groove bottom surface 431bc and the tip surface 446ac which is connected thereto, and a gap 400Sb between the outer cylindrical surface 431bb and the outer cylindrical surface 446ab which is connected thereto are formed in a curved shape, thereby constituting a labyrinth seal 459 outside the first pressure chambers 456, . . . , and 456 and the second pressure chambers 457, . . . , and 457, i.e., in the portion to which hydraulic oil tends to leak from the first pressure chambers 456, . . . , and 456 and the second pressure chambers 457, . . . , and 457 by the centrifugal force during rotation.

Here, in a field-strengthening state where different poles of the permanent magnets 412a, . . . , and 412a of the outer rotor 412 and the permanent magnets 411a, . . . , and 411a of the inner rotor 411 are made to face each other, as shown in FIG. 38, each of all the impellers 436, . . . , and 436 abut on the protruding portion 447 which is adjacent to the impeller on the same one side in the direction of rotation within the corresponding radial concave portion 448, and consequently, forms a first pressure chamber 456 with the abutting protruding portion 447, and forms a second pressure chamber 457, which is wider than the first pressure chamber 456, with the protruding portion 447 which is adjacent to the impeller on the same opposite side in the direction of rotation (in other words, the first pressure chambers 456, . . . , and 456 and the second pressure chambers 457, . . . , and 457 are formed by the impellers 436, . . . , and 436 accommodated in the concave portions 448, . . . , and 448 and concave portions 448, . . . , and 448). As a result, the first pressure chambers 456, . . . , and 456 and the second pressure chambers 457, . . . , and 457 are defined inside the inner rotor 411.

On the contrary, in a field-weakening state where same poles of the permanent magnets 412a, . . . , and 412a of the outer rotor 412 and the permanent magnets 411a, . . . , and 411a of the inner rotor 411 are made to face each other, as shown in FIG. 36, each of all the impellers 436, . . . , and 436 abut on the protruding portion 447 which is adjacent to the impeller on the same opposite side in the direction of rotation within the corresponding concave portion 448, and consequently, reduces the second pressure chamber 457, and expand the first pressure chamber 456 with the protruding portion 447 which is adjacent to the impeller the same one side in the direction of rotation. In addition, the passage holes 435c, . . . , and 435c of the vane rotor 432 are provided in the first pressure chambers 456, . . . , and 456, respectively, so as to always open on one-on-one relation, and the passage holes 435d, . . . , and 435d of the vane rotor 432 are provided in the second pressure chambers 457, . . . , and 457, respectively, so as to always open on one-on-one relation.

Here, in the outer rotor 412 and the inner rotor 411, the field-strengthening position shown in the FIG. 38 which the permanent magnets 412a, . . . , and 412a and the permanent magnets 411a, . . . , and 411a face and attract each other with mutually different polarities is set to an origin position when the first pressure chambers 456, . . . , and 456 and the second pressure chambers 457, . . . , and 457 do not receive any hydraulic oil pressure substantially. In addition, the first pressure chambers 456, . . . , and 456 and the second pressure chambers 457, . . . , and 457 are also filled with hydraulic oil in a state where they do not receive any hydraulic oil pressure. Also, from the state of being in this origin position, when hydraulic oil is discharged via each of the passage holes 435d, . . . , and 435d from each of the second pressure chambers 457, . . . , and 457 simultaneously when hydraulic oil is introduced into each of the first pressure chambers 456, . . . , and 456 via each of the passage holes 435c, . . . , and 435c (that is, hydraulic oil is introduced into the first pressure chambers 456, . . . , and 456), the outer rotor 412 and the inner rotor 411 relatively rotate against a magnetic force, and are brought into a field-weakening state. On the contrary, when hydraulic oil is discharged via each of the passage holes 435c, . . . , and 435c from each of the first pressure chambers 456, . . . , and 456 simultaneously when hydraulic oil is introduced into each of the second pressure chambers 457, . . . , and 457 via each of the passage holes 435d, . . . , and 435d, the outer rotor 412 and the inner rotor 411 return to an origin position and are brought into a field-strengthening state. In this case, the permanent magnets 412a, . . . , and 412a of the outer rotor 412 and the permanent magnets 411a, ..., and 411a of the inner rotor 411 attract each other by a magnetic force. Therefore, the pressure of the hydraulic oil introduced into each of the second pressure chambers 457, ..., and 457 is only required to be lower than a pressure required in a case where phase is changed to the field-weakening state. In some cases, even if hydraulic pressure is not introduced, only the supply and discharge of hydraulic oil is required.

Further, in the motor 410, the rotational direction when the inner rotor 411 returns to an origin position from a weakening state where same polarities of the permanent magnets 412a, ..., and 412a and the permanent magnets 411a, ..., and 411a are made to face each other with respect to the outer rotor 412 is made to coincide with the direction of the moment of inertia caused during deceleration rotation. That is, the motor 410 is set so as to rotate the outer rotor 412 and the inner rotor 411 in the clockwise direction in FIGS. 36 and 38 during forward traveling of a vehicle, and when the outer rotor 412 decelerates from the field-weakening state shown in FIG. 36, the moment of inertia to return to a field-strengthening state shown in FIG. 38 is generated in the inner rotor 411 in a floating state.

Here, since hydraulic oil is incompressible, in not only the change of phase to both limit ends of the field-strengthening state and the field-weakening state as described above, even in an intermediate position between both the limit ends, a hydraulic controller (not shown) stops the supply and discharge of the hydraulic oil to/from all the first pressure chambers 456, ..., and 456 and the second pressure chambers 457, ..., and 457, for example, by shutoff of an opening and closing valve (not shown), whereby the outer rotor 412 and the inner rotor 411 maintains the phase relationship at that point of time. As a result, a phase change in an arbitrary field state can be stopped.

From the above, the aforementioned vane rotor 432 is integrally fixed to the outer rotor 412 and becomes integral and rotatable, and is arranged inside the inner rotor 411. Moreover, the vane rotor 432 is integrally fixed to the outer rotor 412 via the drive plates 431 and 431 fixed to the outer rotor 412 so as to cover both axial end surfaces of the outer rotor 412 and the inner rotor 411, and is integrally provided even in the output shaft 416 which outputs the driving force of the outer rotor 412. Further, the aforementioned housing 433 is integrally fitted to the inner rotor body 434 and becomes integral and rotatable, and its radial concave portion 448 defines the first pressure chamber 456 and the second pressure chamber 457 inside the inner rotor 411 with the vane rotor 432. Moreover, by supply and discharge of hydraulic oil, i.e., by control of introduction of hydraulic oil pressure to/from the first pressure chamber 456 and the second pressure chamber 457, the relative phase of the vane rotor 432 to the housing 433 is changed. As a result, the relative phase between the inner rotor 411 and the outer rotor 412 is changed. Here, the relative phase between the inner rotor 411 and the outer rotor 412 can be changed to advance side or retard side by an electrical angle of 180°, and the state of the motor 410 can be set to a proper state between a field-weakening state where the same magnetic poles of the permanent magnets 411a of the inner rotor 411 and the permanent magnets 412a of the outer rotor 412 are arranged to face each other and a field-strengthening state where different magnetic poles of the permanent magnets 411a of the inner rotor 411 and the permanent magnets 412a of the outer rotor 412 are arranged to face each other.

In addition, the inner rotor 411 in which the inner rotor body 434 and the housing 433 are integrated is arranged so as to be rotatable in the peripheral direction in the space 458 shown in the FIG. 36 between the outer rotor 412, the vane rotor 432, and both the drive plates 431 and 431, which is formed as the drive plates 431 which transmit the driving force of the outer rotor 412 to the output shaft 416 are fixed to both axial end surfaces, respectively, of the outer rotor 412 and the vane rotor 432. In addition, the inner rotor 411 in which the inner rotor body 434 and the housing 433 are integrated is rotatably provided in a floating state within the space 458 (that is, the inner rotor is not fixed to the drive plates 431 and 431 and the output shaft 416).

Figure 40A:
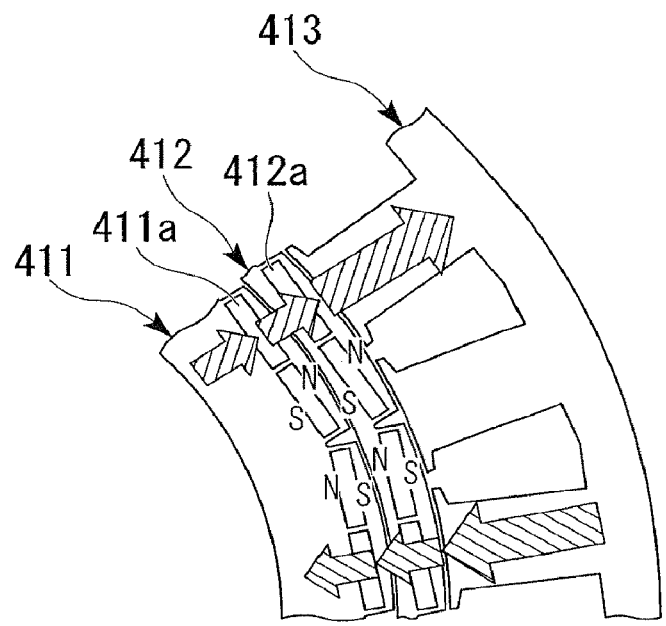
FIG. 40A is a view schematically showing a field-strengthening state where permanent magnets of the inner rotor and permanent magnets of the outer rotor have a same pole arrangement.
Figure 40B:
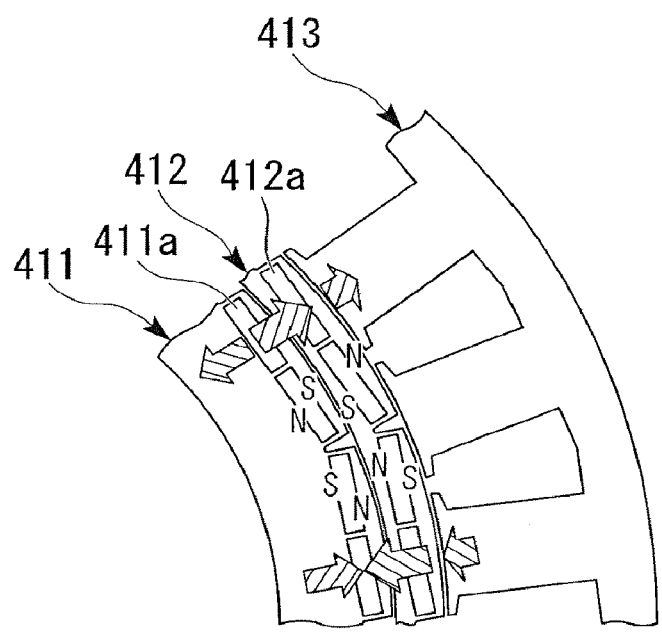
FIG. 40B is a view schematically showing a field-weakening state where permanent magnets of the inner rotor and permanent magnets of the outer rotor have an opposite pole arrangement.
Figure 41:
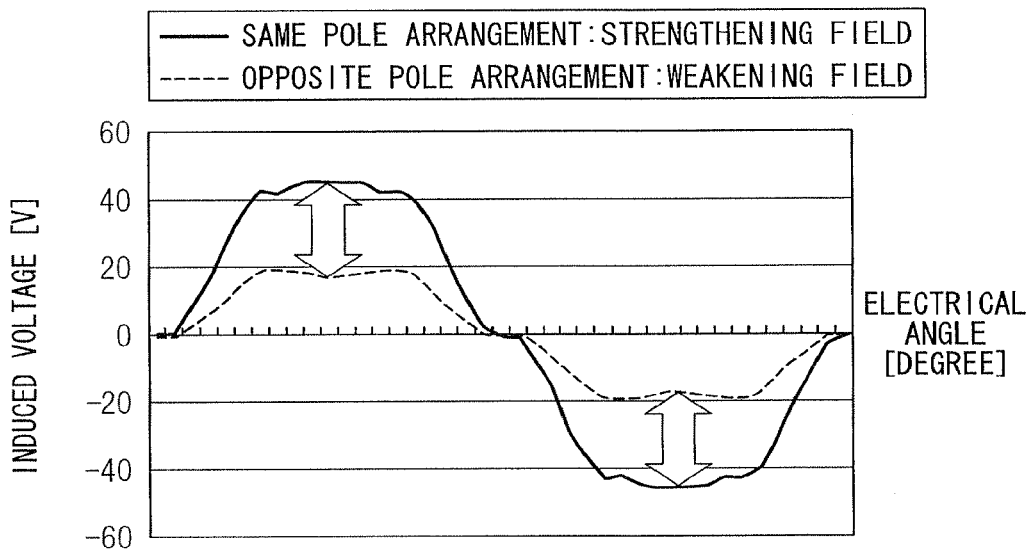
FIG. 41 is a graph showing an induced voltage in the field-strengthening state and the field-weakening state shown in FIG. 40A.

In addition, in the field-strengthening state where the permanent magnets 411a of the inner rotor 411 and the permanent magnets 412a of the outer rotor 412 have a same pole arrangement as shown in, for example, FIG. 40A, and in the field-weakening state where the permanent magnets 411a of the inner rotor 411 and the permanent magnets 412a of the outer rotor 412 have an opposite pole arrangement as shown in, for example, FIG. 40B, the intensity of an induced voltage changes as shown in, for example, FIG. 41. Therefore, an induced voltage constant Ke is changed by changing the state of the motor 410 between the field-strengthening state and the field-weakening state.

The induced voltage constant Ke is, for example, a rotational frequency ratio of an induced voltage induced by winding ends of the stator windings 413a by the rotation of each of the rotors 411 and 412, and can be described as $Ke = 8 \times p \times R \times L \times B \times T \times \pi$ by the product of the number of pole pairs p, the external diameter of a motor R, motor stacking thickness L, magnetic flux density B, and the number of turns T. Thereby, by changing the state of the motor 410 between the field-strengthening state and the field-weakening state, the intensity of the magnetic flux density B of a field flux by the permanent magnets 411a of the inner rotor 411 and the permanent magnets 412a of the outer rotor 412 changes, and the induced voltage constant Ke is changed.

Figure 42A:
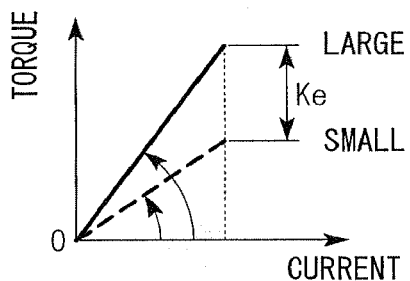
FIG. 42A is a graph showing the relationship between the current and torque of the motor which change according to an induced voltage constant Ke.
Figure 42B:
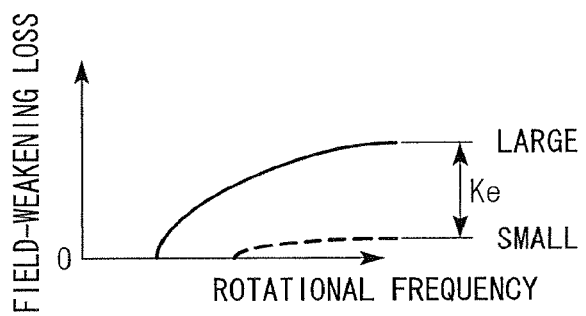
FIG. 42B is a graph showing the relationship between the rotational frequency and field-weakening loss of the motor which change according to an induced voltage constant Ke.

Here, as shown in, for example, FIG. 42A, the torque of the motor 410 is proportional to the product of the induced voltage constant Ke and a current applied to the stator windings 413a (Torque ∝ (Ke×Current)). Further, as shown in, for example, FIG. 42B, the field-weakening loss of the motor 410 is proportional to the product of the induced voltage constant Ke and a rotational frequency (Field-weakening loss ∝ (Ke× Rotational frequency)). Therefore, the allowable rotational frequency of the motor 410 is proportional to an inverse number of the product of the induced voltage constant Ke and the rotational frequency (Allowable rotational frequency ∝ (1/(Ke×Rotational frequency))).

Figure 43:
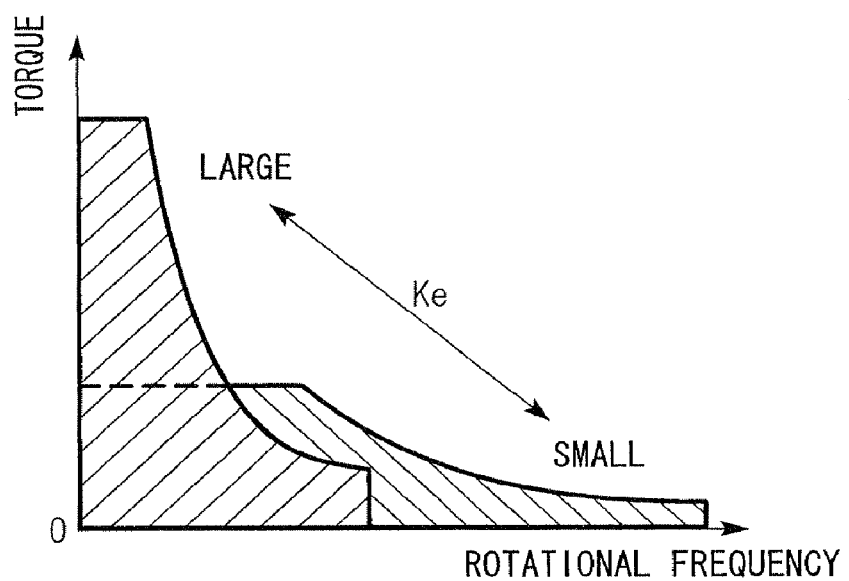
FIG. 43 is a view showing an operational region relevant to the rotational frequency and torque of the motor which change according to the induced voltage constant Ke.
Figure 44A:
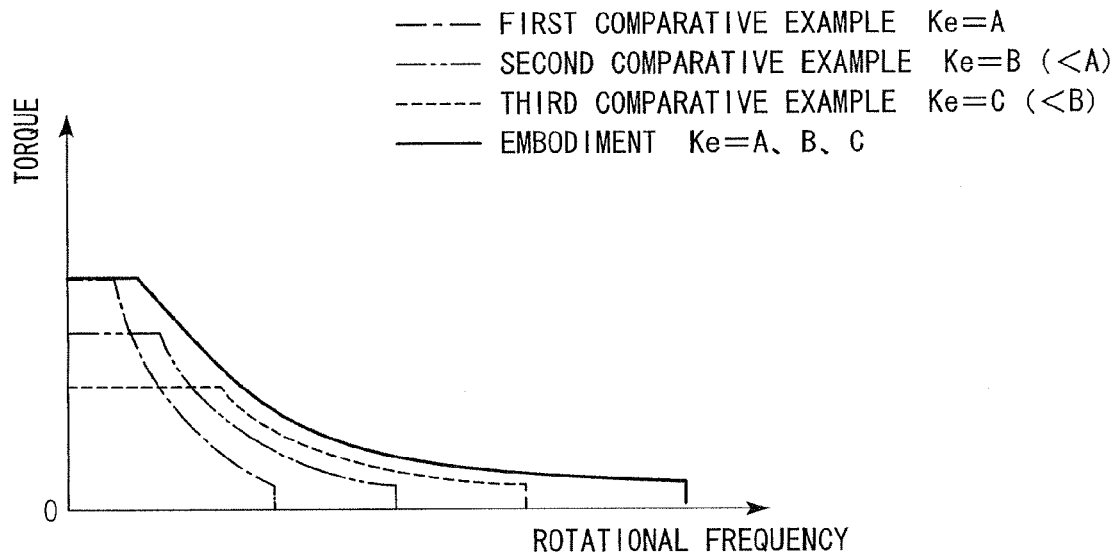
FIG. 44A is a graph showing the relationship between the rotational frequency and torque of the motor which change according to an induced voltage constant Ke.
Figure 44B:
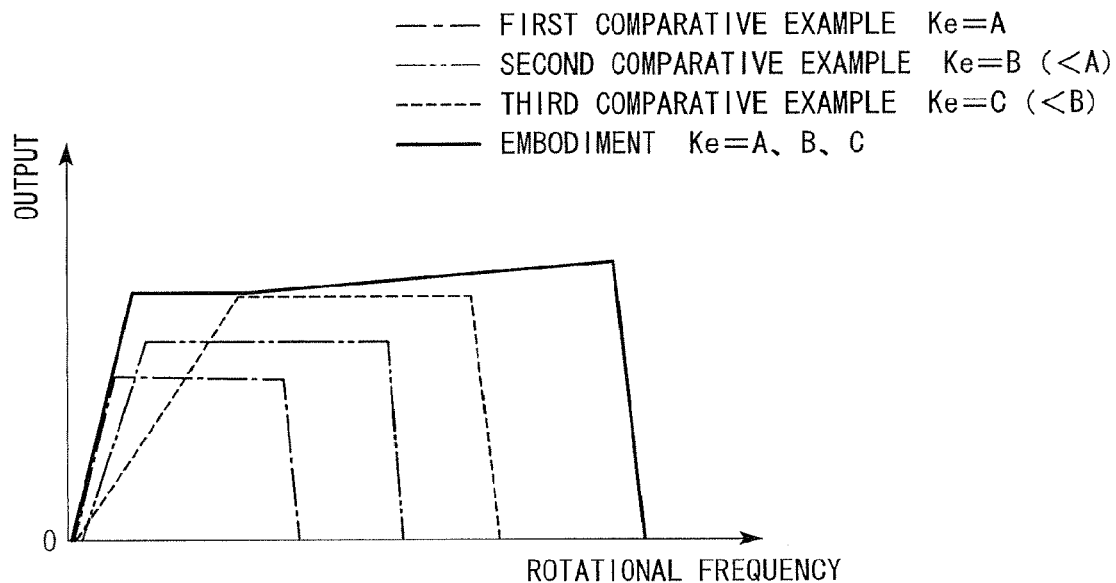
FIG. 44B is a graph showing the relationship between the rotational frequency and output of the motor which change according to an induced voltage constant Ke.
Figure 45A:
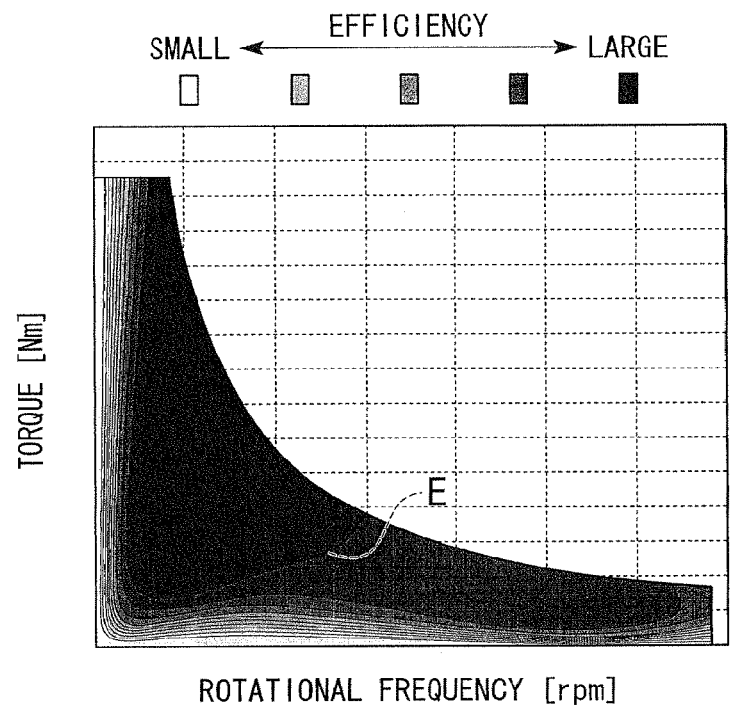
FIG. 45A is a view showing an operational region and efficiency distribution relevant to the rotational frequency and torque of the motor which change according to the induced voltage constant Ke in the embodiment.
Figure 45B:
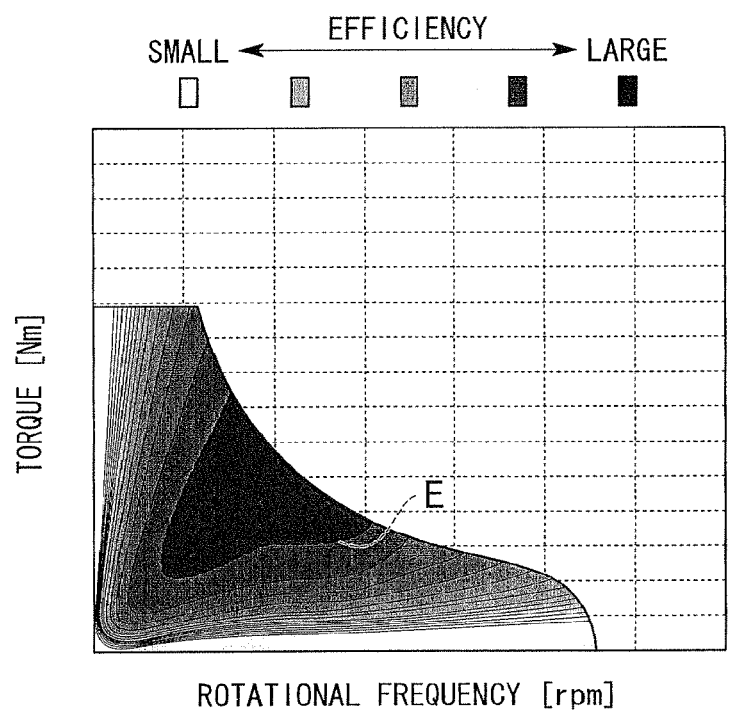
FIG. 45B is a view showing an operational region and efficiency distribution relevant to the rotational frequency and torque of the motor which change according to the induced voltage constant Ke in the second comparative embodiment.

That is, as shown in, for example, FIG. 43, in the motor 410 in which the induced voltage constant Ke is relatively large, an operational rotational frequency falls relatively, but it is possible to output a relatively large torque. On the other hand, in the motor 410 in which the induced voltage constant Ke is relatively small, the torque which can be output falls relatively, but the operation to a relatively high rotational frequency becomes possible. As a result, an operational region relevant to a torque and a rotational frequency changes according to the induced voltage constant Ke. For this reason, like an embodiment shown in, for example, FIG. 44A, by making a setting so that the induced voltage constant Ke may change to a falling tendency as the rotational frequency of the motor 410 increases (for example, sequential change to A, B (<A), and C (<B)), an operational region relevant to a torque and a rotational frequency is expanded, compared with a case (for example, the first to third comparative examples) where the induced voltage constant Ke is not changed.

Further, the output of the motor 410 is proportional to a value which is obtained by subtracting the field-weakening loss and other losses from the product of the induced voltage constant Ke, a current applied to the stator windings 413a, and a rotational frequency (Output ∝ (Ke×Current×Rotational frequency–Field-weakening loss–Other losses)). That is, as shown in, for example, FIG. 44B, in the motor 410 in which the induced voltage constant Ke is relatively large, an operational rotational frequency falls relatively, but the output in a relatively low rotational frequency region increases. On the other hand, in the motor 410 in which the induced voltage constant Ke is relatively small, the output in a relatively low rotational frequency region decreases, but the operation to a relatively high rotational frequency becomes possible, and the output at a relatively high rotational frequency increases. As a result, an operational region relevant to an output and a rotational frequency changes according to the induced voltage constant Ke. For this reason, by making a setting so that the induced voltage constant Ke may change to a falling tendency as the rotational frequency of the motor 410 increases (for example, sequential change to A, B (<A), and C (<B)), an operational region relevant to an output and a rotational frequency is expanded, compared with a case (for example, the first to third comparative examples) where the induced voltage constant Ke is not changed.

Further, the efficiency of the motor 410 is proportional to a value which is obtained by subtracting a copper loss, the field-weakening loss, and other losses from the input power to the stator windings 413a (Efficiency ∝ (Input power–Copper loss–Field-weakening loss–Other losses)/Input power)). For this reason, by selecting a relatively large induced voltage constant Ke in a relatively low rotational frequency region to a middle rotational frequency region, the current which is required to output a desired torque decreases, and the copper loss decreases.

Also, by selecting a relatively small induced voltage constant Ke in the middle rotational frequency region to a relatively high rotational frequency region, a field-weakening current decreases, and the field-weakening loss decreases. Thereby, like an embodiment shown in, for example, FIG. 45A, by making a setting so that the induced voltage constant Ke may change to a falling tendency as the rotational frequency of the motor 410 increases, an operational region relevant to a rotational frequency and a rotational frequency is expanded, an efficient region E where the efficiency of the motor 410 becomes a predetermined efficiency or more is expanded, and the value of maximum efficiency which is reachable increases, compared with a case (for example, the second comparative example shown in FIG. 45B) where the induced voltage constant Ke is not changed.

As described above, according to this embodiment, first, the permanent magnets 411a and the permanent magnets 412a are arranged in the peripheral direction in the inner rotor 411 and the outer rotor 412. Thereby, for example, the amount of interlinking magnetic fields that the field fluxes generated by the permanent magnets 412a of the outer rotor 412 interlink the stator windings 413a can be efficiently increased or reduced by the field fluxes generated by the permanent magnets 411a of the inner rotor 411. Also, in the field-strengthening state, the torque constant (that is, torque/phase current) of the motor 410 can be set to a relatively high value. The maximum value of the torque output by the motor 410 can be increased without reducing a current loss during the operation of the motor or without changing the maximum value of the output current of an inverter (not shown) which controls application of a current to the stator windings 413a.

Moreover, as the rotating mechanism 414, a simple vane actuator mechanism having the inner rotor 411 in which the inner rotor body 434 and the housing 433 are integrated, and the vane rotor 432 which is integrally provided in the outer rotor 412, forms the first pressure chambers 456, . . . , and 456 and the second pressure chambers 457, . . . , and 457 with the housing 433, and changes the relative phase with respect to the housing 433 by the hydraulic oil pressure introduced into the first pressure chambers 456, . . . , and 456 and the second pressure chambers 457, . . . , and 457 is used. Therefore, it is possible to make an induced voltage constant variable easily and properly and with desired timing while suppressing complication of the motor 410.

Moreover, by controlling the amount of supply of hydraulic oil to the first pressure chambers 456, . . . , and 456 and the second pressure chambers 457, . . . , and 457, the relative phase between the inner rotor 411 and the outer rotor 412 can be changed without steps within a range of an electrical angle of 180° between a field-weakening state and a field-strengthening state. In addition, since the vane rotor 432 and the housing 433 define the first pressure chambers 456, . . . , and 456 and the second pressure chambers 457, . . . , and 457 inside the inner rotor 411, particularly an increase in axial thickness of the motor can be suppressed, and the motor can be miniaturized.

In addition, the inner rotor 411 in which the inner rotor body 434 and the housing 433 are integrated are arranged so as to be rotatable in the peripheral direction in the space 458 between the outer rotor 412, the vane rotor 432, and both the drive plates 431 and 431, which is surrounded as the drive plates 431 and 431 which directly connect the driving force of the outer rotor 412, and transmit the driving force to the output shaft 416 are fixed to both axial end surfaces, respectively, of the outer rotor 412 and the vane rotor 432. Therefore, the inner rotor 411 is held in a floating state where they are neither fixed nor connected to any one of the outer rotor 412, the vane rotor 432, both the drive plates 431 and 431, and the output shaft 416. Moreover, the pressure of the hydraulic oil introduced to the first pressure chambers 456, . . . , and 456 and the second pressure chambers 457, . . . , and 457 is mainly used for the change of the relative phase between the housing 433 inside the inner rotor 411 and the vane rotor 432, i.e., the relative phase between the inner rotor 411 and the outer rotor 412. Accordingly, the pressure which is required to be generated by the hydraulic oil can be suppressed low.

Moreover, since the inner cylindrical surface 446aa is brought into slight contact with the inner cylindrical surface 431ba during relative rotation by fitting the axially protruding convex portions 446a and 446a formed in the inner rotor 411 into the axially recessed annular grooves 431b and 431b formed in the drive plates 431 and 431, the inner rotor 411 and the outer rotor 412 fixed to the drive plates 431 and 431 can be rotated relatively in a state where their central axes are matched with each other. In this way, since the inner rotor 411 and the outer rotor 412 can always be centered mechanically, the gap between the inner rotor 411 and the outer rotor 412 can be narrowed, and the improvement in performance can be attained.

Moreover, since the convex portions 446a and 446a are formed in an annular shape about the axis of the inner rotor 411, the inner rotor 411 and the outer rotor 412 can be centered reliably. In addition, since the curved labyrinth seal 459 is formed by the convex portions 446a and 446a and the annular grooves 431b and 431b, leakage of hydraulic oil from the first pressure chambers 456, . . . , and 456 and the second pressure chambers 457, . . . , and 457 can be suppressed.

Moreover, since the drive plates 431 and 431 fixed to both axial end surfaces of the outer rotor 412 are integrally fixed to the impeller portions 436, . . . , and 436 of the vane rotor 432, respectively, hydraulic oil can be kept from passing through the gap between the impeller portions 436, ..., and 436 and the drive plates 431 and 431, and deformation of the impeller portions 436, ..., and 436 and displacement at the tip side of the impeller portions 436, ..., and 436 resulting from this deformation can be suppressed.

In addition, since the drive plates 431 and 431 fixed to both axial end surfaces of the outer rotor 412 are integrally fixed to the output shaft 416 via the vane rotor 432, the outer rotor 412, the vane rotor 432, and both the drive plates 431 and 431 are supported on both sides with respect to the output shaft 416. Accordingly, the outer rotor 412, the vane rotor 432, and both the drive plates 431 and 431 can be supported well.

Here, since the outer rotor 412 and the inner rotor 411 are such that the position where the permanent magnets 411a, ..., and 411a and the permanent magnets 412a, ..., and 412a face each other with mutually different polarities is set to an origin position when the first pressure chambers 456, ..., and 456 and the second pressure chambers 457, ..., and 457 do not receive any hydraulic oil pressure substantially, these rotors can return rapidly to the origin position by a magnetic force.

Further, since the rotational direction when the inner rotor 411 returns to an origin position from a state where same polarities of the permanent magnets 411a, ..., and 411a and the permanent magnets 412a, ..., and 412a are made to face each other with respect to the outer rotor 412 is made to coincide with the direction of the moment of inertia caused during deceleration rotation, the inner rotor can return to an origin position more smoothly even by the moment of inertia in addition to the magnetic force during deceleration rotation. Consequently, since the return to the origin position during deceleration can be made more rapidly, and the response during the next acceleration rotation can be improved, the motor becomes suitable particularly when being used for traveling of a vehicle.

In addition, since hydraulic oil is supplied to and discharged from the first pressure chambers 456, ..., and 456 and the second pressure chambers 457, ..., and 457 via the vane rotor 432, an increase in axial thickness can be suppressed by formation of flow passages for hydraulic oil.

Eighth Embodiment

Figure 46:
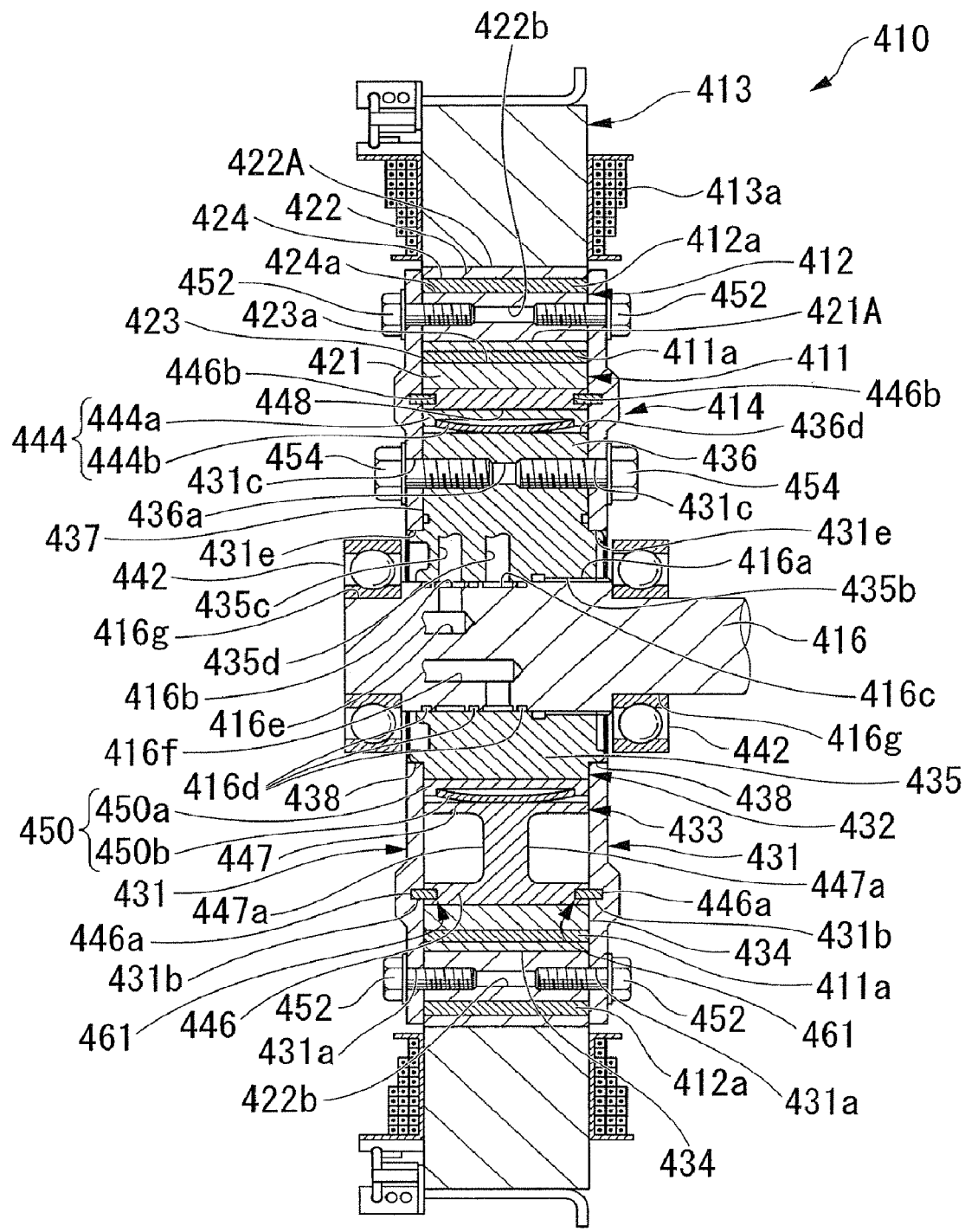
FIG. 46 is a sectional view of principal parts showing a motor according to an eighth embodiment of the invention.

Next, for a motor according to an eighth embodiment of the invention, different portions from the above seventh embodiment are described mainly with reference to FIG. 46. In addition, the same reference numerals are given to the same portions as the above seventh embodiment, and the description thereof is omitted.

In this embodiment, the convex portion 446a is constituted by an annular ring member 461 which is a member separate from the inner rotor 411 and which is fitted to the inner rotor 411. That is, in this embodiment, the base portion 446 of the inner rotor 411 does not protrude axially with respect to the protruding portions 447, ..., and 447 and the inner rotor body 434, but makes the same plane. Also, axially recessed fitting grooves 446b are respectively formed at both axial end surfaces of the base portion 446.

Also, the ring members 461 with axial width which is longer than the depth of the fitting groove 446b are fixedly fitted into the fitting grooves 446b and 446b, respectively. Thereby, the portion of each of the ring members 461 and 461 which protrude from the inner rotor 411 constitutes the convex portion 446a.

According to such embodiment, since each of the convex portions 446a and 446a is formed by fitting the ring member 461 into the inner rotor 411, machining of both the axial end surfaces of the inner rotor 411 becomes easy. That is, since both the end surfaces of the inner rotor 411 may contact the drive plates 431 and 431 during rotation, flatness and surface roughness should be secured, and grinding is required. However, since the grinding can be made with no convex portion 446a before fitting of the ring member 461, machining becomes easy.

In addition, the aforementioned annular groove 431b may be provided in the inner rotor 411, and the convex portion 446a which enters the annular groove 431b may be provided in the drive plate 431. That is, it is sufficient if the axially recessed annular groove 431b is formed in any one of the inner rotor 411 and the drive plate 431, and the convex portion 446a which protrudes axially and slides inside the annular groove 431b during rotation is formed in the other of the inner rotor 411 and the drive plate 431.

As described above, the motor of the invention offers the following features.

(18) In a motor (for example, the motor 410 in the embodiment) including an inner rotor (for example, the inner rotor 411 in the embodiment) having inner permanent magnets (for example, the inner permanent magnets 411a in the embodiment) arranged in a peripheral direction and an outer rotor (for example, the outer rotor 412 in the embodiment) having outer permanent magnets (for example, the outer permanent magnets 412a in the embodiment) arranged in the peripheral direction, the mutual axes of rotation of the inner and outer rotors being arranged coaxially, and a rotating device (for example, the rotating mechanism 414 in the embodiment) capable of making at least one of the inner rotor and the outer rotor rotate around the axes of rotation to change the relative phase between the inner rotor and the outer rotor, the rotating device includes a housing (for example, the housing 433 in the embodiment) which constitutes part of the inner rotor, and a vane rotor (for example, vane rotor 432 in the embodiment) which is integrally provided in the outer rotor, forms pressure chambers (for example, the first pressure chamber 456 and the second pressure chamber 457 in the embodiment) with the housing, and changes the relative phase with respect to the housing by the pressure of a working fluid supplied to the pressure chambers, the inner rotor is arranged so as to be rotatable in the peripheral direction in a space (for example, the space 458 in the embodiment) between the outer rotor, the vane rotor, and both end plates, which is surrounded as the end plates (for example, the drive plates 431 in the embodiment) which transmit the driving force of the outer rotor to an output shaft (for example, the output shaft 416 in the embodiment) are fixed to both axial ends of the outer rotor and the vane rotor, and an axially recessed concave portion (for example, the annular groove 431b in the embodiment) is formed in any one of the inner rotor and the end plate, and the convex portion (for example, convex portion 446a in the embodiment) which protrudes axially and slides inside the concave portion during rotation is formed in the other of the inner rotor and the end plate.

According to the motor, the permanent magnets are arranged in the peripheral direction in the inner rotor and the outer rotor. Thereby, for example, the amount of interlinking magnetic fields that the field fluxes generated by the permanent magnets of the outer rotor interlink the stator windings can be efficiently increased or reduced by the field fluxes generated by the permanent magnets of the inner rotor. Also, in the field-strengthening state, the torque constant (that is, torque/phase current) of the motor can be set to a relatively high value. The maximum value of the torque output by the motor can be increased without reducing a current loss during the operation of the motor or without changing the maximum value of the output current of an inverter (not shown) which controls application of a current to the stator windings.

Moreover, as the rotating device, a simple vane actuator mechanism having the housing which constitutes part of the inner rotor, and the vane rotor which is integrally provided in the outer rotor, forms pressure chambers along with the housing, and changes the relative phase with respect to the housing by the working fluid pressure introduced into the pressure chambers is used. Therefore, it is possible to make an induced voltage constant variable easily and properly and with desired timing while suppressing complication of the motor.

In addition, since the inner rotor part of which is used as the housing is arranged so as to be rotatable in the peripheral direction in a space between the outer rotor, the vane rotor, and both end plates, which is surrounded as the end plates which transmit the driving force of the outer rotor to an output shaft are fixed to both the axial ends of the outer rotor and the vane rotor, the pressure of the working fluid is mainly used for the change of the relative phase between the housing which constitutes part of the inner rotor and the vane rotor, i.e., the relative phase between the inner rotor and the outer rotor. Accordingly, the pressure which is required to be generated by the working fluid can be suppressed low.

Moreover, since an axially recessed concave portion is formed in any one of the inner rotor and the end plate, and a convex portion which protrudes axially and slides inside the concave portion during rotation is formed in the other of the inner rotor and the end plate, the outer rotor fixed to the end plates, and the inner rotor can be rotated relatively in a state where their central axes are matched with each other. In this way, since the inner rotor and the outer rotor can always be centered mechanically, the gap between the inner rotor and the outer rotor can be narrowed, and the improvement in performance can be attained.

(19) In the above (18), a configuration in which the convex portion is formed in an annular shape may be adopted.

In this case, since the convex portion is formed in an annular shape, the inner rotor and the outer rotor can be centered reliably.

(20) In the above (19), a configuration which the convex portion is formed by fitting a ring member (for example, the ring member 461 in the embodiment) into the inner rotor may be adopted.

According to such embodiment, since the convex portion is formed by fitting the ring member into the inner rotor, machining of the end surfaces of the inner rotor becomes easy.

(21) In the (19) or (20), a configuration in which a labyrinth seal (for example, the labyrinth seal 459 in the embodiment) is formed by the convex portion and the concave portion may be adopted.

In this case, since the labyrinth seal is formed by the convex portion and the concave portion, leakage of hydraulic oil from the pressure chambers can be suppressed.

INDUSTRIAL APPLICABILITY

According to the motor of the motor, the permanent magnets are arranged in the peripheral direction in the inner rotor and the outer rotor. Thereby, for example, the amount of interlinking magnetic fields that the field fluxes generated by the permanent magnets of the outer rotor interlink the stator windings can be efficiently increased or reduced by the field fluxes generated by the permanent magnets of the inner rotor. Also, in the field-strengthening state, the torque constant (that is, torque/phase current) of the motor can be set to a relatively high value. The maximum value of the torque output by the motor can be increased without reducing a current loss during the operation of the motor or without changing the maximum value of the output current of an inverter (not shown) which controls application of a current to the stator windings.

Moreover, the rotating mechanism supplies a working fluid to the pressure chambers which are defined inside the inner rotor by the first member integrally and rotatably provided with respect to the outer rotor and by the second member integrally and rotatably provided with respect to the inner rotor, thereby changing the relative phase between the inner rotor and the outer rotor. Therefore, it is possible to make an induced voltage constant variable easily and properly and with desired timing while suppressing complication of the motor. As a result, it is possible to expand an operational rotational frequency range and torque range, improve operating efficiency, and expand an operational range at high efficiency. Moreover, the relative phase between the inner rotor and the outer rotor can be set to a desired phase by controlling the amount of supply of the working fluid to the pressure chambers. In addition, since the first member and the second member define the pressure chambers inside the inner rotor, particularly an increase in axial thickness of the motor can be suppressed, and the motor can be miniaturized.

The invention claimed is:

1. A motor comprising
an inner rotor having inner permanent magnets arranged in a peripheral direction and an outer rotor having outer permanent magnets arranged in the peripheral direction, the mutual axes of rotation of the inner rotor and the outer rotor being arranged coaxially, and a rotating device capable of making at least one of the inner rotor and the outer rotor rotate around the axes of rotation so as to change the relative phase between the inner rotor and the outer rotor, wherein
the rotating device includes:
a first member which is integrally and rotatably provided with respect to the outer rotor; and
a second member which is integrally and rotatably provided with respect to the inner rotor and which defines pressure chambers inside the inner rotor with the first member, and wherein
a working fluid is supplied to the pressure chambers, thereby changing the relative phase between the inner rotor and the outer rotor.

2. The motor according to claim 1, wherein:
the first member is a vane rotor which is arranged inside the inner rotor, and is integrally provided in the outer rotor; and
the second member is a housing having concave portions which rotatably accommodate impeller portions of the vane rotor and which defines the pressure chambers with the vane rotor, and is integrally provided inside the inner rotor.

3. The motor according to claim 2, wherein
the vane rotor is integrally provided in the outer rotor via end plates which are fixed to the outer rotor so as to cover axial end surfaces, and is integrally provided in a rotating shaft to which the driving force of the outer rotor is transmitted.

4. The motor according to claim 3, wherein
the inner rotor and the housing which are integrated are arranged so as to be rotatable in the peripheral direction in a space between the vane rotor and the end plates.

5. The motor according to claim 2, wherein
the vane rotor is integrally provided in the outer rotor via end plates fixed to the outer rotor so as to cover one axial end surface, and a rotating shaft which transmits the driving force of the outer rotor is integrally provided in the inner rotor and the housing from the other axial side.

6. The motor according to claim 2, wherein
the working fluid is supplied to the pressure chambers via the vane rotor.

7. The motor according to claim 1, wherein:
the first member is end plates which are integrally provided in the outer rotor and the rotating shaft so as to cover both end surfaces of the inner rotor and the outer rotor, and which transmits torque to the rotating shaft; and
the second member is a ring gear which is arranged between the inner rotor and the rotating shaft, is connected with the inner rotor and the rotating shaft by helical splines, defines the pressure chambers with the drive plates, and is moved axially by supply of the working fluid to the pressure chambers.

8. The motor according to claim 1, wherein:
the first member is a housing which is integrally provided in the outer rotor and a rotating shaft to which the driving force of the outer rotor is transmitted; and
the second member is pistons which are inserted into holes formed in the housing to define the pressure chambers with the holes, and abut on wall surfaces of the inner rotor.

9. The motor according to claim 1, wherein
the outer rotor and the inner rotor are such that the position where the outer permanent magnets and the inner permanent magnets face each other with mutually different polarities is set to an origin position.

10. The motor according to claim 9, wherein
the rotational direction when the inner rotor returns to the origin position from a state where same polarities of the outer permanent magnets and the inner permanent magnets are made to face each other with respect to the outer rotor is made to coincide with the direction of the moment of inertia caused during deceleration rotation.

11. The motor according to claim 2, wherein
the end plates and end surfaces of the outer rotor are joined via shims.

12. The motor according to claim 11, wherein
through holes are formed at sides of a gap between the outer rotor and the inner rotor in the end plates.

13. The motor according to claim 12, wherein
the outer rotor and the end plates are connected together by bolt fastening portions with every predetermined intervals with the shims interposed therebetween, and
curved portions are formed in the position of in the shims nearer to the axial center than the bolt fastening portions.

14. The motor according to claim 13,
wherein the through holes are formed between the adjacent bolt fastening portions.

15. The motor according to claim 4, wherein
an axially recessed concave portion is formed in any one of the inner rotor and the end plate, and the convex portion which protrudes axially and slides inside the concave portion during rotation is formed in the other of the inner rotor and the end plate.

16. The motor according to claim 15, wherein
the convex portion is formed in an annular shape.

17. The motor according to claim 16, wherein
the convex portion is formed by a ring member fitted into the inner rotor.

18. The motor according to claim 16, wherein
a labyrinth seal is formed by the convex portion and the concave portion.

\* \* \* \* \*